(12) United States Patent
Xin et al.

(10) Patent No.: US 9,619,104 B2
(45) Date of Patent: Apr. 11, 2017

(54) INTERACTIVE INPUT SYSTEM HAVING A 3D INPUT SPACE

(75) Inventors: Min Xin, Calgary (CA); Viktor Antonyuk, Calgary (CA); Edward Tse, Calgary (CA); Henry Lai, Calgary (CA); Mark Cameron Loken, Calgary (CA); Zhaohui Xing, Calgary (CA); Erik Benner, Calgary (CA); Danny Ma, Calgary (CA); Roberto Arturo Diaz-Marino, Calgary (CA); Shymmon Banerjee, Calgary (CA); Esteban Ginez, Calgary (CA); Luqing Wang, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 949 days.

(21) Appl. No.: 13/823,209

(22) PCT Filed: Oct. 3, 2011

(86) PCT No.: PCT/CA2011/001090
§ 371 (c)(1),
(2), (4) Date: Dec. 12, 2013

(87) PCT Pub. No.: WO2012/040827
PCT Pub. Date: Apr. 5, 2012

(65) Prior Publication Data
US 2014/0129990 A1 May 8, 2014

Related U.S. Application Data

(60) Provisional application No. 61/389,016, filed on Oct. 1, 2010, provisional application No. 61/450,032, filed on Mar. 7, 2011.

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/017* (2013.01); *G06F 3/0425* (2013.01);
(Continued)

(58) Field of Classification Search
None
See application file for complete search history.

(56) References Cited

U.S. PATENT DOCUMENTS 5,371,514 A * 12/1994 Lawless .............. G06F 3/04842
 345/629
5,511,157 A 4/1996 Wang
(Continued)

FOREIGN PATENT DOCUMENTS

WO 2011/150510 A1 12/2011

OTHER PUBLICATIONS

Ha Taejin, An Empirical Evaluation of Virtual Hand Techniques for 3D Object Manipulation in a Tangible Augmented Reality Environment, Mar. 2010, IEEE, pp. 9198, 20-21.*
(Continued)

*Primary Examiner* — Phenuel Salomon
(74) *Attorney, Agent, or Firm* — Perkins Coie LLP

(57) ABSTRACT

Computerized methods and interactive input systems for manipulation of 3D objects are disclosed. An image of 3D object is displayed on a 2D interactive surface, and input is received and is interpreted for manipulating the 3D object. When the 3D object is selected, rotation control handles indicating available rotation directions are displayed. In one embodiment, the method comprises capturing images of a 3D input space, recognizing at least one object in the images, and comparing the recognized objects in the images to determine a difference therebetween based on a difference threshold. Depending on the outcome of the comparison, the recognized objects are emerged and associated with digital
(Continued)

content, or only one of the recognized objects is maintained and associated with digital content.

12 Claims, 39 Drawing Sheets

(51) Int. Cl.
    *G06F 3/042*     (2006.01)
    *G06F 3/0484*     (2013.01)
    *G06F 3/0488*     (2013.01)
    *G06T 19/00*     (2011.01)
    *G06K 9/62*     (2006.01)

(52) U.S. Cl.
    CPC ........ *G06F 3/0488* (2013.01); *G06F 3/04845* (2013.01); *G06K 9/6201* (2013.01); *G06T 19/00* (2013.01)

(56) References Cited

U.S. PATENT DOCUMENTS

| | | | | |
|---|---|---|---|---|
| 5,729,704 | A * | 3/1998 | Stone | G06T 11/00 345/619 |
| 5,900,877 | A * | 5/1999 | Weiss | G06F 3/04847 715/803 |
| 6,124,861 | A * | 9/2000 | Lebovitz | G06F 3/04842 715/808 |
| 6,426,745 | B1 * | 7/2002 | Isaacs | G06F 3/04845 345/419 |
| 6,714,201 | B1 * | 3/2004 | Grinstein | G06T 13/20 345/474 |
| 7,312,805 | B1 * | 12/2007 | Worthington | G06T 3/0093 345/473 |
| 7,583,276 | B1 * | 9/2009 | Worthington | G06T 3/0093 345/473 |
| 7,594,180 | B1 * | 9/2009 | Langmacher | G06T 13/80 345/473 |
| 8,253,745 | B1 * | 8/2012 | Hahn | G06T 13/40 345/474 |
| 2006/0012675 | A1 | 1/2006 | Alpaslan et al. | |
| 2008/0094398 | A1 | 4/2008 | Ng et al. | |
| 2009/0217187 | A1 * | 8/2009 | Kendall | G06T 3/00 715/765 |
| 2010/0262907 | A1 * | 10/2010 | Shoemaker | G06F 3/0481 715/702 |
| 2011/0246949 | A1 * | 10/2011 | Baszucki | G06F 3/04845 715/848 |
| 2012/0327125 | A1 * | 12/2012 | Kutliroff | G06F 3/017 345/660 |

OTHER PUBLICATIONS

Henrysson Anders, Virtual Object Manipulation using Mobile Phone, 2005, ACM, pp. 164-171.*

Transmittal; International Search Report; and Written Opinion for International Application No. PCT/CA2011/001090 with a date of mailing of Mar. 22, 2012.

* cited by examiner

INTERACTIVE INPUT SYSTEM HAVING A 3D INPUT SPACE

CROSS-REFERENCE TO RELATED APPLICATIONS

This application claims the benefit of U.S. Provisional Application No. 61/389,016 to Xin et al. filed on Oct. 1, 2010, entitled "Stereoscopic 3D Input System and Method for Manipulating Graphic Objects" and U.S. Provisional Application No. 61/450,032 to Lai et al. filed on Mar. 7, 2011, entitled "Stereoscopic 3D Input System, Tools Therefor and Methods for Manipulating Graphic Objects", the contents of which are incorporated herein by reference in their entireties. This application is also related to U.S. Provisional Application No. 61/365,757 to Antonyuk et al. filed on Jul. 19, 2010, entitled "Interactive Input System Having A 3D Input Space", U.S. Provisional Application No. 61/371,975 to Xin et al. filed on Aug. 9, 2010, entitled "Interactive Input System Having A 3D Input Space" and U.S. Provisional Application No. 61/431,850 to Tse et al. filed on Jan. 12, 2011, entitled "Interactive Input System Having 3D Input Space", the contents of which are incorporated herein by reference in their entireties.

FIELD OF THE INVENTION

The present invention relates generally interactive input systems and in particular, to an interactive input system having a 3D input space and to computerized methods.

BACKGROUND OF THE INVENTION

"Mixed reality" generally refers to the merging of real and virtual worlds to produce new environments and visualisations in which physical and digital objects co-exist and interact in real time. Interactive input systems that utilize mixed reality, often referred to as "augmented interactive input systems", are known in the art. Some existing augmented interactive input systems make use of a document camera to track physical objects such as cubes and flashcards that comprise recognizable patterns. Digital content is superimposed on top of the images captured by the document camera. Direct association of the physical objects to digital content allows users to manipulate the digital content through manipulation of the physical objects.

Stereoscopic three-dimensional (3D) input systems have also been considered. For example, U.S. Patent Application Publication No. 2008/0094398 to Ng et al. discloses a 3D visualization system that can be ported to a laptop or desktop personal computer (PC), or other standard two-dimensional (2D) computing environment, which uses a mouse and keyboard as user input devices. A cursor or icon can be drawn at a contextually appropriate depth, thus preserving 3D interactivity and visualization while only having available 2D control. A spatially correct depth can be automatically found for, and assigned to, the cursors and icons associated with various 3D tools, control panels and other manipulations. This can preserve the 3D experience of interacting with a 3D data set even though the 2D interface used to select objects and manipulate them cannot directly provide a third dimensional co-ordinate. Based upon the assigned position of the cursor or icon in 3D, the functionality of a selected tool, and whether and in what sequence any buttons have been pressed on a 2D interface device, a variety of 3D virtual tools and functionalities can be implemented and controlled by a standard 2D computer interface.

U.S. Patent Application Publication No. 2006/0012675 to Alpasian et al. discloses an apparatus and method for 3D interaction with an autostereoscopic display. A motion tracking system may include video cameras that track a 3D motion of a user within an interaction volume defined by the fields-of-view of the video cameras, as the user moves a light source or other optical marker or an anatomical region of the user within the interaction volume. The motion tracking system may generate 3D tracking data containing position information about the 3D motion. An imaging system may create a virtual scene by tracing 3D virtual objects in virtual space, using the position information in the 3D tracking data. The imaging system may synthesize a plurality of views of the virtual scene, and interlace the plurality of views to generate an interlaced image to drive the autostereoscopic display and to be displayed thereon.

A disadvantage of known augmented interactive input systems is the temporary loss of physical objects that are being tracked. This typically occurs when a recognizable pattern on the object is partially or completely obscured, such as by fingers or hands during manipulation of the physical object in a 3D input space. This can also occur when the recognizable pattern is out of the field of view of the camera, due to a particular orientation of the physical object in relation to the field of view of the camera. When the augmented interactive input system temporarily loses track of the recognizable pattern and then regains tracking of the recognizable pattern, the associated digital content shown on the display disappears momentarily and then re-appears, causing the display to flicker.

Additionally, while some known augmented interactive input systems allow manipulation of recognized image objects from a printed medium, such as paper, these systems do not provide any means of visual feedback on the paper to facilitate manipulation of the recognized image objects.

Improvements are generally desired. It is therefore an object of the present invention at least to provide novel interactive input systems and novel computerized methods.

SUMMARY OF THE INVENTION

Accordingly, in one aspect there is provided a computerized method comprising: displaying a two-dimensional (2D) image of a three-dimensional (3D) object on a display; defining at least one region on said display for controlling the rotation of said 3D object about a defined axis, said axis being parallel to a display surface of said display; receiving input applied to said at least one region; determining, from said input, a rotation direction; and modifying said displayed 2D image by rotating said 3D object about the defined axis along said rotation direction.

According to another aspect, there is provided an interactive input system comprising: a display comprising a display surface on which a two-dimensional (2D) image of a three-dimensional (3D) object and at least one region for controlling rotation of said 3D object about a defined axis are presented; and computing structure communicating with said display, said computing structure, in response to input applied to said at least one region, determining a rotation direction and modifying said 2D image by rotating said 3D object about said defined axis in said rotation direction.

According to another aspect, there is provided an interactive input system comprising: computing structure; a display in communication with said computing structure, said display presenting an image comprising digital content; and an input device detecting at least one physical object carrying a recognizable pattern within a three-dimensional (3D) input space and providing output to said computing structure, said computing structure being configured to process the output of the input device to: recognize the pattern carried by the at least one physical object in the 3D input space; and modify the image presented on the display based on at least one of the detected state of the at least one physical object and the proximity of a user to a designated location.

According to yet another aspect, there is provided a computerized method comprising: presenting an image comprising digital content on a display surface; recognizing a pattern carried by a physical object placed within a three-dimensional input space; and modifying the image based on at least one of the detected state of the at least one physical object and proximity of a user to a designated location.

According to yet another aspect, there is provided a computerized method comprising: displaying an enclosure around the periphery of a displayed graphic object upon selection of the graphic object, the enclosure having control elements associated therewith; and manipulating the graphic object according to user interaction with at least one of said control elements.

According to yet another aspect, there is provided an interactive input system comprising: a display comprising a display surface on which at least one graphic object is presented; and computing structure communicating with said display, said computing structure being configured to cause said display to present an enclosure having control elements associated therewith around the periphery of a selected graphic object and to manipulate the graphic object according to user interactions with at least one control element of said enclosure.

According to yet another aspect, there is provided a computerized method comprising: designating one or more anchor points on a displayed graphic object; anchoring a label box to one or more said anchor points; and annotating said label box.

According to yet another aspect, there is provided an interactive input system comprising: a display comprising a display surface; and computing structure communicating with said display, said computing structure being configured to: designate one or more anchor points on a graphic object presented on said display surface; anchor a label box to one or more said anchor points; and annotate said label box.

According to yet another aspect, there is provided a computerized method comprising: capturing an image of a three-dimensional (3D) input space and recognizing at least one object therein; capturing another image of said 3D input space and recognizing at least one object therein; comparing the captured images to determine a difference therebetween; when said difference is greater than a difference threshold, merging the recognized objects to form a composite recognized object and storing said composite recognized object; when said difference is not greater than said difference threshold, storing one of said recognized objects and discarding the other of said recognized objects; and associating either said stored composite recognized object or said stored one recognized object with digital content.

According to yet another aspect, there is provided an interactive input system comprising: an input device capturing images of a three-dimensional (3D) input space; and computing structure communicating with said input device, said computing structure being configured to: recognize at least one object in captured images; compare captured images to determine differences therebetween; when said differences are greater than a difference threshold, merge the recognized objects to form a composite recognized object and store said composite recognized object; when said differences are not greater than said difference threshold, store one of said recognized objects and discard the remaining recognized objects; and associate either said stored composite recognized object or said stored one recognized object with digital content.

According to yet another aspect, there is provided a computerized method comprising: capturing images of a three-dimensional (3D) input space; recognizing at least one object in each image; comparing a pair of said images to determine a difference therebetween; when said difference is greater than a difference threshold, merging said recognized objects and associating digital content therewith; and when said difference is not greater than said difference threshold, maintaining at least one recognized object from only one of said images in said pair and associating digital content therewith.

According to yet another aspect there is provided an interactive input system comprising: computing structure; and an input device capturing an image of at least one physical object carrying recognizable text within a three-dimensional (3D) input space and providing image data to said computing structure, wherein said computing structure processes the image data and is configured to: present said image on a display coupled to said computing structure; recognize at least one object carried by the at least one physical object in the 3D input space; associate at least a portion of said recognized at least one object with a link to digital content; receive user input representing activation of said link; and superimpose said digital content on said image.

According to yet another aspect there is provided a computerized method comprising: presenting an image on a display coupled to computing structure; recognizing at least one object carried by at least one physical object in a three-dimensional (3D) input space; associating at least a portion of said recognized at least one object with a link to digital content; receiving user input representing activation of said link; and superimposing said digital content on said image.

According to still yet another aspect there is provided an image capturing apparatus comprising: computing structure; a camera device capturing images of a three-dimensional (3D) input space coupled to said computing structure, wherein said 3D input space comprises a two-dimensional (2D) plane; and light projection structure coupled to said computing structure, said computing structure receiving images captured by said input device, recognizing objects within said images, associating recognized objects with digital content, and projecting said digital content to said 2D plane, wherein said digital content is manipulatable on said 2D plane.

BRIEF DESCRIPTION OF THE DRAWINGS

Embodiments will now be described more fully with reference to the accompanying drawings in which.

DETAILED DESCRIPTION OF THE EMBODIMENTS

Figure 1A:
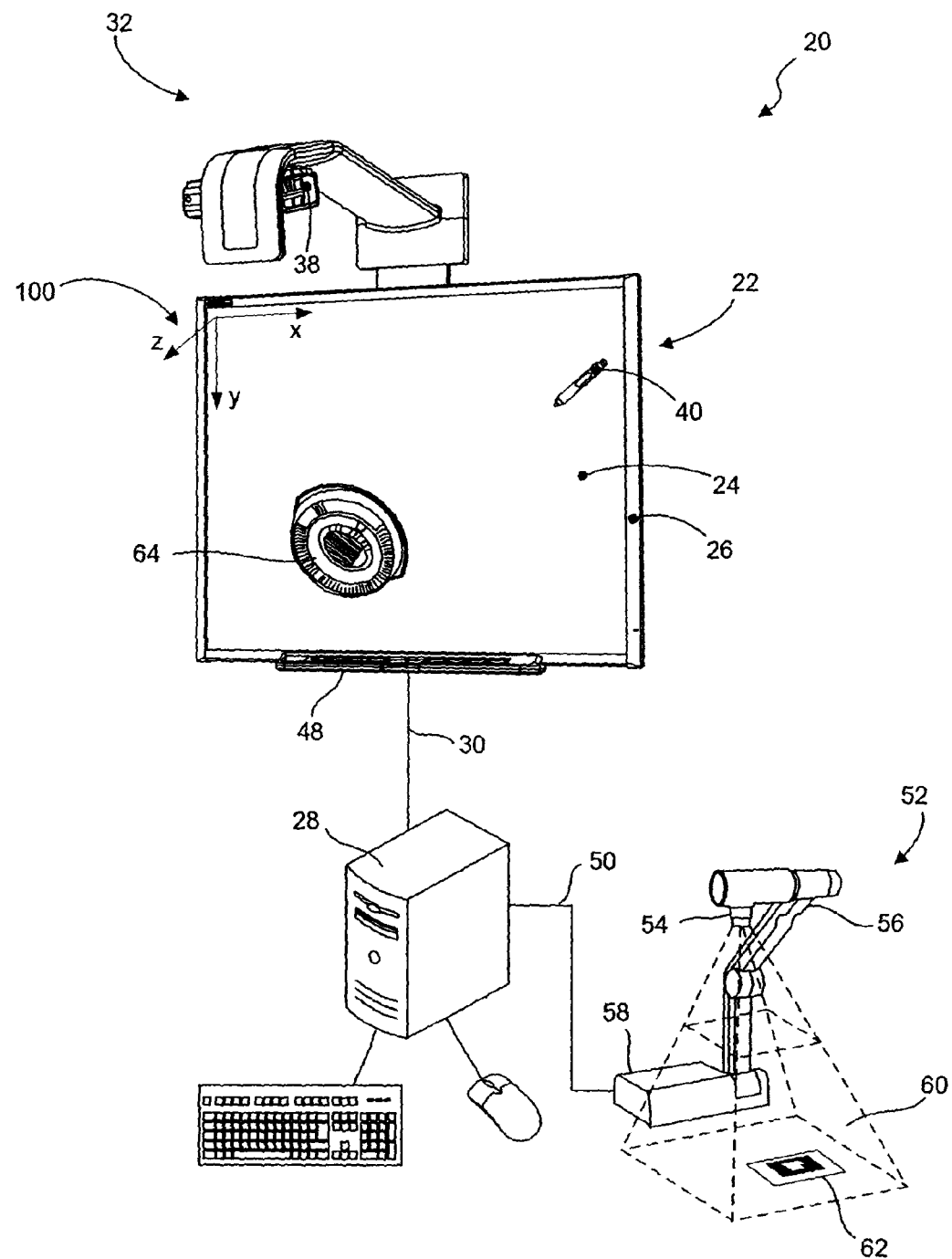
FIG. 1A is a perspective diagram of an interactive input system having a three-dimensional (3D) input space.

Turning now to FIG. 1A, an interactive input system having a three-dimensional (3D) input space is shown and is generally identified by reference numeral 20. Interactive input system 20 allows a user to inject input such as digital ink, mouse events, commands, etc. into an executing application program. In this embodiment, interactive input system 20 comprises a two-dimensional (2D) input device in the form of an interactive board 22 mounted on a vertical support surface such as for example, a wall surface or the like. Interactive board 22 comprises a generally planar, rectangular 2D interactive surface 24 that is surrounded about its periphery by a bezel 26. A boom assembly 32 is also mounted on the support surface above the interactive board 22. Boom assembly 32 supports a short-throw projector 38 such as that sold by SMART Technologies ULC of Calgary, Alberta, assignee of the subject application, under the name "SMART Unifi 45", which projects an image, such as for example, a computer desktop, onto the 2D interactive surface 24. For ease of discussion, a 3D coordinate system 100 of the interactive board 22 is referred to throughout this description. The origin of the 3D coordinate system 100 is coincident with the upper-left corner of the 2D interactive surface 24. The x-axis of the 3D coordinate system extends in the horizontal direction to the right, the y-axis extends in the vertical direction downwardly, and the z-axis extends in an outward direction perpendicular to the x-y plane. The 2D interactive surface 24 of the interactive board 22 is therfore coincident with the x-y plane at z=0.

The interactive board 22 employs machine vision to detect one or more pointers brought into a region of interest in proximity with the 2D interactive surface 24. The interactive board 22 communicates with a general purpose computing device 28 executing one or more application programs via a universal serial bus (USB) cable 30 or other suitable wired or wireless communication link. Computing device 28 processes the output of the interactive board 22 and adjusts image data that is output to the projector 38, if required, so that the image presented on the 2D interactive surface 24 reflects pointer activity. In this manner, the interactive board 22, computing device 28 and projector 38 allow pointer activity proximate to the 2D interactive surface 24 to be recorded as writing or drawing or used to control execution of one or more application programs executed by the computing device 28.

The bezel 26 is mechanically fastened to the 2D interactive surface 24 and comprises four bezel segments that extend along the edges of the 2D interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the 2D interactive surface 24.

A tool tray 48 is affixed to the interactive board 22 adjacent the bottom bezel segment using suitable fasteners such as for example, screws, clips, adhesive etc. As can be seen, the tool tray 48 comprises a housing having an upper surface configured to define a plurality of receptacles or slots. The receptacles are sized to receive one or more pen tools 40 as well as an eraser tool (not shown) that can be used to interact with the 2D interactive surface 24. Control buttons (not shown) are also provided on the upper surface of the tool tray housing to enable a user to control operation of the interactive input system 20.

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire 2D interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the 2D interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire 2D interactive surface 24. In this manner, any pointer such as for example a user's finger, a cylinder or other suitable object, or a pen or eraser tool lifted from a receptacle of the tool tray 48, that is brought into proximity of the 2D interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the computing device 28.

The general purpose computing device 28 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The computing device 28 may also comprise networking capabilities using Ethernet, WiFi, and/or other suitable network format, to enable connection to shared or remote drives, one or more networked computers, or other networked devices. The computing device 28 processes pointer data received from the imaging assemblies and computes the location of any pointer proximate the 2D interactive surface 24 using well known triangulation. The computed pointer location is then recorded as writing or drawing or used as an input command to control execution of an application program as described above.

Figure 1B:
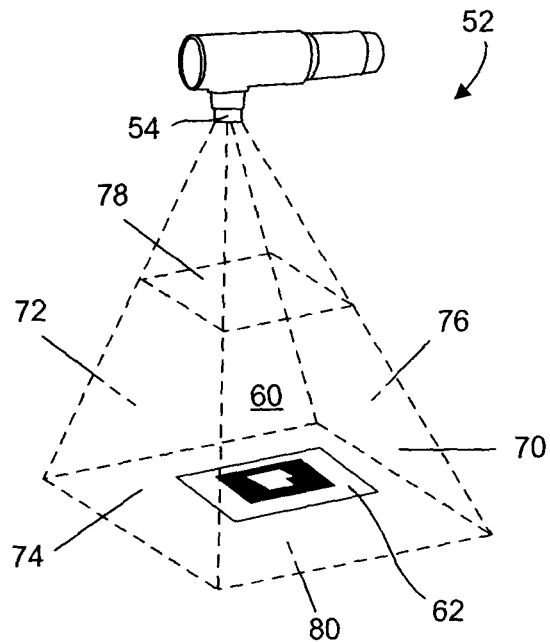
FIG. 1B is a perspective view of a 3D input device forming part of the interactive input system of FIG. 1A showing the 3D input space imaged thereby.

The interactive input system 20 also comprises a three-dimensional (3D) input device 52 that communicates with the computing device 28 via a USB cable 50. Those skilled in the art will understand that alternative wired connections, such as for example VGA, DVI, HDMI and the like or suitable wireless connections to connect the 3D input device 52 to the computing device 28 may be employed. The 3D input device 52 comprises a camera 54 mounted to a base 58 via an articulated arm 56. The camera 54 has a field of view that looks into a 3D input space 60. The 3D input space 60 defines a volume within which a physical object or marker from a set of markers may be positioned and manipulated. FIG. 1B shows a marker 62 positioned in the 3D input space 60. For ease of illustration, only the camera 54 of the 3D input device 52 is shown. In this embodiment, the 3D input space 60 has the shape of a pyramidal frustum comprising six (6) boundary surfaces, namely front, back, left, right and top boundary surfaces 70 to 78, respectively, and bottom boundary surface 80. The boundary surfaces 70 to 78 may be used to define clipping planes for detection of clipping plane gestures, as described in above-incorporated applications. The images captured by the camera 54 are pre-processed by control circuitry (not shown) in the base 58 to adjust the brightness, clarity and/or resolution of the images, prior to being sent to the computing device 28.

In this embodiment, each marker of the set is in the form of a planar card having a pattern printed or otherwise applied to at least one surface thereof, or a cube with at least one surface having a pattern printed or otherwise applied thereto. The pattern comprises a rectangular dark or black box having an arrangement of smaller light or white blocks thereon. The arrangement of smaller white blocks on the larger black box is unique to each marker. This allows each marker to be associated with different digital content and/or with a different digital content manipulation. "Digital content" herein refers to any type of digital object, as opposed to a physical object, that is maintained in the computing device 28 and that is represented by an image (e.g. a picture, an icon, an animation, and the like) displayed on the 2D interactive surface 24. The digital content 64 may be any of text, images, video clips, audio clips, animations and 3D objects, for example. In the embodiment shown in FIG. 1A, the marker 62 is associated with digital content 64 in the form of a 3D graphic object representing a stadium.

"Digital tool" described herein refers to a digital content manipulation tool that is associated with a marker 62 for selecting or manipulating digital content. For example, a marker 62 may be predefined as a selection tool for selecting a 3D object. When the computing device 28 detects that the marker 62 has performed a gesture for selecting a 3D object, the computing device 28 then associates the 3D object with the selection tool marker 62 so that the user may manipulate the 3D object by manipulating the selection tool marker 62 in the 3D input space 60. Details of selecting digital content using selection tools are disclosed in one or more of the above-incorporated applications, and will not be described further herein.

When the marker 62 positioned in the 3D input space 60 is captured in an image acquired by the camera 54, after the image has been pre-processed and converted into digital form by the control circuitry in the base 58 and then conveyed to the computing device 28, the computing device 28 processes the image to recognize the pattern. Once recognized, the computing device 28 determines the digital content object 64 associated with the recognized pattern. Thereafter, the computing device 28, using a position mapping rule, combines the captured image, the digital content object 64 associated with the recognized pattern on the marker and the graphical interface of the executing application program and outputs the resultant image data to the projector 38 for presentation on the 2D interactive surface 24. In this case, the digital content object 64 is superimposed on the captured image and graphical interface. Thus, an image comprising both the real-world and digital content is displayed on the 2D interactive surface 24. Users of the interactive input system 20 may manipulate the marker 62, e.g., by moving, rotating or tilting the marker 62 within the 3D input space 60, to interact with and manipulate the digital content displayed on the 2D interactive surface 24. For example, a user may rotate the marker 62 to rotate the digital content object 64 and view it from different vantage points as desired. Details of detecting and manipulating markers are disclosed in one or more of the above-incorporated applications.

The interactive input system 20 uses an event based mechanism to receive user input, which may be generated by manipulation of a marker 62 within the 3D input space 60, the 2D interactive surface 24 or from other input devices such as, for example, a keyboard, a mouse, a trackball, an audio input device, a touchpad, a slate, and the like. In this embodiment, the computing device 28 monitors the 3D input space 60 by analyzing the images captured by the 3D input device 52. The computing device 28 detects markers 62 in the aforementioned pre-processed image, superimposes digital content on the image for display on the 2D interactive surface 24, and modifies the superimposed digital content based on the positions of the markers in the 3D input space 60. The computing device 28 also detects pointers, such as for example fingers and styli, in the aforementioned pre-processed image, determines pointer gestures according to the movement of the pointers, and generates 3D input events. The computing device 28 receives touch events from the 2D interactive surface 24, determines touch gestures, and generates 2D input events. The computing device 28 also receives input events from other input devices such as, for example, a keyboard or a mouse. The received input events are sent to respective application programs executed by the computing device 28 which interpret the user input as various commands such as for example, digital ink annotation commands, object manipulation commands or program control commands.

In this embodiment, the computing device 28 runs a host software application such as SMART Notebook™ offered by SMART Technologies ULC. As is known, during execution, the SMART Notebook™ application provides a graphical user interface comprising a canvas page or palette, that is output to the projector 38 and presented on the 2D interactive surface 24, and on which freeform or handwritten ink objects together with other computer generated objects can be input and manipulated via pointer interaction with the 2D interactive surface 24. Users may insert or delete canvas page, or move to another canvas page by applying commands to the SMART Notebook™ application window. For example, a user may click a "forward" tool button in the application window to move to the next canvas page.

The SMART Notebook™ application allows users to insert digital content objects onto a canvas page, and to manipulate the digital content objects thereon by interacting with the 2D interactive surface 24 or by using other input devices such as for example, a mouse or a keyboard. The SMART Notebook™ application also provides a mixed reality (MR) mode in a canvas page, and allows users to manipulate them by using one or more markers 62 brought into the 3D input space 60.

Figure 2:
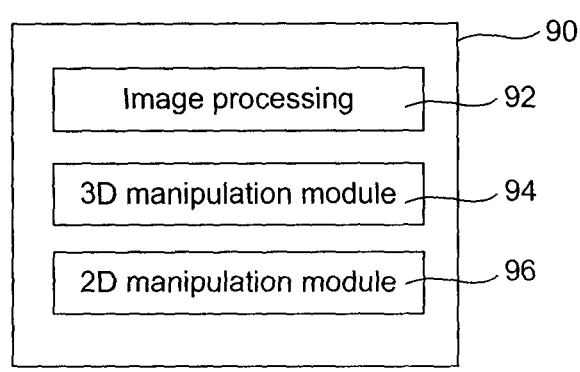
FIG. 2 is a schematic diagram showing a software architecture of the interactive input system of FIG. 1A.

FIG. 2 shows a software architecture used by the interactive input system 20, which is generally indicated using reference numeral 90. The software architecture 90 comprises an image processing module 92, a 3D manipulation module 94, and a 2D manipulation module 96. The image processing module 92 comprises functions for pre-processing images captured by the 3D input device 52. The pre-processing functions comprise, for example, adjusting any of the brightness, the clarity and the resolution of the images, and correcting any optical distortions. The image processing module 92 also superimposes digital content on the images obtained from the 3D input device 52, for display on the 2D interactive surface 24. The image processing module 92 also modifies the image displayed on the 2D interactive surface 24 based on input received from the 2D interactive surface 24 and from the 3D input space 60.

After the interactive input system 20 starts and the 3D input device 52 is switched on, the camera 54 of the 3D input device is set to a low-resolution mode with a slow frame rate so that the camera 54 captures a low-resolution image of the 3D input space 60 at regular intervals, such as for example every three (3) seconds. The image processing module 92 then processes the captured images, during which the image processing module 92 determines whether marker patterns exist within the captured images, and whether such marker patterns are recognizable. If one or more patterns are recognizable, the computing device 28 instructs the camera 54 to change to a high-resolution mode with a high frame rate, and turns the MR mode on.

Captured high-resolution images are sent from the image processing module 92 to the 3D manipulation module 94, which recognizes patterns on markers, associates digital content or tools with recognized patterns, and identifies any user gestures based on user input in the 3D input space 60. The identified user gestures are then used to manipulate the digital content accordingly. Similarly, the 2D manipulation module 96 receives user input from the 2D interactive surface 24, and identifies any user gestures for subsequent manipulation of the digital content 64. As will be appreciated, a user may therefore manipulate digital content by applying gestures in the 3D input space 60 and/or applying gestures on the 2D interactive surface 24.

In this embodiment, a 3D scene, such as for example a SMART Notebook™ canvas page comprising 3D objects, may be conditioned to either a 2D translation (movement) mode or to a 3D translation mode. When a 3D scene is conditioned to the 2D translation mode, dragging a 3D object (i.e., applying a pointer to contact the 2D interactive surface 24 on the image of the 3D object, and moving the pointer while maintaining the pointer contact thereon) to a different location on the 2D interactive surface 24 causes the 3D object to be updated in a 2D manner, namely the 3D object is moved without changing its perspective, as if it were a 2D object. When a 3D scene is conditioned to the 3D translation mode, dragging a 3D object to a different location on the 2D interactive surface 24 causes the 3D object to be updated in a 3D manner, namely the perspective of the 3D object changes as if it were being moved in a 3D space.

Figure 3A:
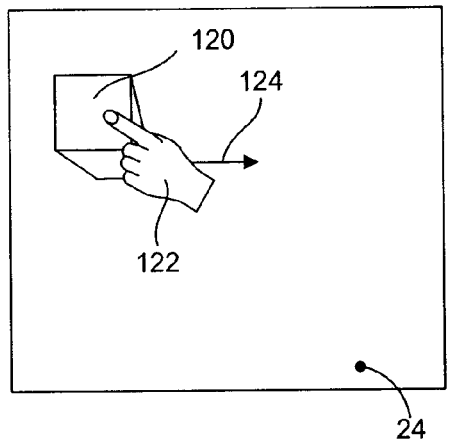
FIGS. 3A and 3B illustrate translation of a 3D object on a two-dimensional (2D) interactive surface forming part of the interactive input system of FIG. 1A, in a 2D translation mode.
Figure 3B:
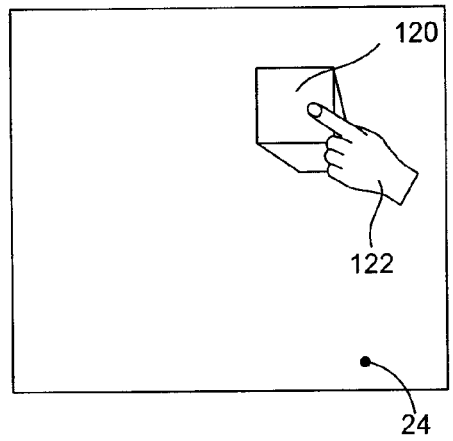

FIGS. 3A and 3B show an example of a 3D object 120 being moved in the 2D translation mode. In this embodiment, the 2D translation mode is the default translation mode and does not need to be selected. In FIG. 3A, a pointer 122 corresponding to a user's finger touches the 3D object 120 on the 2D interactive surface 24, and drags the 3D object 120 to the right, as indicated by the arrow 124. In FIG. 3B, the pointer 122 has completed dragging the 3D object 120 on the 2D interactive surface 24. Although the 3D object 120 has been moved to a different location, its perspective has not changed.

Figure 4A:
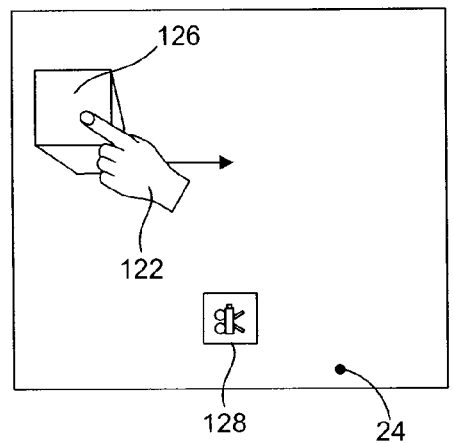
FIGS. 4A and 4B illustrate translation of a 3D object on the 2D interactive surface of FIGS. 3A and 3B, in a 3D translation mode.
Figure 4B:
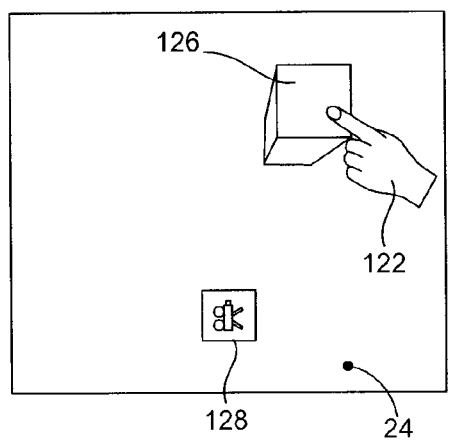

FIGS. 4A and 4B show an example of a 3D object 126 being moved in the 3D translation mode. To select this mode, a camera icon 128 forming part of a toolbar (not shown) displayed on the 2D interactive surface 24 is dragged from the toolbar and dropped to a position on the 2D interactive surface 24. The interactive input system 20 system uses the (x, y) coordinates of the icon 128 on the 2D interactive surface 24 and a predefined z-coordinate to calculate a 3D viewpoint for viewing the 3D object 126, and updates the perspective of the 3D object 126 accordingly during movement. In FIG. 4A, the pointer 122 touches the 3D object 126 on the 2D interactive surface 24, and drags it to the right. In FIG. 4B, the pointer 122 has completed dragging the 3D object 126 on the 2D interactive surface 24. The image of the 3D object 126 has been updated such that its perspective has varied in accordance with respect to the 3D viewpoint, as calculated based on the location of the camera icon 128.

Figure 5:
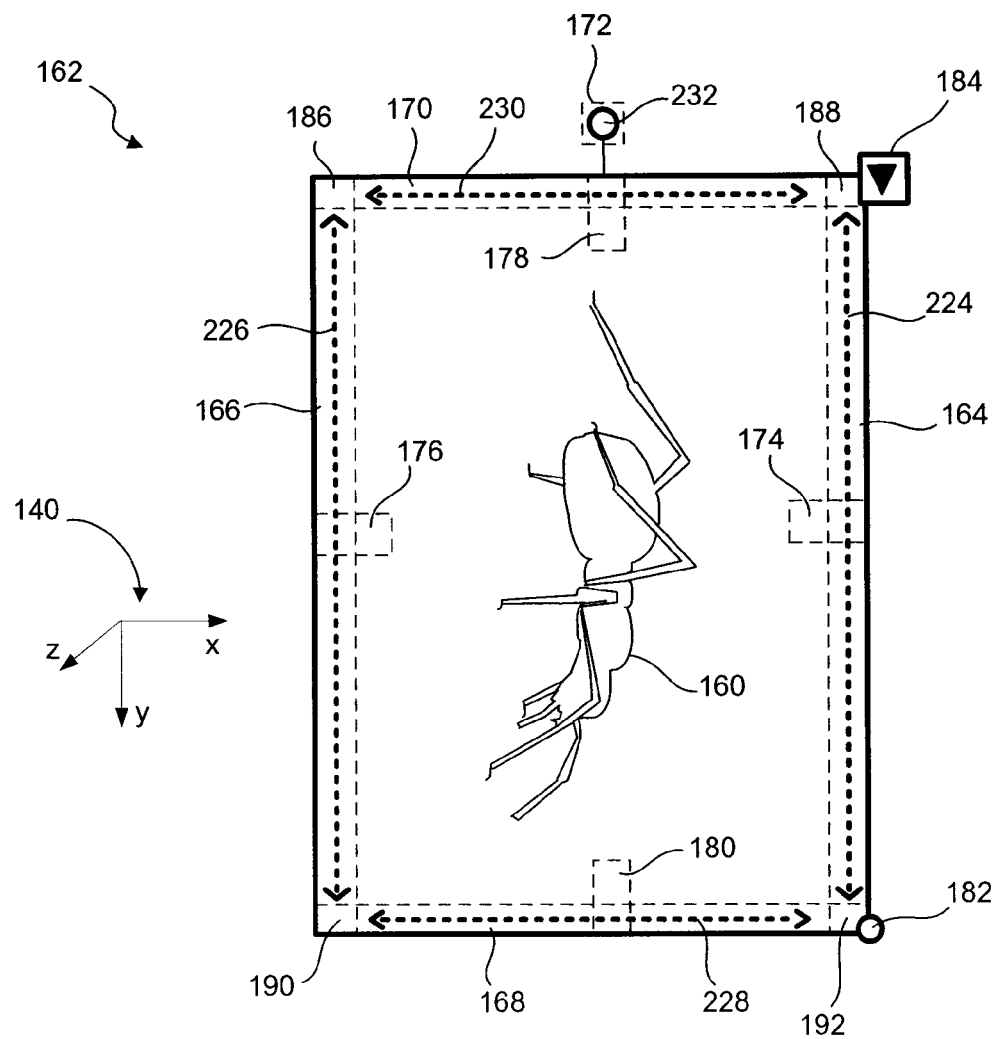
FIG. 5 illustrates a selection box for manipulating a 3D object on the 2D interactive surface.

In this embodiment, a selection box is associated with each 3D object. The selection box appears as surrounding the associated 3D object when the 3D object is selected by a user, and disappears when the 3D object is deselected or is manipulated in some prescribed manners, such as for example, by rotating. FIG. 5 shows a selection box 162 associated with a 3D object 160, as displayed on the 2D interactive surface 24. The selection box 162 comprises several control regions that a user can interact with to manipulate the 3D object 160. At least some of the control regions are represented by control handle images. In the example shown in FIG. 5, these control regions are indicated by dashed lines. However, it will be understood that the dashed lines do not appear in the actual user interface, and are shown for ease of reference only.

In this embodiment, each 3D object on the 2D interactive surface 24 has a respective 3D object coordinate system associated therewith, with the x-y plane of the 3D object coordinate system being parallel to the 2D interactive surface 24 and with the z-axis being perpendicular to the x-y plane. FIG. 5 shows an example of the 3D object coordinate system 140 associated with the 3D object 160. When a user rotates a 3D object about the x- or y-axis of the 3D object coordinate system, the direction of the z-axis of the 3D object coordinate system does not change, such that rotation of the 3D object about the z-axis always rotates the 3D object on a plane parallel to the 2D interactive surface 24. However, when a user rotates a 3D object about the z-axis, the x- and y-axes of the 3D object coordinate system, and the selection box, are rotated together with the 3D object.

In the example shown in FIG. 5, the x-rotation zones 164 and 166 of the selection box 162, which are represented by respective control handles 224 and 226 in the form of slider bars, allow a user to rotate the 3D object 160 about the x-axis (i.e., the rotation direction is on the y-z plane) by touching a pointer on the 2D interactive surface 24 within the x-rotation zone 164 or 166 and dragging the pointer along the y-axis. Those skilled in the art will appreciate that the pointer drag direction does not need to be precisely along the y-axis. Rather, components of the pointer dragging direction are projected by the interactive input system 20 onto the x- and y-axes, and components projected onto the x-axis are disregarded. Moreover, when the 3D object 160 is rotated about the x-axis, the interactive input system 20 allows the pointer to be dragged out of the x-rotation zones, while maintaining the x-rotation of the 3D object 160. The x-rotation is completed when the pointer is lifted from the 2D interactive surface 24.

The y-rotation zones 168 and 170, which are represented by control handles 228 and 230, respectively, allow the user to rotate the 3D object 160 about the y-axis by applying a pointer on the 2D interactive surface 24 within the y-rotation zone 168 or 170 and dragging the pointer along the x-axis, in a manner similar to the manipulation in the x-rotation zones 164 and 166 described above. The z-rotation zone 172 represented by the z-rotation control handle 232 allows the user to rotate the 3D object 160 about the z-axis. Control regions 174, 176, 178 and 180 provide additional areas for rotation. Applying a pointer on the 2D interactive surface 24 inside the region 174 or 176 and dragging the pointer to left or right rotates the 3D object 160 about the y-axis. Applying a pointer on the 2D interactive surface 24 inside the region 178 or 180 and dragging the pointer up or down rotates the 3D object 160 about the x-axis.

Other control regions are also defined in the selection box 162. Dragging the resizing control handle 182 scales the 3D object 160. Selecting contextual menu button 184 causes a contextual menu (not shown) related to the object 160 to pop-up and be displayed on the 2D interactive surface 24. The contextual menu includes menu items for, various functions, such as, for example, setting the 3D object back to the default view, activating continuous spinning of the 3D object 160 about a user-selected axis, starting or stopping continuous spinning, and applying different rendering styles such as wireframe mode or other modes and enabling reflections. Dragging any of the corner areas 186, 188, 190 and 192 between each neighbouring pair of control handles 164 to 170 activates an arcball free rotation tool (not shown), which allows the user to freely rotate the 3D object in any direction in the 3D object coordinate system 140 about a rotation center, which in this embodiment is the center of the selection box 162.

Figure 6A:
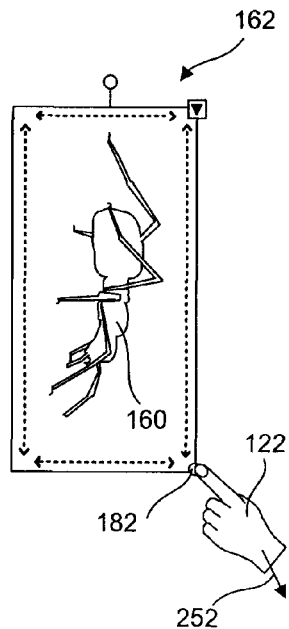
FIGS. 6A to 6C illustrate resizing of a 3D object using a resizing control handle of the selection box of FIG. 5.
Figure 6B:
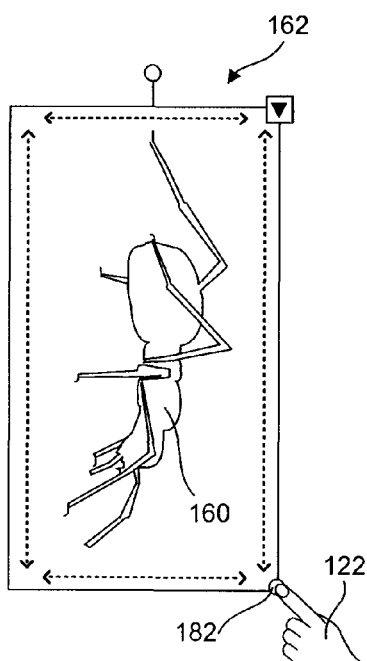
Figure 6C:
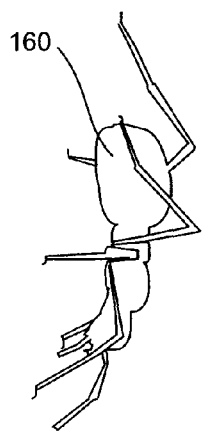

FIGS. 6A to 6C show resizing of the 3D object 160 using the resizing control handle 182 of the selection box 162. In FIG. 6A, a pointer 122 touches the resizing control handle 182 and drags it outwards by a desired amount, as indicated by the arrow 252. The selection box 162 and the 3D object 160 are then enlarged to a size consistent with the amount of drag, as shown in FIG. 6B. Once the pointer releases the resizing control handle 182 and touches a location outside of the selection box 162, the selection box 162 disappears and the 3D object 160 remains enlarged, as shown in FIG. 6C.

Figure 7A:
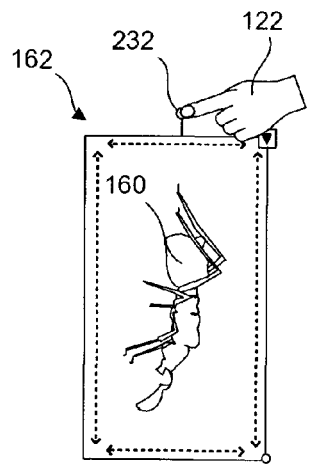
FIGS. 7A to 7D illustrate rotation of a 3D object about the z-axis using a z-rotation control handle of the selection box of FIG. 5.
Figure 7B:
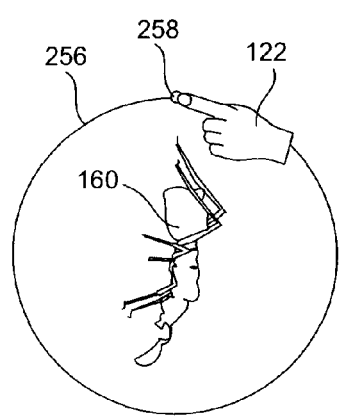
Figure 7C:
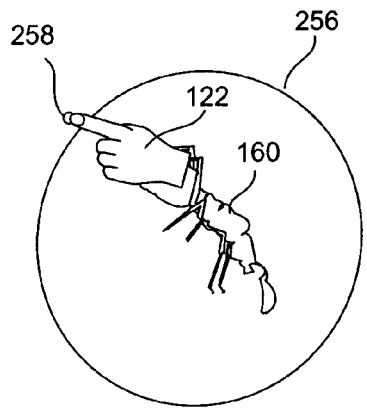
Figure 7D:
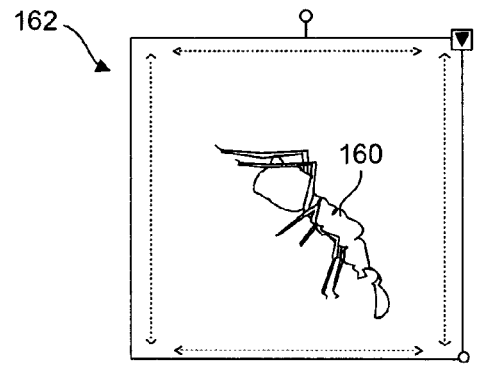

FIGS. 7A to 7D show rotation of the 3D object 160 about the z-axis using the z-rotation control handle 232 of the selection box 162. In FIG. 7A, the pointer 122 touches the z-rotation control handle 232 of the selection box 162. In response, the selection box 162 disappears, and a circular rotation indicator 256 encircling the 3D object 160 appears, as shown in FIG. 7B. A free rotation control element 258 also appears on the circular rotation indicator 256 at a location corresponding to the touch location of the pointer. The 3D object 160 is rotated by moving the control element 258 around the circular rotation indicator 256. Dragging the control element 258 counter-clockwise with the pointer 122 along the circular rotation indicator 256 causes the 3D object 160 to rotate counter-clockwise, as shown in FIG. 7C. When the pointer 122 is lifted from the 2D interactive surface 24, as shown in FIG. 7D, the circular rotation indicator 256 disappears, the selection box 162 reappears, and the 3D object 160 remains in the newly rotated position.

Figure 8A:
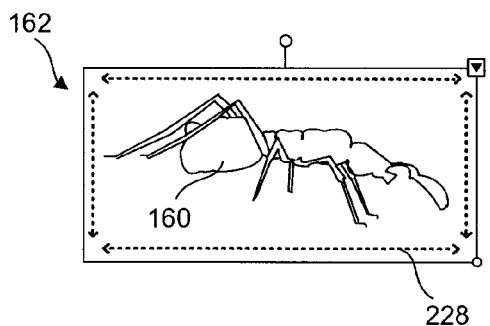
FIGS. 8A to 8D illustrate rotation of a 3D object about the y-axis using y-axis slider control handles of the selection box of FIG. 5.
Figure 8B:
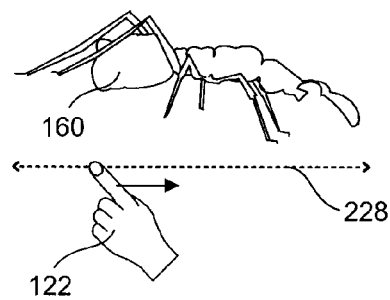
Figure 8C:
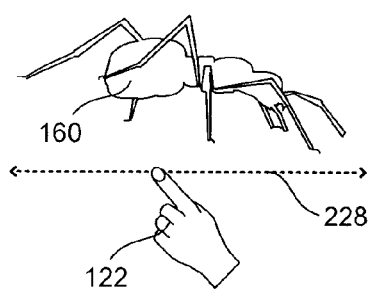
Figure 8D:
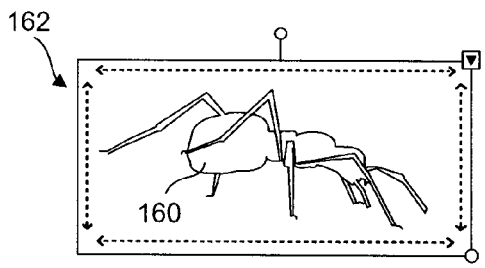

FIGS. 8A to 8D show rotation of the 3D object 160 about the y-axis using the control handle 228 of the selection box 162. In FIG. 8A, the 3D object 160 has been selected and the selection box 162 has appeared around the 3D object 160. When the pointer 122 touches the control handle 228 and slides it horizontally to the right, as shown in FIG. 8B, the control handle 228 remains visible to provide a rotation indicator, and other portions of the selection box 162 disappear. This provides feedback to the user that rotation is restricted to about the y-axis. When the pointer 122 slides to the right on the control handle 228, the 3D object 160 is rotated proportionally about the y-axis, as shown in FIG. 8C. A color variation (not shown) on the control handle 228 provides feedback to the user as to the amount of rotation of the 3D object 160. When the pointer 122 is lifted from the 2D interactive surface 24, the rotation indicator, namely the colored control handle 228, disappears and the selection box 162, including the control handle 228 without color variation, re-appears around the 3D object 160, as shown in FIG. 8D. The 3D object 160 remains in the newly rotated position.

Figure 9A:
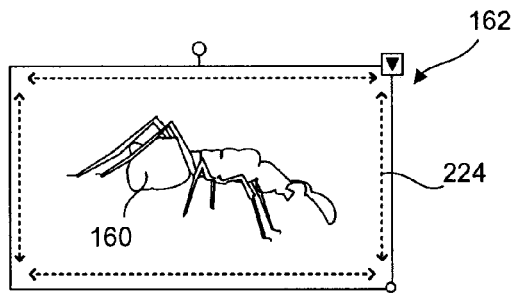
FIGS. 9A to 9D illustrate rotation of a 3D object about the x-axis using x-axis slider control handles of the selection box of FIG. 5.
Figure 9B:
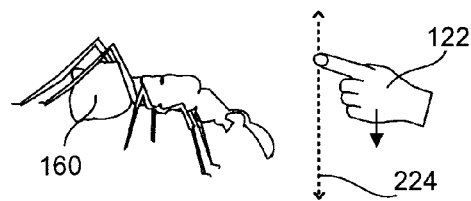
Figure 9C:
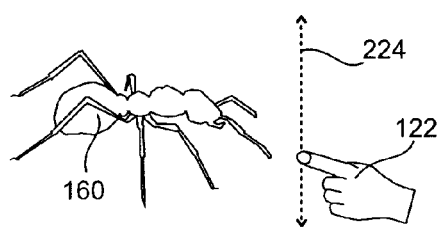
Figure 9D:
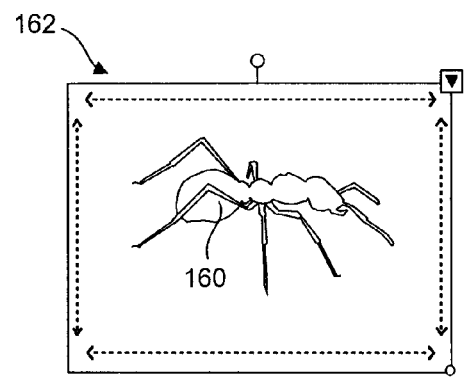

FIGS. 9A to 9D show rotation of the 3D object 160 about the x-axis using the control handle 224 of the selection box 162. In FIG. 9A, the 3D object 162 has been selected and the selection box 162 has appeared around the 3D object 160. When the pointer 122 touches the control handle 224 and slides vertically downwards, as shown in FIG. 9B, the control handle 224 remains as a rotation indicator, and other portions of the selection box 162 disappear. This provides feedback to the user that the rotation is restricted to about the x-axis. When the pointer 122 is slid downwardly, the 3D object 160 is rotated proportionally about the x-axis, as shown in FIG. 9C. A color variation (not shown) on the control handle 224 provides feedback to the user as to the amount of rotation of the 3D object 160. When the pointer 122 is lifted from the 2D interactive surface 24, the rotation indicator, namely the colored control handle 224, disappears and the selection box 162, including the control handle 224 without color variation, re-appears around the 3D object 160, as shown in FIG. 9D. The 3D object 160 remains in the newly rotated position.

Figure 10A:
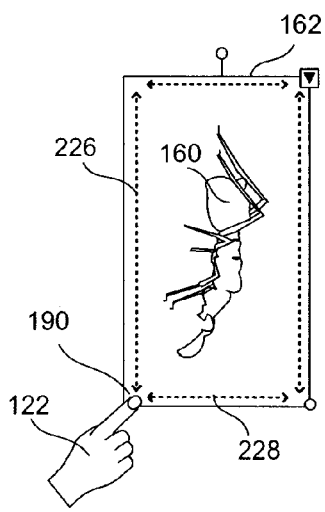
FIGS. 10A to 10D illustrate rotation of a 3D object using an arc ball free rotation tool of the selection box of FIG. 5.
Figure 10B:
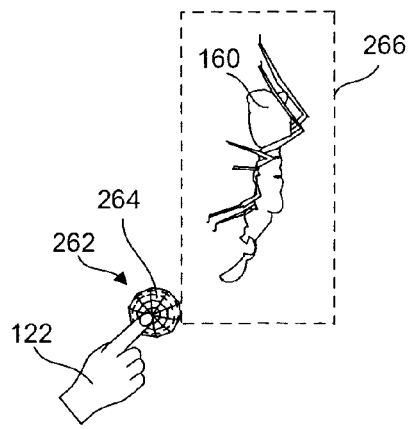
Figure 10C:
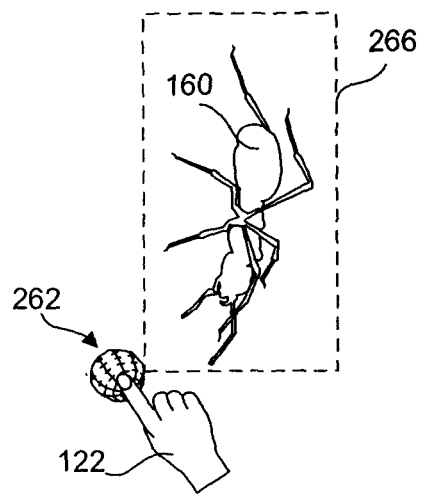

FIGS. 10A to 10D show rotation of the 3D object 160 in the 3D space using an arcball free rotation tool of the selection box 162. When an area 190 between control handles 226 and 228 of the selection box 162 is touched by the pointer 122, as shown in FIG. 10A, the selection box 162 disappears and a rotation indicator comprising an arcball free rotation tool 262 appears, as shown in FIG. 10B. The arcball free rotation tool 262 is positioned at a corner of the selection box 162 nearest to the touch point and a boundary box 266, which appears surrounding the 3D object 160. The arcball free rotation tool 262 comprises a grid pattern 264 to provide the user with feedback indicating the amount of rotation. The arcball free rotation tool 262 is operated by touching the pointer 122 on the 2D interactive surface 24 at a position within the arcball free rotation tool 262, and then moving the pointer 122 on the 2D interactive surface 24. When movement of the pointer 122 is detected, the movement is interpreted as rotation of the arcball free rotation tool 262 and the 3D object 160 is rotated in the direction of the movement of the pointer 122, as shown in FIG. 10C. When the pointer 122 is lifted from the 2D interactive surface 24, either for greater than a predetermined period of time or immediately when the pointer 122 touches another location on the 2D interactive surface 24, the boundary box 266 disappears and the selection box 162 reappears around the 3D object 160. The 3D object 160 remains in the newly rotated position (not shown). As will be understood, the arcball free rotation tool 262 allows the 3D object 160 to be freely rotated in any direction in 3D space.

Figure 10D:
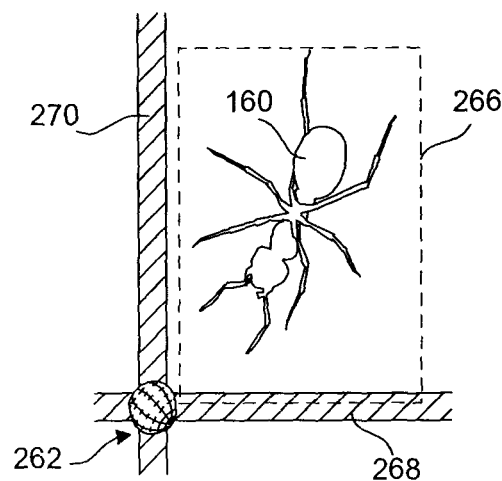

In this embodiment, the arcball free rotation tool 262 also provides a snap-to-axis function. A horizontal region 268 and a vertical region 270 are defined as snap-to-axis zones, as shown in FIG. 10D. If the pointer 122 is moved to within the horizontal region 268 while the arcball free rotation tool 262 is being rotated, the rotations of the arcball free rotation tool 262 and of the 3D object 160 are restricted to rotation about the y-axis. Similarly, if the pointer 122 is moved to within the vertical region 270 while the arcball free rotation tool 262 is being rotated, the rotations of the arcball free rotation tool 262 and of the 3D object 160 are restricted to rotation about the x-axis. In this embodiment, when the pointer 122 moves into one of the regions 268 or 270 while the arcball free rotation tool 262 is being rotated, the respective snap-to-axis region is highlighted, such as for example by filling with a semi-transparent color, indicating that the rotation is now restricted to about the x-axis or the y-axis. When the pointer moves out of the region, the highlighting of the snap-to-axis region disappears, and the arcball free rotation tool 262 and the 3D object 160 are again freely rotated according to the movement of the pointer 122.

FIGS. 11A to 11E show a flowchart of the steps of a 3D object manipulation method used by the interactive input system 20. The 3D object manipulation method is carried out by computing device 28 for rotating or moving the 3D object on the 2D interactive surface 24 based on pointer events received by the computing device 28 from the interactive board 22. As will be understood, a pointer event may be any of a pointer-down event that occurs when a pointer is brought into contact on the 2D interactive surface 24, a pointer-move event that occurs when the pointer is moved from one location to another on the 2D interactive surface 24 while maintaining continuous contact with the 2D interactive surface 24, and a pointer-up event that occurs when the pointer is lifted from the 2D interactive surface 24.

Figure 11A:
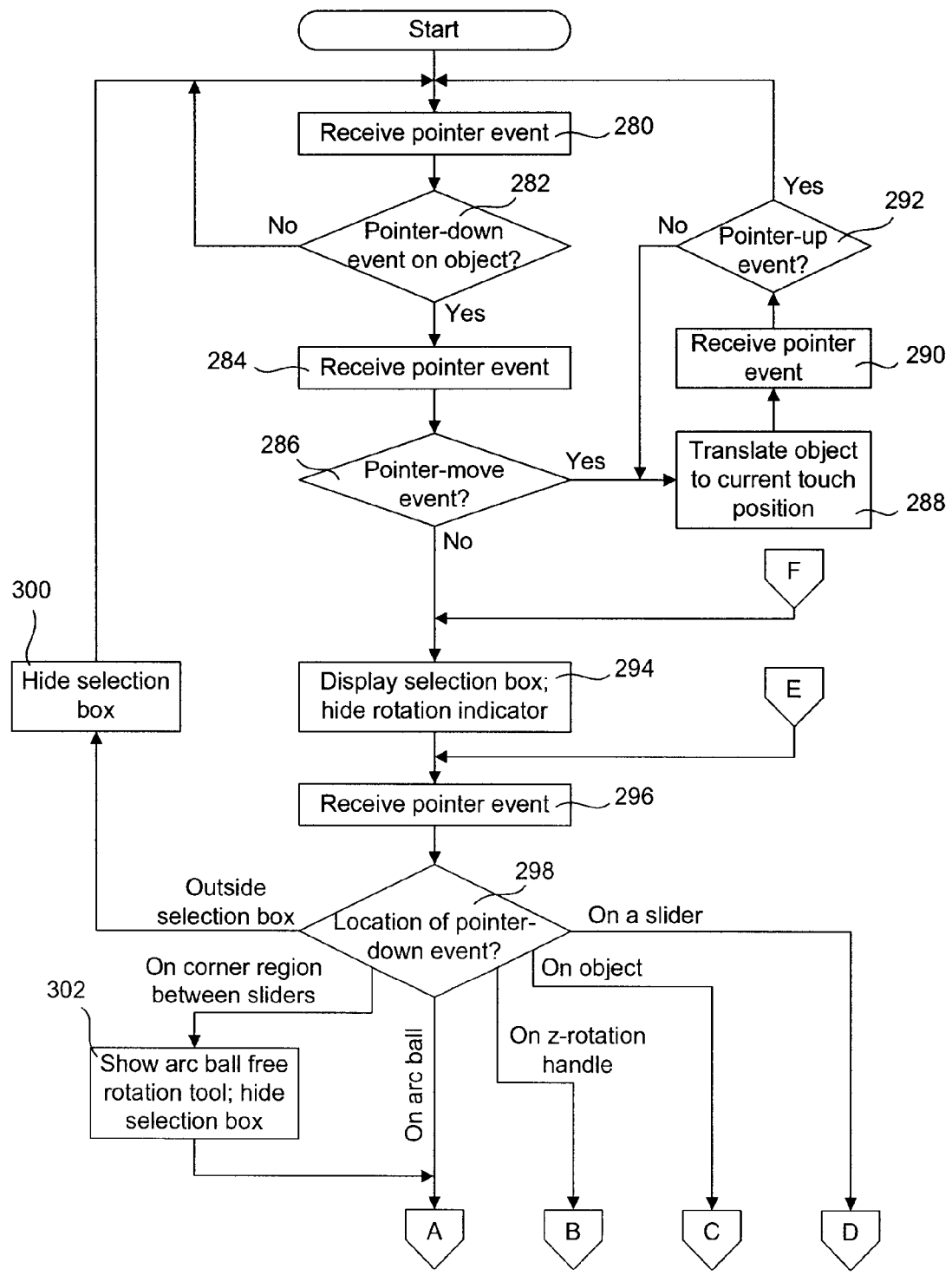
FIGS. 11A to 11E show a flowchart of the steps performed during manipulation of a 3D object on the 2D interactive surface.

Turning to FIG. 11A, when the computing device 28 receives a pointer event (step 280), the computing device 28 determines if the received pointer event is a pointer-down event occurring at a position on the 2D interactive surface 24 within the 3D object (step 282), signifying that the 3D object has been touched by a user. If the pointer event is not a pointer-down event, then the method proceeds to step 280 to await the next pointer event. If, at step 282, the pointer event is a pointer-down event, then computing device 28 waits to receive the next pointer event (step 284). When the next pointer event is received, the computing device 28 checks to determine if the next pointer event is a pointer-move event (step 286). If the next pointer event is a pointer-move event, the computing device 28 translates the location of the 3D object to the location of the pointer, namely the location at which the pointer-move event has occurred (step 288). The computing device 28 then waits to receive the next pointer event (step 290). After the next pointer event is received, the computing device 28 checks to determine if the next pointer event is a pointer-up event (step 292). If next the pointer event is not a pointer-up event, such as for example if the next pointer event is a pointer-move event, the method proceeds to step 288 to translate the location of the 3D object to the location of the pointer. If, at step 292, the pointer event is a pointer-up event, then the method proceeds to step 280 to receive the next pointer event.

If, at step 286, the pointer event is not a pointer-move event, meaning that the pointer event is a pointer-up event, then the computing device 28 displays the selection box 162 enclosing the 3D object and hides the rotation indicator, including any boundary box 266 and any arcball free rotation tool 262, if the rotation indicator is currently shown (step 294). The computing device 28 then waits to receive the next pointer event (step 296), which will be a pointer-down event. When the next pointer event is received, the computing device 28 determines the location of the pointer-down event (step 298).

If at step 298 the pointer-down event occurs outside the selection box 162 surrounding the 3D object, the computing device 28 hides the selection box 162 (step 300), and the method proceeds to step 280 to receive the next pointer event. If at step 298, the pointer-down event occurs on a corner region 186, 188, 190 or 192 between adjacent sliders of the selection box 162, the computing device 28 shows the rotation indicator, including the boundary box 266 and the arcball free rotation tool 262, at the corner of the selection box nearest to the pointer event location, and hides the selection box 162 (step 302). Then, the method then proceeds to step 330, shown in FIG. 11B, as illustrated by connector A.

Figure 11B:
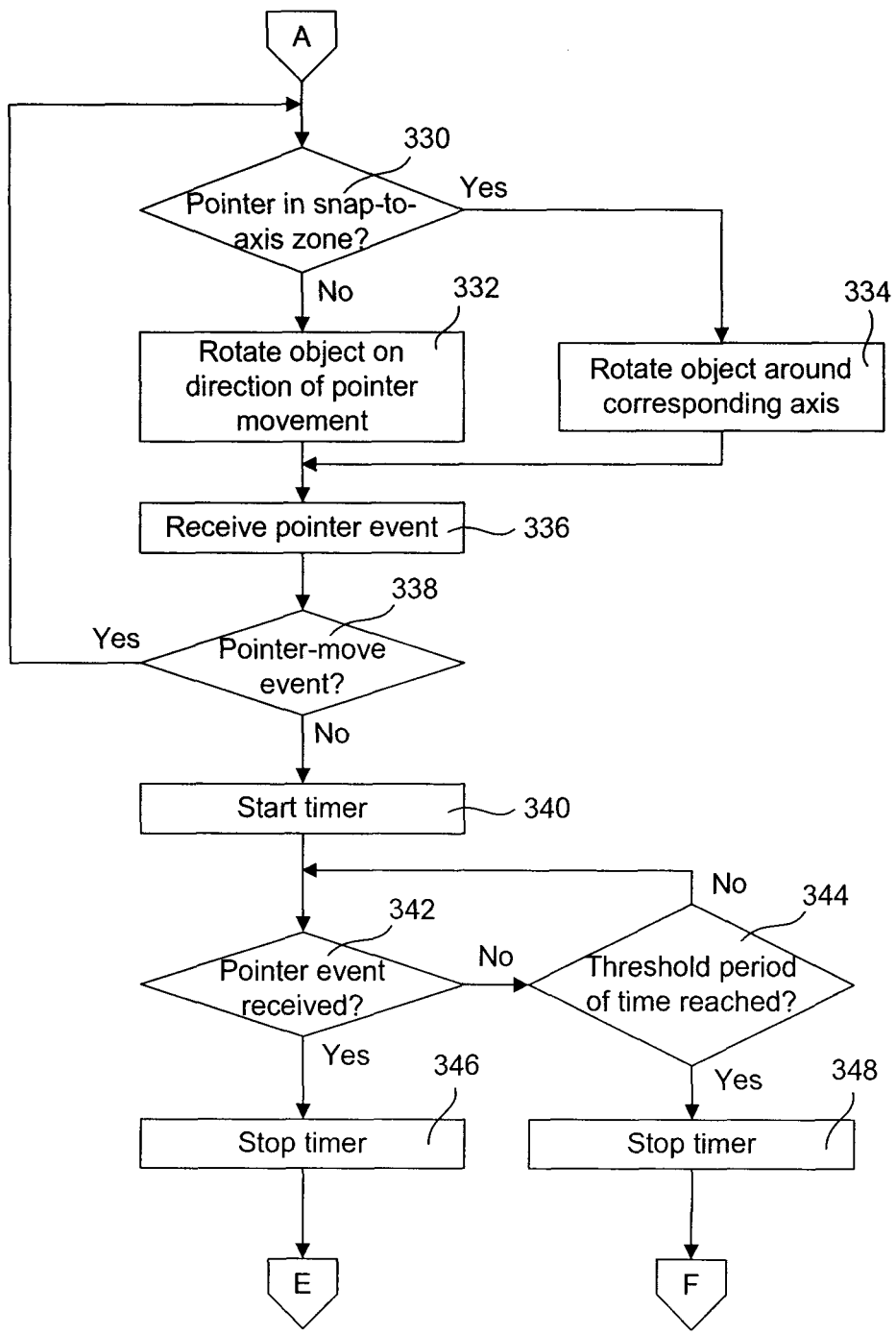

Turning now to FIG. 11B, at step 330, the computing device 28 checks to determine if the location of the pointer event is in a snap-to-axis zone. If the location of the pointer event is in a snap-to-axis zone, the computing device 28 rotates the 3D object only about the corresponding axis (step 334), and the method proceeds to step 336. For example, if the location of the pointer event is in the horizontal snap-to-axis zone 268, as shown in FIG. 10D, then the 3D object is rotated about the y-axis only. If the location of the pointer event is in the horizontal snap-to-axis zone 270, then the 3D object is rotated about the x-axis only.

Turning again to FIG. 11B, if at step 330, the location of the pointer event is not in a snap-to-axis zone, the computing device 28 rotates the 3D object in the direction of the pointer movement (step 332) and the method proceeds to step 336. At step 336, the computing device 28 receives the next pointer event. The computing device 28 then checks to determine if the pointer event is a pointer-move event (step 338). If the pointer event is a pointer-move event, the method proceeds to step 330. If the pointer event is not a pointer-move event, meaning that the pointer event is a pointer-up event, then the computing device 28 starts a timer (step 340), and checks to determine if the next pointer event is received (step 342). If no pointer event is received, the computing device 28 then checks the timer to determine if a threshold period of time from the previous pointer event has passed (step 344). If the threshold time period has not passed, the method returns to step 342. If the threshold time period has passed, then the computing device 28 stops the timer (step 348), and the method returns to step 294 in FIG. 11A, as illustrated by connector F.

If at step 342, a pointer event, which will be a pointer-down event, is received, then the computing device 28 stops the timer (step 346), and the method returns to step 296 in FIG. 11A, as illustrated by connector E.

Turning again to FIG. 11A, if at step 298, the arcball free rotation tool 262 is shown and the pointer-down event occurs on the arcball free rotation tool, the method proceeds to step 330 in FIG. 11B, illustrated by connector A.

Figures 11C, 11D:
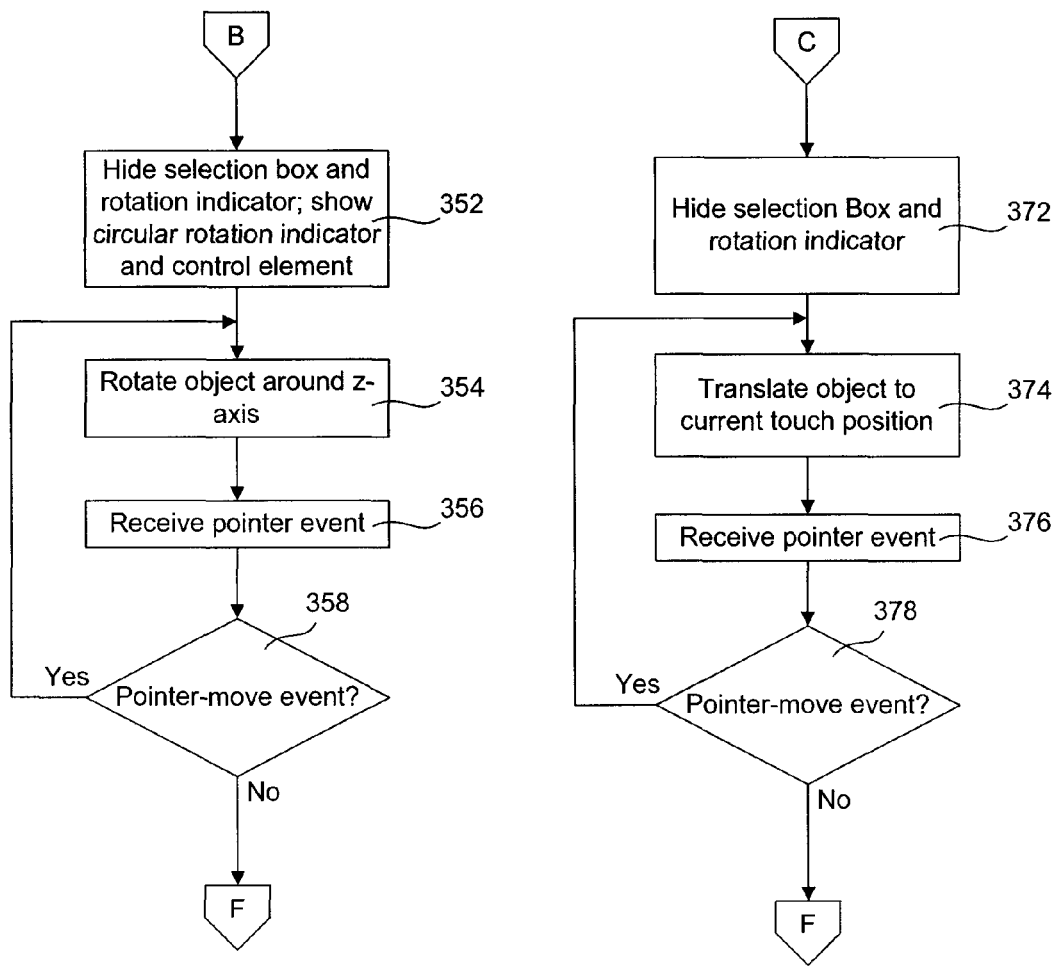

If at step 298, the pointer-down event occurs on the z-rotation control handle 232, then the method proceeds to step 352 in FIG. 11C, illustrated by connector B. At step 352, the computing device 28 hides the selection box 162 and the rotation indicator, if they are currently shown, and displays the circular rotation indicator 256 around the 3D object as well as the free rotation control element 258 (step 352). At step 354, the computing device 28 rotates the 3D object about the z-axis based on user movement of the control element 258 around the circular rotation indicator 256. The computing device 28 then waits to receive the next pointer event (step 356). After the next pointer event is received, the computing device 28 checks to determine whether the pointer event is a pointer-move event (step 358). If the pointer event is a pointer-move event, the method proceeds to step 354 to rotate the 3D object; otherwise, the method returns to step 294 in FIG. 11A, as illustrated by connector F.

Turning once again to FIG. 11A, if at step 298, the location of the pointer-down event is on the 3D object, the method proceeds to step 372 in FIG. 11D, as illustrated by connector C. Referring to FIG. 11D, at step 372 the computing device 28 hides the selection box 162 and rotation indicator, if they are currently shown (step 372), and translates the 3D object to the current pointer location on the 2D interactive surface 24 (step 374). The computing device 28 then waits to receive the next pointer event (step 376). After the next pointer event is received, the computing device 28 checks to determine whether the pointer event is a pointer-move event (step 378). If the pointer event is a pointer-move event, the method returns to step 374 to update the location of the 3D object; otherwise, the method returns to step 294 in FIG. 11A, as illustrated by connector F.

Figure 11E:
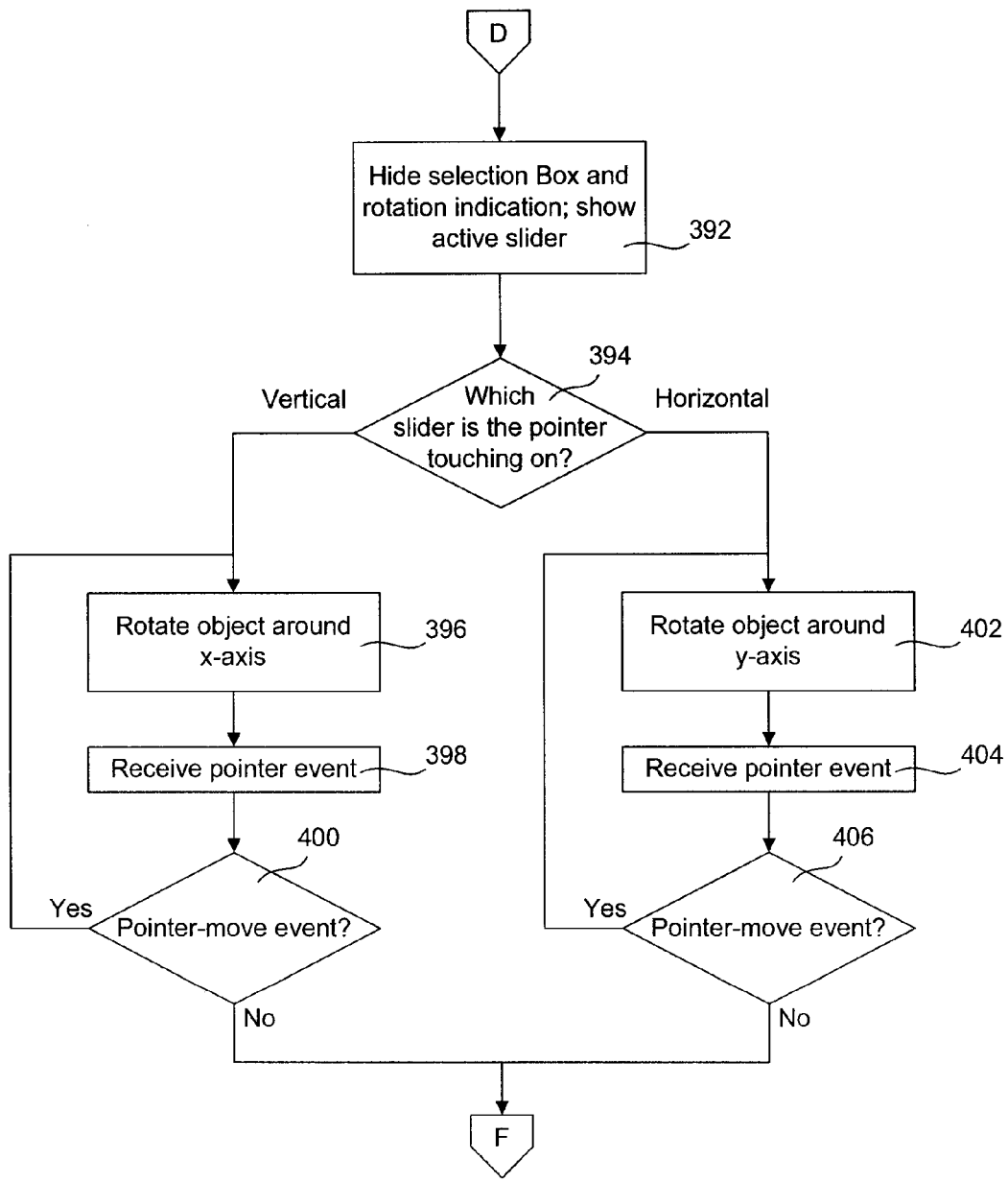

Referring to FIG. 11A, at step 298, if the location of the pointer-down event is on a slider bar of the selection box 162, the method proceeds to step 392 in FIG. 11E, as illustrated by connector D. Referring to FIG. 11E, at step 392, the computing device 28 hides the selection box 162 and the rotation indicator, if they are currently shown, and shows the slider coinciding with the location of the pointer event (step 392). The computing device 28 then determines the rotation of the 3D object based on which slider is being contacted by the pointer (step 394). If the pointer is touching a vertical slider, namely control handle 224 or 226, then the computing device 28 rotates the 3D object about the x-axis (step 396). The computing device 28 then waits to receive the next pointer event (step 398). After the next pointer event is received, the computing device 28 checks to determine whether the pointer event is a pointer-move event (step 400). If the pointer event is a pointer-move event, the method returns to step 396; otherwise, the method proceeds to step 294 in FIG. 11A, as illustrated by connector F.

If at step 394, the pointer is touching a horizontal slider, namely control handle 228 or 230, then the computing device 28 rotates the 3D object about the y-axis (step 402). The computing device 28 then waits to receive the next pointer event (step 404). After the next pointer event is received, the computing device 28 checks to determine whether the pointer event is a pointer-move event (step 406). If the pointer event is a pointer-move event, the method returns to step 402; otherwise, the method proceeds to step 294 in FIG. 11A.

Figure 12A:
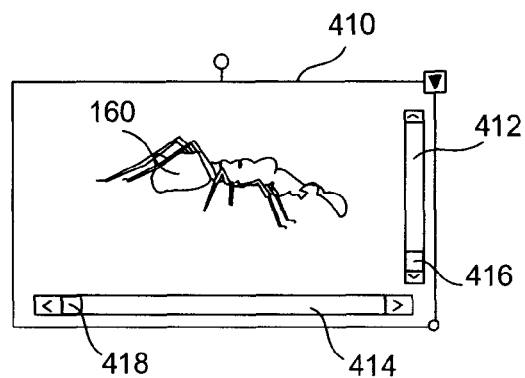
FIGS. 12A to 12C illustrate an alternative selection box for manipulating a 3D object on the 2D interactive surface.
Figure 12B:
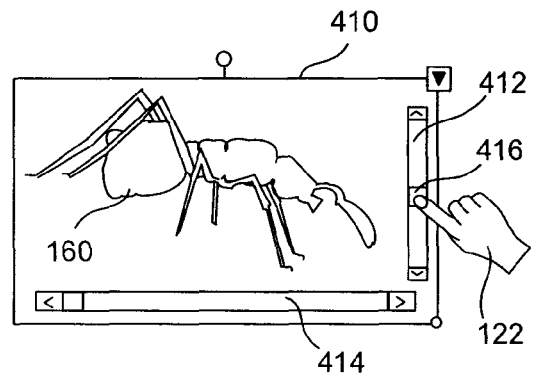
Figure 12C:
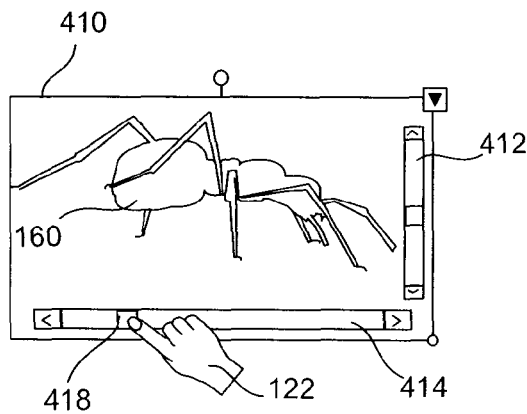

FIGS. 12A to 12C show an alternative selection box for manipulating 3D objects on the 2D interactive surface 24, and which is generally indicated using reference numeral 410. In FIG. 12A, the selection box 410 is shown enclosing a selected 3D object 160. In this embodiment, the selection box 410 comprises a vertical scroll bar 412 and a horizontal scroll bar 414 having operable control elements. In the embodiment shown, the operable control elements are movable cursors 416 and 418, respectively. The scroll bar 412 provides a resizing function, such that moving cursor 416 upwards as shown in FIG. 12B enlarges the size of the 3D object 160 while moving cursor 416 downwards reduces the size of the 3D object 160. The scroll bar 414 provides a rotation function to rotate the 3D object 160 about the y-axis such that moving cursor 418 to the right rotates the 3D object 160 to the right about the y-axis, as shown in FIG. 12C, while moving cursor 418 to the left rotates the 3D object 160 to the left about the y-axis.

Those skilled in the art will understand that, in other embodiments, other functionalities may alternatively be applied to one or more of the control handles, and that the selection box may alternatively comprise more or fewer control handles.

Although in embodiments described above, the arcball free rotation tool comprises a snap-to-axis function, in other embodiments, the arcball free rotation tool may alternatively not provide a snap-to-axis function.

Those skilled in the art will understand that, in other embodiments, the boundary box surrounding the 3D object may alternatively not appear when the arcball free rotation tool is activated.

Although in embodiments described above, the rotation indicator disappears immediately after the pointer is lifted from the x-, y- or z-rotation zone, in other embodiments, the rotation indicator may alternatively disappear only after the pointer is lifted from the x-, y- or z-rotation zone for a threshold period of time, or immediately after the pointer touches the 2D interactive surface at a position outside the respective zone.

Although in embodiments described above, the rotation indicator comprising an arcball free rotation tool appears when an area between control handles of the selection box is touched by the pointer, in other embodiments, alternatives are possible. For example, in other embodiments, after a 3D object is selected, the arcball free rotation tool may alternatively be activated when either the 3D object or a corner between adjacent sliders is touched by the pointer. In other embodiments, the arcball free rotation tool may alternatively be activated when a 3D object is selected. In still other embodiments, the 3D object may alternatively be freely rotated without showing the arc ball free rotation tool when the 3D object is touched after the selection box is displayed.

Those skilled in the art will understand that the appearances of the selection boxes and the rotation indicators described above are exemplary only, and that in other embodiments, the selection boxes and the rotation indicators may alternatively be represented by different graphics providing the same or similar functionalities. For example, in one embodiment, when a 3D object is selected, small circles appear in the control regions of the selection box to indicate to the user the existence of the control regions for manipulating the 3D object.

Those skilled in the art will also appreciate that, in other embodiments, the rotation indicator may alternatively not be displayed when the user is rotating a 3D object.

Although in embodiments described above, each 3D object on the 2D interactive surface has a respective 3D object coordinate system associated therewith, in other embodiments, all 3D objects on the 2D interactive surface share the same 3D object coordinate system, for which the x-y plane is parallel to the 2D interactive surface and the z-axis is perpendicular to the x-y plane. In this embodiment, rotating a 3D object around any of the x-, y- or z-axis does not change the direction of other axes.

Although in embodiments described above, each digital tool that is not associated with digital content has a respective representative image that is displayed on the 2D interactive surface, in other embodiments, a digital tool that is not associated with digital content may alternatively have no respective representative image displayed on the 2D interactive surface.

Although in embodiments described above, the selection tool is a digital content manipulation tool for selecting digital content, in other embodiments, the selection tool may itself be treated as a digital content object.

Although in embodiments described above, a color variation on the control handle provides feedback to the user as to the amount of rotation of the 3D object, in other embodiments, other indicators may alternatively be used with the slider bar to provide feedback to the user as to the amount of rotation of the 3D object, such as for example, a number indicating a rotation angle. In other embodiments, no feedback is alternatively provided as to the amount of rotation of the 3D object.

Figure 13A:
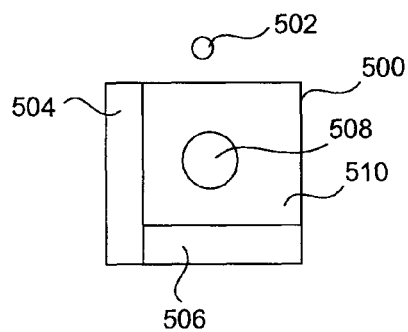
FIGS. 13A and 13B illustrate another alternative selection box for manipulating a 3D object on the 2D interactive surface.
Figure 13B:
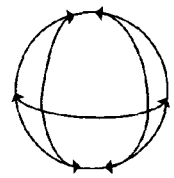

Now, turning to FIGS. 13A and 13B, another alternative selection box for manipulating a 3D object on the 2D interactive surface 24 is shown and is generally indicated by reference numeral 500. Selection box 500 surrounds a 3D object (not shown) and comprises a plurality of control regions, namely a z-rotation region 502, an x-rotation region 504, and a y-rotation region 506, all of which may be used to rotate the 3D object about its z-, x- and y-axes, respectively. Selection box 500 further comprises a free rotation region 508, and a position translation region 510 that may be used to move the 3D object to another location on the 2D interactive surface 24. Each of the rotation regions 502 to 508 has a respective visual indicator that is displayed upon selection of the 3D object. For example, FIG. 13B shows a visual indicator in the form of an arcball associated with the free rotation region 508.

Figure 14A:
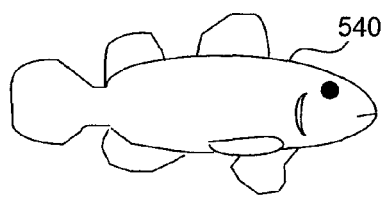
FIGS. 14A to 14F illustrate yet another alternative selection box for manipulating a 3D object on the 2D interactive surface.
Figure 14B:
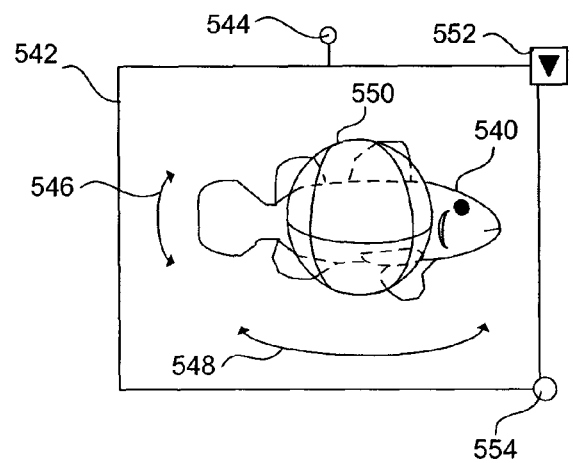
Figure 14C:
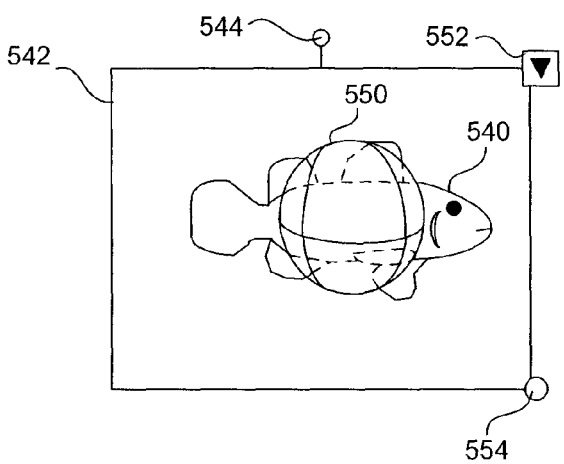

Still other alternative selection boxes for manipulating a 3D object on the 2D interactive surface 24 are possible. For example, FIG. 14A shows an unselected 3D object 540 displayed on the 2D interactive surface 24. As the 3D object 540 has not been selected, no selection box surrounds the 3D object 540. After the 3D object 540 is selected by touching with a pointer, a selection box 542 appears surrounding the 3D object 540, as shown in FIG. 14B. The selection box 542 comprises a z-rotation control handle 544, an x-rotation control handle 546, which in this example is an arc with an arrow at each end defining an x-rotation region, a y-rotation control handle 548, which in this example is an arc with an arrow at each end defining a y-rotation region, and a free rotation control handle 550 indicating a free rotation region. The selection box 542 also comprises a context menu button 552 and a resizing control handle 554. In this embodiment, the x- and y-rotation control handles 546 and 548 begin to fade out (not shown) if the selected 3D object 540 is not touched for a threshold first time period, and completely disappear, as shown in FIG. 14C, after the selected 3D object 540 has not been touched for a threshold second time period. Touching the 3D object 540 again to causes the x- and y-rotation control handles 546 and 548 to re-appear.

Figure 14D:
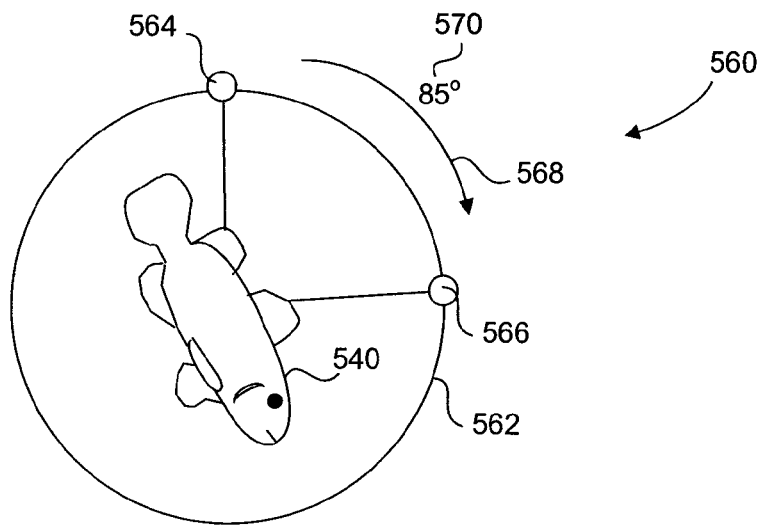

The rotation control handles 544 to 550 are used to rotate the 3D object 540. For example, touching and dragging the z-rotation control handle 544 rotates the 3D object 540 about the z-axis. During such rotation of the 3D object 540, the selection box 542 disappears and a rotation indicator 560 appears, as shown in FIG. 14D. The rotation indicator 560 comprises a circle 562, a rotation starting point indicator 564, a current rotation position indicator 566, an arrow 568 indicating the direction of rotation, and text 570 showing the angle of rotation.

Figure 14E:
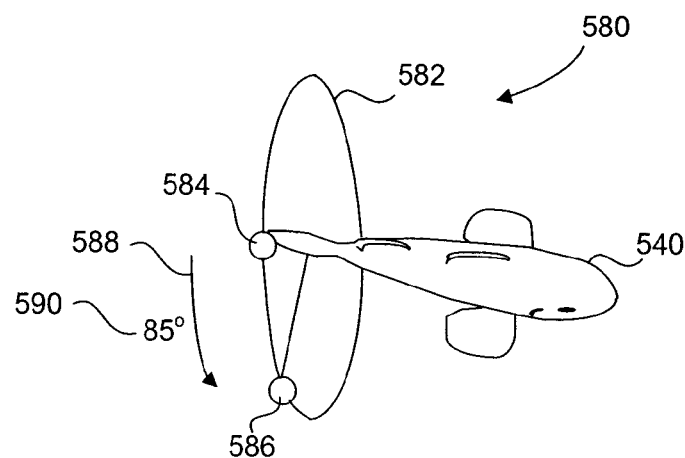

The x-rotation control handle 546 may be touched and dragged to rotate the 3D object 540 about the x-axis. During such rotation, the selection box 542 disappears and a rotation indicator 580 appears, as shown in FIG. 14E. The rotation indicator 580 comprises an elliptic circle 582, a rotation starting point indicator 584, a current rotation position indicator 586, an arrow 588 indicating the direction of rotation, and text 590 showing the angle of rotation.

Figure 14F:
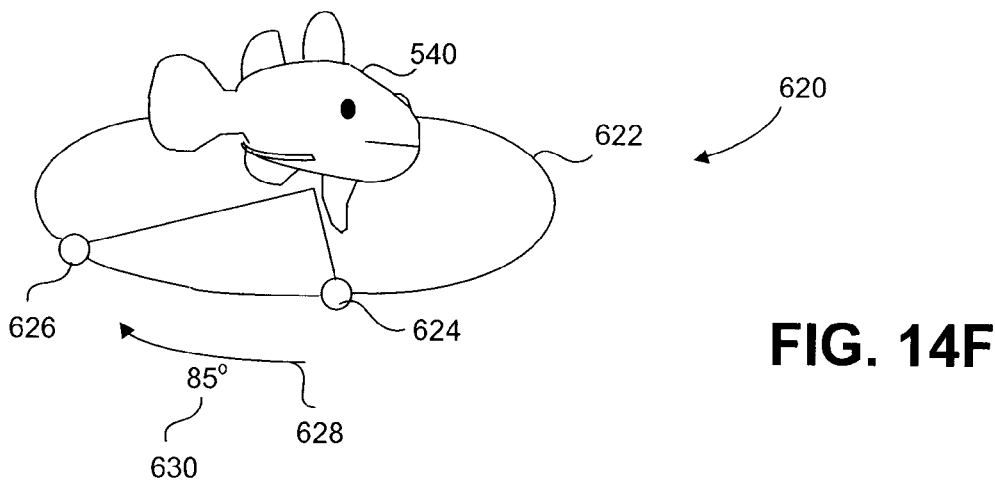

Similarly, the y-rotation control handle 548 may be touched and dragged to rotate the 3D object 540 about the y-axis. During such rotation, the selection box 542 disappears and a rotation indicator 620 appears, as shown in FIG. 14F. The rotation indicator comprises an elliptic circle 622, a rotation starting point indicator 624, a current rotation position indicator 626, an arrow 628 indicating the direction of rotation, and text 630 showing the angle of rotation.

FIGS. 15A to 15D show still another alternative selection box for manipulating a 3D object on the 2D interactive surface 24, and which is generally indicated by reference numeral 800. Selection box 800 comprises a resizing control handle 801 for manipulating the size of the 3D object 160, rotation control handles 802, 804, 806 and 808, and a context menu button 809. In this embodiment, the rotation control handles 802, 804, 806 and 808 are displayed as full visualization images, and are configured to permit manipulation of the 3D object 160, when the size of the 3D object 160 is greater than a threshold size, based on pixel size. As will be understood by those skilled in the art, the threshold size may be chosen so as to prevent rotation control handles from overlapping. When the size of the 3D object is smaller than the threshold size, the rotation control handles 802, 804, 806 and 808 are displayed as compact visualization images, and their manipulation functionalities are disabled. In this embodiment, the full visualization images of rotation control handles 802, 806 and 808 are arcs each with arrows on both ends, and the compact visualization images thereof are dots. The full and compact visualization images of the rotation control handle 804 are arc balls of large and small sizes, respectively.

Each of the rotation control handles 802, 804, 806 and 808 has a respective function. In the embodiment shown, the z-rotation control handle 802 is configured for rotating the 3D object 160 about the z-axis, the x-rotation control handle 806 is configured for rotating the 3D object 160 about the x-axis, the y-rotation control handle 808 is configured for rotating the 3D object 160 about the y-axis, and the free rotation control handle 804 is configured for freely rotating the 3D object 160 in any direction.

Figure 15A:
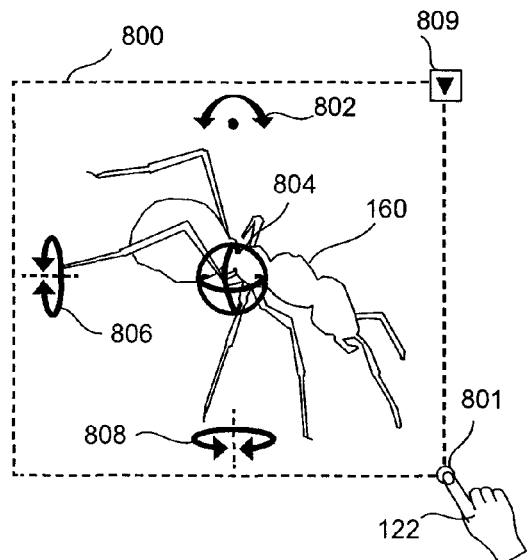
FIGS. 15A to 15D illustrate yet another alternative selection box for manipulating a 3D object on the 2D interactive surface.

The resizing control handle 801 may be used to change the size of the 3D object 160, as shown in FIG. 15A. Moving the resizing control handle 801 inwardly reduces the size of the 3D object 160, while moving the resizing control handle 801 outwardly increases the size of the 3D object 160.

Figure 15B:
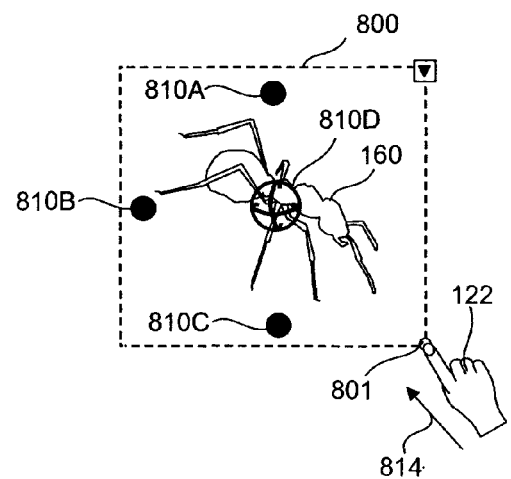

In FIG. 15B, both the selection box 800 and 3D object 160 have been decreased in size as a result of a user selecting and dragging the resizing control handle 801 inwardly, and in a direction indicated by arrow 814. This resizing has decreased the size of the 3D object 160 to below the threshold size, which in turn has caused the rotation control handles 802, 804, 806 and 808 to transition from full visualization images to compact visualization images, shown as dots 810A, 810B and 810C and mini-arcball 810D, at locations previously occupied by the full visualization images 802, 806, 808 and 804, respectively. In this embodiment, this transition is smooth, such that the full visualization images fade out and the compact visualization images fade in.

Figure 15C:
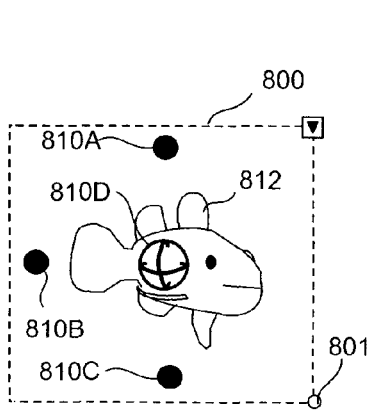
Figure 15D:
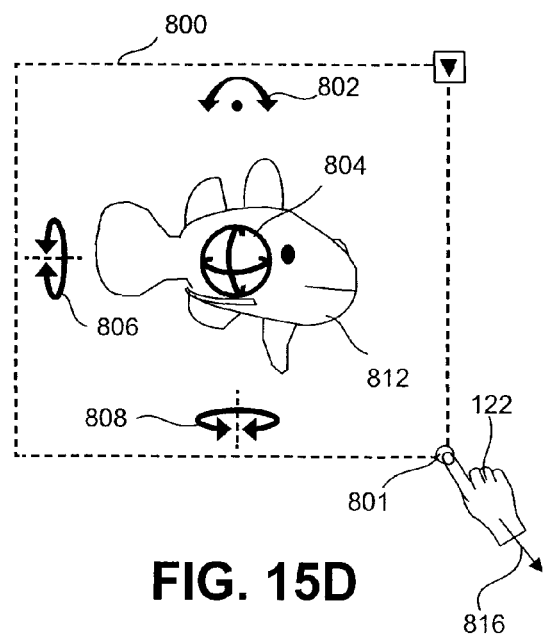

In FIG. 15C, a 3D object 812 has been selected by a user, and the selection box 800 has appeared surrounding the 3D object 812. As the size of the 3D object 812 is smaller than the threshold size, the z-, x-, y- and free rotation control handles are shown as dots 810A, 810B, 810C and 810D, respectively. When the resizing control handle 801 is dragged outwardly by a pointer 122, in a direction indicated by arrow 816, and the size of the 3D object is increased to above the threshold size, the compact visualization images of rotation control handles, namely dots 810A, 810B and 810C and mini-arcball 804D, transition to full visualization images 802, 806, 808 and 804, as shown in FIG. 15D. In this embodiment, this transition is smooth, such that the compact visualization images fade out as the full visualization images fade in. The 3D object 812 may now be rotated about the z-, x- or y-axis or in any direction using the pointer 122, for example.

Figure 16:
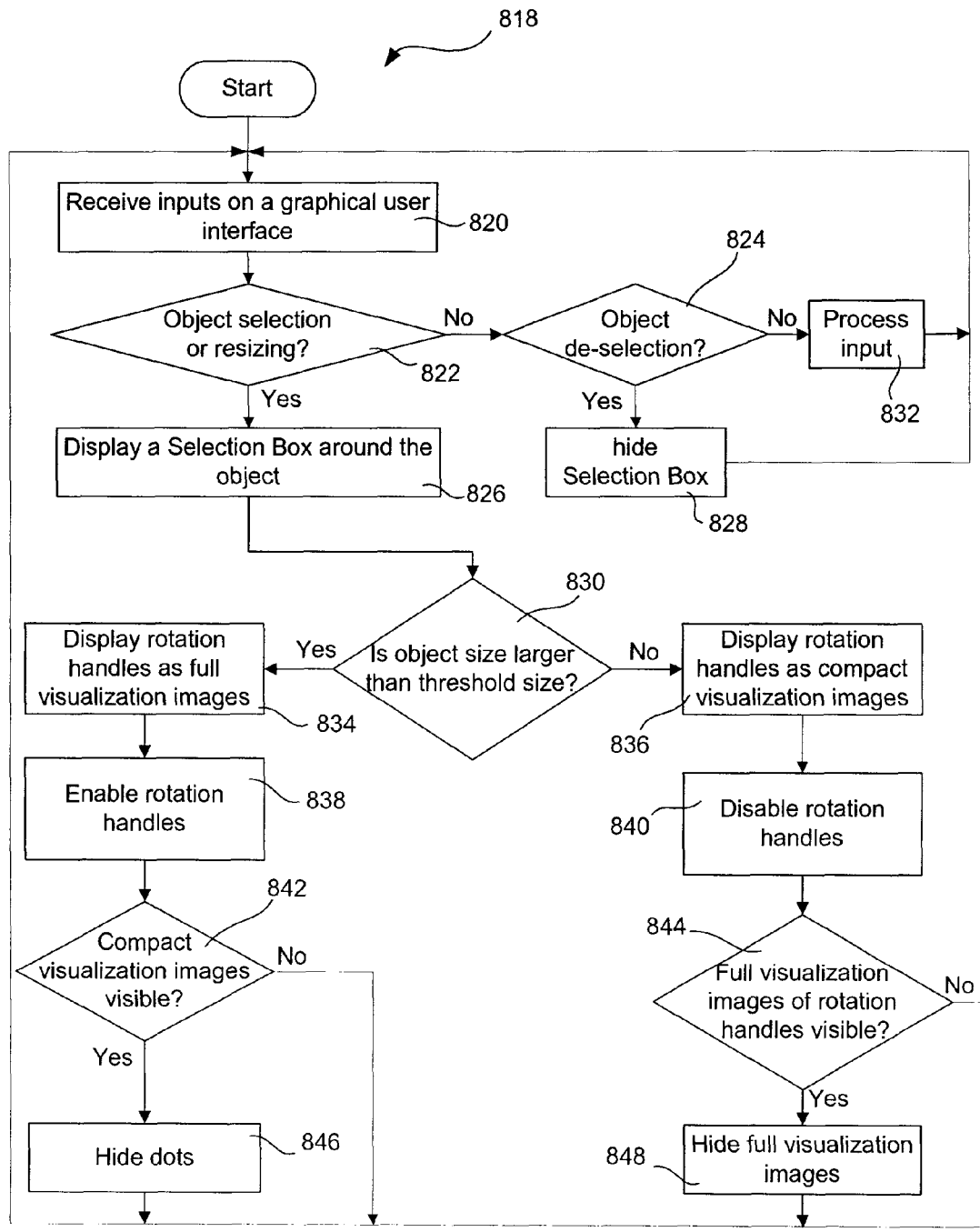
FIG. 16 is a flowchart showing the steps performed during manipulation of a 3D object using the selection box of FIGS. 15A to 15D.

FIG. 16 is a flowchart showing the steps performed during a 3D object manipulation method using the selection box 800, and which is generally indicated using reference numeral 818. Those skilled in the art will understand that the method 818 is not limited to manipulation of 3D objects only, and may also be applied to manipulation of other forms of digital content.

When a pointer contacts the 2D interactive surface 24, the computing device 28 receives the resulting touch input event from the interactive board 22 (step 820), and determines if the touch input event corresponds to selection or resizing of a 3D object (step 822). If the touch input event does not correspond to selection or resizing of a 3D object, the computing device 28 then checks if the touch input event corresponds to de-selection of a 3D object (step 824). If the received touch input event corresponds to de-selection of a 3D object, then the selection box around the 3D object is removed from display (step 828), and the method returns to step 820. If the received touch input event does not correspond to de-selection of an object, then the computing device 28 processes the touch input event based on the specifics thereof (step 832), and the method returns to step 820.

If, at step 822, the touch input event corresponds to selection or resizing of a 3D object, the selection box 800 is displayed around the graphic object (step 826). The 3D object is thus selected. Then, the computing device 28 checks to determine if the size of the 3D object is larger than the threshold size (step 830). If the size of the 3D object is above the threshold size, full visualization images of the rotation control handles are displayed (step 834). The rotation control handles are also enabled to allow manipulation of the 3D object (step 838). The computing device 28 then checks if the rotation control handles were previously represented by the compact visualization images (step 842), and, if so, hides the compact visualization images (step 846). The method then returns to step 820.

If, at step 830, the size of the 3D object is below the threshold size, compact visualization images of the rotation control handles are then displayed (step 836), and the rotation control handles are disabled (step 840). The rotation control handles are therefore no longer available to rotate the 3D object. The computing device 28 then checks to determine if the rotation control handles were previously represented by the full visualization images (step 842), and, if so, hides the full visualization images (step 846). The method then returns to step 820.

It will be understood that, in the above method, removal of any image from display may comprise either hiding the image, namely removing the image from display but still storing the image in memory, or deleting the image, namely removing the image from display and from memory.

In this embodiment, the threshold size is a predefined value equal to two (2) times the largest value of the lengths and widths of the full visualization images of rotation control handles 802, 806 and 808, and measured in units of display pixels. If, at step 830, any one of the length and width of the selected 3D object is larger than the threshold size, then the method branches to step 834 to display the full visualization images of the rotation control handles; otherwise, the method branches to step 836 to display the compact visualization images of the rotation control handles.

Those skilled in the art will appreciate that in other embodiments, other threshold sizes may alternatively be used. For example, the threshold size may alternatively be measured in other units such as for example inches, millimeters, and the like. In still other embodiments, the size comparison criteria used may alternatively be a comparison of the diagonal length of the selected 3D object with a threshold size, which may be a predefined value or a value defined based on the diagonal length of the full visualization images of rotation control handles. In further embodiments, the diagonal length of the 3D object or of the visualization images may be defined as the diameter of a bounding circle enclosing the 3D object or visualization images, respectively. In other embodiments, the diagonal length of the 3D object or visualization images may alternatively be defined as the diagonal length of a bounding rectangle enclosing the 3D object or the visualization images, respectively. In other embodiments, an aspect ratio of the selected 3D object and/or the full/compact visualization images of rotation control handles is also considered in with the size comparison criteria.

In still other embodiments, the size comparison criteria may alternatively comprise a comparison of the area of the selected 3D object and a predefined threshold area size. In still other embodiments, the size comparison criteria may alternatively be based on the shape of the 3D object, and the threshold area size may alternatively be dynamically calculated so that the full visualization images of rotation control handles are displayed only until they start to overlap.

In the embodiments described above, users are not able to change the threshold size and the size comparison criteria, however, in other embodiments, users may alternatively be provided with an option for allowing the user to customize any of the threshold size, the threshold area size and the comparison criteria.

Although in the embodiments described above, the free rotation control handle is not considered in the size comparison, in other embodiments, the free rotation control handle may alternatively be also considered in size comparison.

To help the user differentiate the functionality of each rotation control handle, in some embodiments, each of the rotation control handles, whether displayed as full or as compact visualization images, may have any of a unique color, a unique shape, a unique shade, or other unique visual characteristic associated therewith. For example, referring to FIG. 15A, the rotation control handles 802, 806, 808 may be colored red, green and blue, respectively, in such other embodiments. Similarly, referring to FIG. 15B, dots 810A, 810B and 810C may be colored red, green and blue, respectively, in such other embodiments. It will be understood that other colors may alternatively be used. The opacity or the transparency of the rotation control handles 802, 804, 806 and 808 may also vary, and may range from fully visible to fully hidden.

Although in the embodiments described above, all of the rotation control handles transition between full and compact visualization images synchronously, in other embodiments, all of the rotation control handles may alternatively transition between full and compact visualization images asynchronously. For example, the x-rotation and y-rotation control handles may each transition to a respective compact visualization image at different times.

Although in the embodiments described above, the rotation control handles are disabled when they are displayed as compact visualization images, in other embodiments, the rotation control handles may alternatively not be disabled when they are displayed as compact visualization images, so that a user is still able to rotate the 3D object using the rotation control handles. In still other embodiments, the rotation control handles are hidden and are disabled when the size of the 3D object is below the threshold size.

In other embodiments, a second threshold size may also be used, such that the rotation control handles disappear when the 3D object is resized to a size below the second threshold size. In a related embodiment, the rotation control handles may alternatively be enabled when they are displayed as full visualization images when the size of the 3D object is larger than the first threshold size, or as compact visualization images when the size of the 3D object is smaller than the first threshold size but is larger than the second threshold size. However, the rotation control handles are hidden and are disabled when the size of the 3D object is smaller than the second threshold size. In another related embodiment, when the size of the 3D object is smaller than the first threshold size but is larger than the second threshold size, the x-, y- and z-rotation control handles are enabled and are displayed as compact visualization images, but the free rotation control handle is disabled and/or hidden.

In still other embodiments, the rotation control handles may alternatively never be disabled, such that the selected 3D object may be rotated whether the rotation control handles are displayed as full or as compact visualization images, or when no rotation control handles are displayed.

Figure 17:
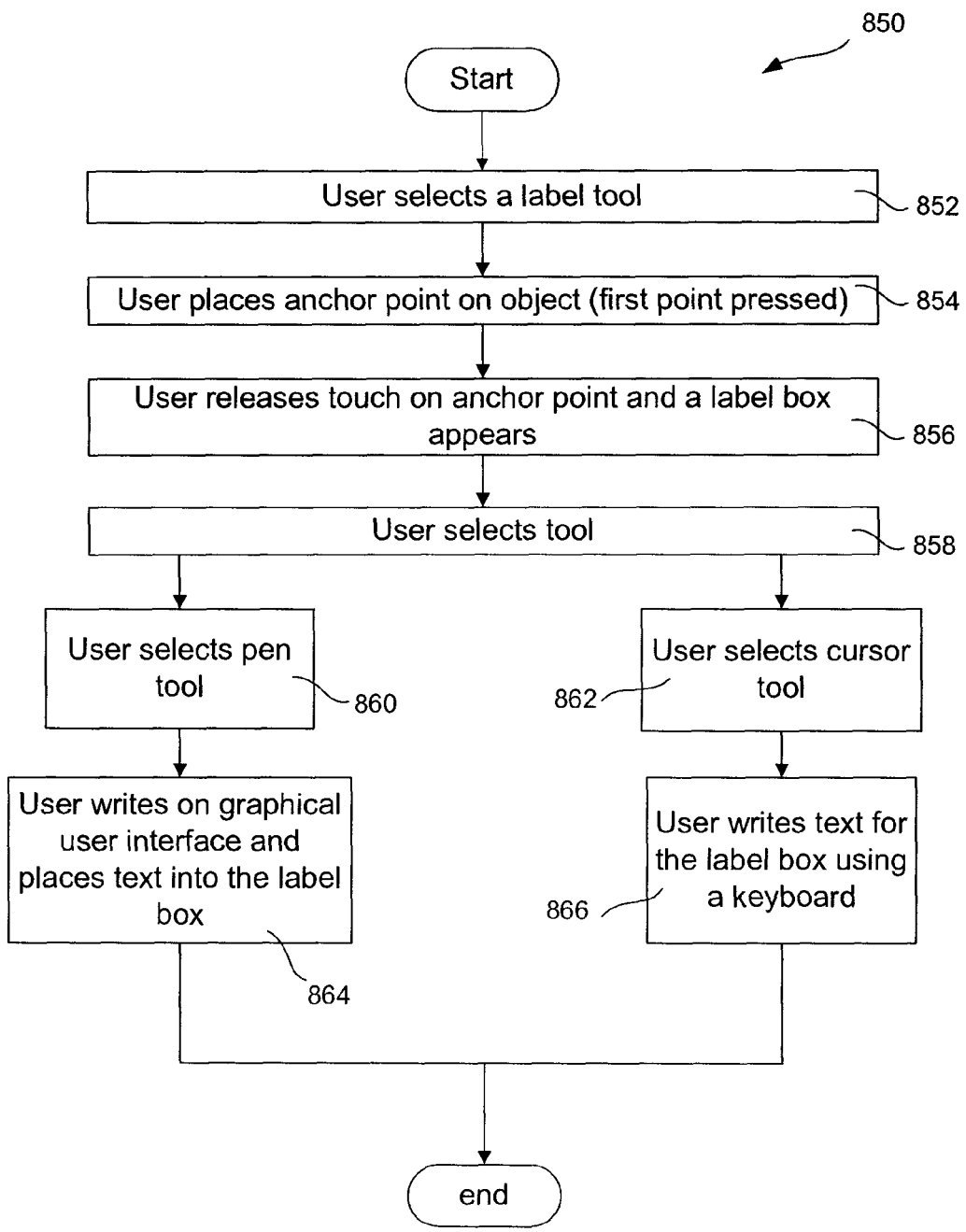
FIG. 17 is a flowchart showing the steps performed during a 3D object labelling and annotating method.

Turning now to FIG. 17, a flowchart showing the steps of a method for labelling and annotating a 3D object is shown, and is generally indicated by reference numeral 850. To label and annotate a 3D object, the user first selects a label tool (step 852), which may be done by selecting a label tool icon in a toolbar. The user then places an anchor point on the 3D object (step 854), by, for example, bringing a pointer into contact with the 2D interactive surface 24 at a desired location on the 3D object. When the pointer is lifted from the 2D interactive surface 24, a label box is anchored to the 3D graphic object at the pointer contact location (step 856). It will be understood that steps 852 to 856 may be repeated as desired to anchor multiple label boxes to the 3D object.

After the user finishes anchoring label boxes to the 3D object, the user may annotate text on an anchored label box using one of a cursor tool and a pen tool. To annotate text, the user selects a desired tool (step 856). If the cursor tool is selected (step 862), the user selects a label box, such as by touching the box with the pointer, and inputs text thereto using a keyboard (step 866). If the pen tool is selected (step 860), the user applies digital ink annotation to a desired label box by writing thereon using the pointer (step 864). The user may also apply digital ink annotation at any location of the 2D interactive surface 24, and then drag the digital ink annotation into a label box as desired. It will be understood that steps 858 to 866 may also be repeated as desired to add annotations to multiple anchored label boxes.

The anchor points and/or label boxes may be displayed in different manners (e.g., in different shapes, sizes, colors, animations, backgrounds, borders, etc.) in different embodiments, either automatically or as user designated. A label box can be collapsed into its corresponding anchor point by tapping on the anchor point or label box after the anchored label box has been created. When a label box is collapsed, a user can tap on the anchor point to expand the label box, causing it to be displayed. The user may also deselect a 3D object, as described above. When a 3D object is deselected, the label boxes anchored thereto are still shown. However, those skilled in the art will appreciate that, in an alternative embodiment, label boxes anchored to a 3D object may be hidden when the 3D object is not selected.

Figure 18A:
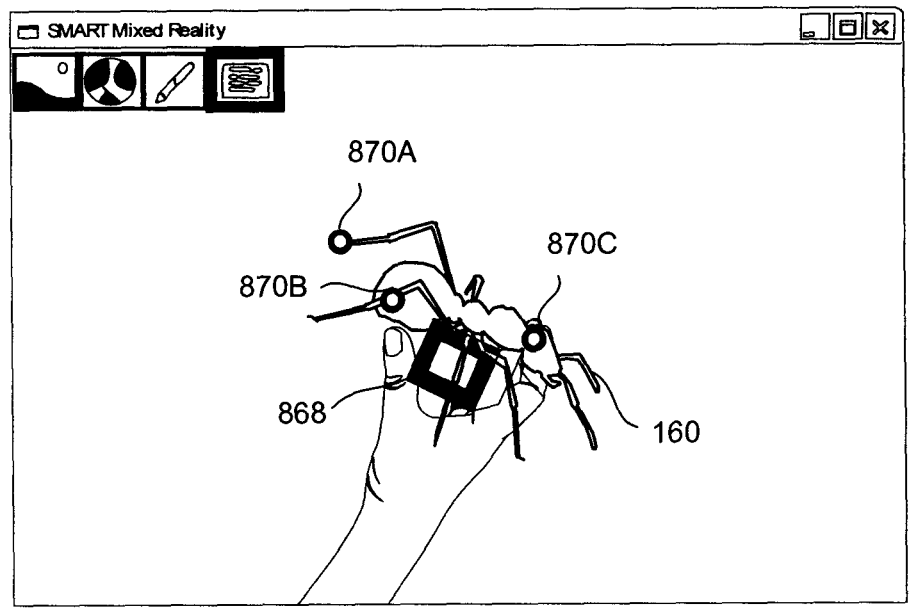
FIGS. 18A and 18B illustrate label boxes and anchor points on a 3D object.
Figure 18B:
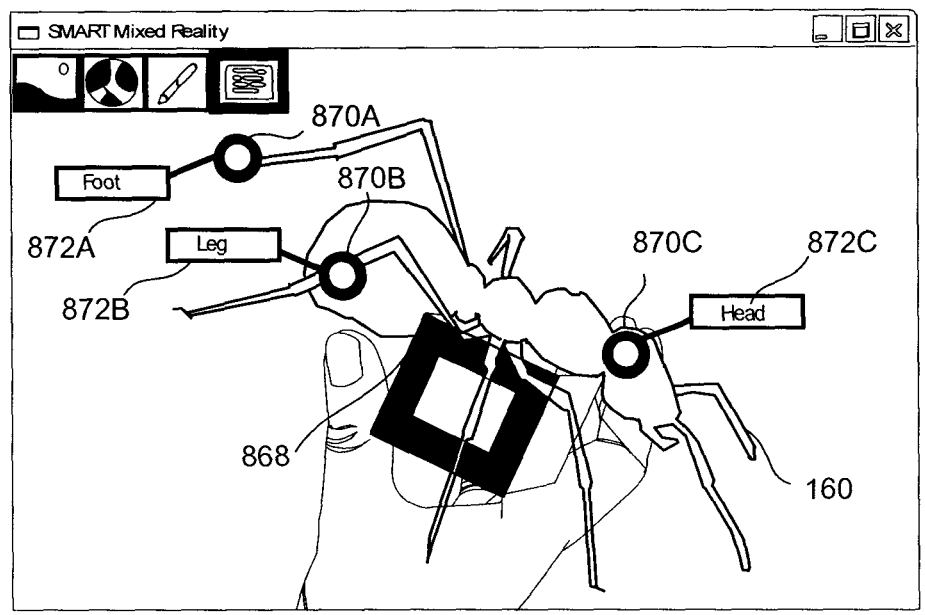

In this embodiment, the label boxes anchored to a 3D object automatically collapse or expand, depending on the size of the 3D object. FIGS. 18A and 18B illustrate an example of automatic collapse or expansion of label boxes anchored to a 3D object based on the size of the 3D object. The size of the 3D object may be changed through interaction with the 2D interactive surface 24, such as for example by dragging a resizing control handle, or by changing the position of a marker within the 3D input space 60. In the example shown in FIGS. 18A and 18B, a user has placed a selection tool marker 868 within the 3D input space 60, and has selected a 3D object 160 having three label boxes 872A, 872B and 872C anchored thereto at anchor points 870A, 870B and 870C, respectively.

In FIG. 18A, the user has moved the marker 868 to a location in the 3D input space 60 distant from the camera 54, so that the size of the 3D object 160 is smaller than a predefined display threshold. As a result, the anchor points 870A to 870C are displayed on the 3D object 160, but the label boxes 872A to 872C are automatically collapsed and are not shown. The display threshold may be defined in several ways, similar to the definition of the threshold size described above. For example, in this embodiment, the display threshold is defined based on the display size (in pixels) for which the letters in label boxes are distinguishable to users.

In FIG. 18B, the user has moved the marker 868 in the 3D input space 60 closer to the camera 54, so that the size of the 3D object 160 has become larger than the predefined display threshold. Consequently, label boxes 872A to 872C are automatically expanded, and are displayed on the 2D interactive surface 24. Each label box 872A to 872C is visually linked to its corresponding anchor point 870A to 870C by a straight line. In this example, when the 3D object 160 is enlarged, the anchor points are also enlarged, however it will be understood that in other embodiments, the size of the anchor points may alternatively not scale with the size of the 3D object.

Figure 19:
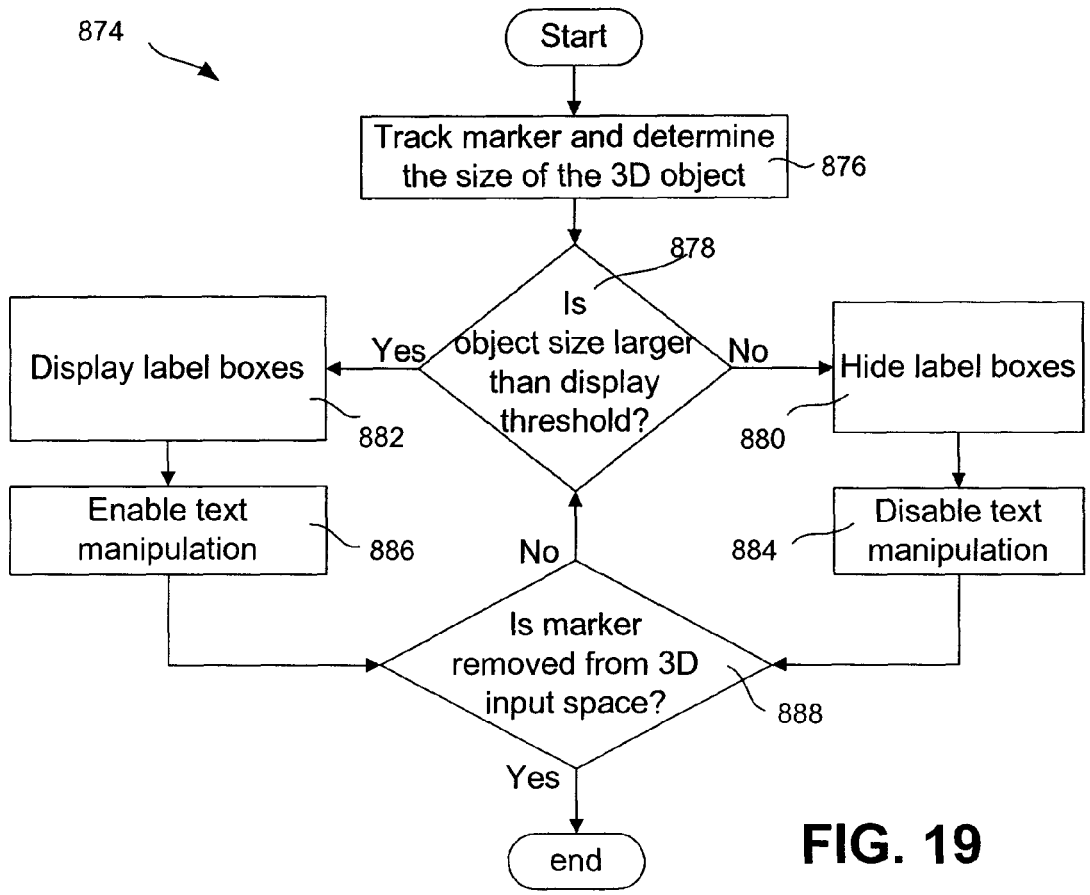
FIG. 19 is a flowchart showing the steps performed during a 3D object label box display method.

FIG. 19 is a flowchart showing the steps of a method for displaying label boxes on a 3D object, and which is generally referred to using reference numeral 874. For ease of description, it is assumed that a 3D object annotated with label boxes is associated with a marker in the 3D input space 60. The computing device 28 first tracks the marker, and calculates the size of the 3D object (step 876). The computing device 28 then checks if the size of the 3D object is larger than the display threshold (step 878). If the size of the 3D object is not larger than the display threshold, the computing device 28 modifies the image displayed on the 2D interactive surface 24 so as to hide the label boxes, if they are not already hidden (step 880), and disables text manipulation of label boxes (step 884). In this embodiment, the anchor points are always displayed regardless of whether the label boxes are hidden or not hidden.

If, at step 878, the size of the 3D object is larger than the display threshold, then the computing device 28 modifies the image displayed on the 2D interactive surface 24 to display the label boxes, if they are not already displayed (step 882), and enables text manipulation of the label boxes (step 886). The computing device 28 then checks to determine if the marker has been removed from the 3D input space 60, meaning that it would not be detectable in images captured by the camera 54 (step 888). If the marker has not been removed from the 3D input space 60, and is therefore still in the 3D input space 60, then the method returns to step 878; otherwise, the method ends.

It will be understood that any of the label boxes and the anchor points may have similar appearances and behaviour characteristics as the rotation control handles in embodiments described above. For example, in other embodiments, the anchor points may alternatively be hidden when the size of the 3D object is smaller than a second display threshold.

It will also be understood that different opacity levels can be applied to the label boxes, based on the z-depth of the anchor point, namely the position of the anchor point along z-axis, so as to allow a user to more easily focus on a point of interest. For example, in other embodiments, label boxes linked to the anchor points that are "higher" along z-axis may become more transparent while label boxes linked to the anchor points that are "lower" along z-axis may become more opaque.

Although in embodiments described above, a marker is used to manipulate the 3D object, in other embodiments, the user may also manipulate the 3D object by interacting with the 2D interactive surface. In such other embodiments, the label boxes automatically collapse or expand when the size of the 3D object becomes larger or smaller, respectively, than a threshold size. In a related embodiment, the user may alternatively manipulate 3D object by interacting with the 2D interactive surface as described above, regardless of whether the MR mode is turned on or not.

In still other embodiments, the interactive input system may alternatively not comprise any 3D input device. In these other embodiments, a user may manipulate 3D objects by interacting with the 2D interactive surface as described above, or by using other input devices, such as, for example, any of the mouse and the keyboard.

In still other embodiments, the interactive input system may alternatively not comprise an interactive board. In these other embodiments, a user may manipulate 3D objects by manipulation of markers in the 3D input space, or by using other input devices, such as, for example, any of the mouse and the keyboard.

In still other embodiments, the images output from the computing device may alternatively be displayed on a display surface separate from the 2D interactive surface.

In still other embodiments, when a 3D object is touched, the selection box may alternatively not be automatically be displayed.

In still other embodiments, multiple pointer touches may alternatively be used to rotate 3D objects by fixed amounts. For example, placement of two pointers on a horizontal slider control handle of the selection box, and located to the right of the center of the control handle, may alternatively cause a 15 degree rotation of the 3D object about the y-axis. Similarly, placement of three pointers on the control handle, and located to the right of the center of the control handle, may alternatively cause a 60 degree rotation. Placement of a first pointer on the z-rotation control handle and a second pointer slightly to the right of the z-rotation control handle, may alternative cause a discrete rotation of the 3D object clockwise about the z-axis, while placement of a first pointer on the z-rotation control handle and a second pointer slightly to the left of the z-rotation control handle may alternatively cause a discrete rotation of the 3D object counter-clockwise about the z-axis.

In still other embodiments, animation of 3D objects, such as spin animations, can be caused by gestures detected within the selection box. In one such other embodiment, a "flick" gesture, which is a drag gesture having a speed above a drag speed threshold, can be used to operate any of the slider control handles and the rotation control handles. In this other embodiment, a left-to-right flick gesture on the horizontal slider control handle causes the 3D object to spin from left to right continuously about the y-axis, while a right-to-left flick on the horizontal slider causes 3D object to spin from right to left continuously about the y-axis. Similarly, a down-to-up flick gesture causes the 3D object to spin upwards continuously about the x-axis, while an up-to-down flick causes the 3D object to spin downwards continuously about the x-axis. In this same other embodiment, a flick gesture on the z-rotation control handle causes the 3D object to spin clockwise or counter-clockwise continuously about the z-axis, depending on the direction of the flick gesture. In these other embodiments, when a spin animation begins, the selection box disappears. Touching the 3D object with a pointer stops the spin animation and causes the selection box to reappear.

In other embodiments, the computing device may alternatively determine that manipulation of a 3D object has been completed according to any of the following: when another 3D object is selected; after expiration of a threshold time of inactivity; immediately after the pointer no longer touches the control handle used to manipulate the 3D object; and when the user steps outside a predefined proximity of the 2D interactive surface.

Although in embodiments described above, the control handle is used to enlarge the size of a selection box and a 3D object, whereby the control handle is dragged by a desired amount and the selection box and the 3D object are then enlarged according to a size consistent with the amount of drag, in other embodiments, the control handle may alternatively be used to change the z-position of the 3D object in the 3D space "above" the 2D interactive surface, namely the position of the 3D object along the z-axis. In this other embodiment, when the control handle is dragged by a desired amount, the z-position of the 3D object in the 3D space is recalculated, and the 3D object is resized according to the change of the z-position. For example, when the control handle is dragged outwards, the 3D object is moved towards the user in 3D space, namely the 3D object is moved further above the 2D interactive surface, thereby enlarging the image of the 3D object. In another related embodiment, when the 3D object is resized in 3D space, the image of the 3D object may alternatively be updated in a 3D-style manner similar to the 3D-style translation described above, so as to reflect the change of the 3D object's perspective view after resizing. As described above, this mode is entered by selecting and dragging the camera icon from the toolbar to a desired position on the 2D interactive surface to calculate a viewpoint. The perspective view of the scaled 3D object is then updated according to the calculated viewpoint.

Although in embodiments described above, the display of the rotation control handles and the label boxes of a 3D object are automatically changed as the 3D object is scaled, in other embodiments, the display of any of rotation control handles and label boxes of digital content, such as for example a 2D object, may also be automatically changed when the 2D object is scaled. For example, a 2D object may comprise a rotation control handle for rotating the 2D object on the 2D interactive surface, and this rotation control handle may be displayed as a full or compact visualization image if the size of the image of the 2D object is larger or smaller, respectively, than a threshold image size.

In embodiments described above, markers 62 are moved within the 3D input space 60 for manipulating 3D objects associated therewith. However, in other embodiments, the 3D input device 52 may also be used to capture images of print matter in the 3D input space, in which textual and graphical content can be recognized and then applied to digital content accordingly. Such print matter can be in any form, such as, for example, a book, a magazine or a paper, and the like.

Figure 20:
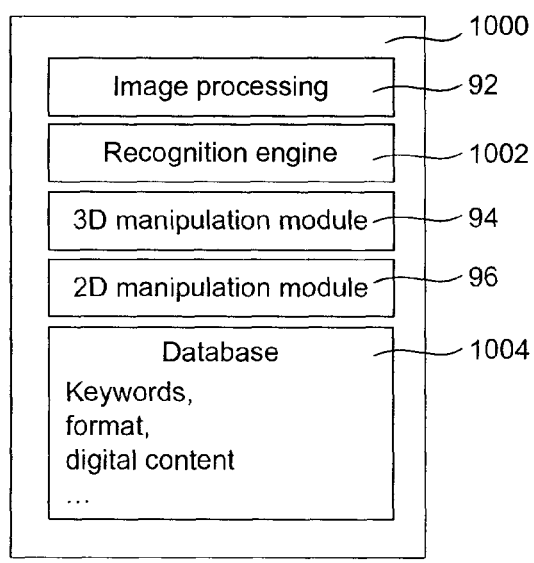
FIG. 20 is a schematic diagram showing an alternative software architecture of the interactive input system of FIG. 1A.

The structure of the interactive input system of this embodiment is the same as that of the interactive input system 20 described above and with reference to FIGS. 1A and 1B. The software architecture of the interactive input system of this embodiment is illustrated in FIG. 20, and is generally identified by reference numeral 1000. Software architecture 1000 is generally the same as that of software architecture 90 described above and with reference to FIG. 2, except that it further comprises a recognition engine 1002 and a database 1004. The recognition engine 1002 is configured to receive the pre-processed images from the image processing module 92, and is configured to recognize both textual and non-textual objects within the images. These textual and non-textual objects may comprise for example text, pictures, pointers, fingers or hands.

To assist with processing the captured images and with the recognition of textual and non-textual objects within the captured images, the recognition engine 1002 is in communication with the database 1004, which stores keywords, format descriptions and digital content objects. The digital content stored in the database 1004 comprises text, images, audio clips, video clips, URIs, email addresses, 2D and 3D digital objects, and other digital information that may be used. The URIs may be, for example, hyperlinks to websites, ftp sites, news groups, SMART Notebook™ files or other files, database queries, and the like.

The keywords and the format descriptions are used to identify the textual objects detected from the captured images. Each keyword comprises one or more words, symbols and/or digits, or a predefined character string. The character string may be, for example, an International Standard Book Number (ISBN) character string, a Digital Object Identifier (DOI®) character string, an email address, or a web address. The format description describes any of a font attribute, such as bold, italic or a size, a layout attribute, such as "align left", "align right", or "centered", for example, and a format pattern of special strings, such as a uniform resource indicator (URI), for example. The keywords and the format descriptions may be predefined in the interactive input system 20 or may be user-defined.

The pre-processed images from the image processing module 92 are sent to the 3D manipulation module 94 for analysis and identification of any user gestures based on the user input in the 3D input space 60, in the manner described above. Identified user gestures are then used to manipulate the digital content accordingly. Correspondingly, the 2D manipulation module 96 receives user input from the 2D interactive surface 24, and identifies any user gestures for subsequent manipulation of the digital content.

As will be appreciated, patterns on the physical objects, such as for example text on the print matter, can be partially or completely occluded by fingers or hands when the physical object is being manipulated, or can be out of the field of view of the camera 54, such that the patterns are not present in the captured images. To address this issue, the interactive input system 20 utilizes a method for detecting occlusion of patterns to ensure continuous recognition of the patterns within the captured images. The method generally comprises comparing consecutively captured images of print matter comprising a pattern to detect differences between the images. This enables the interactive input system 20 to continue determining the pattern, regardless of the pattern not being fully present in one or more of the captured images.

Figure 21:
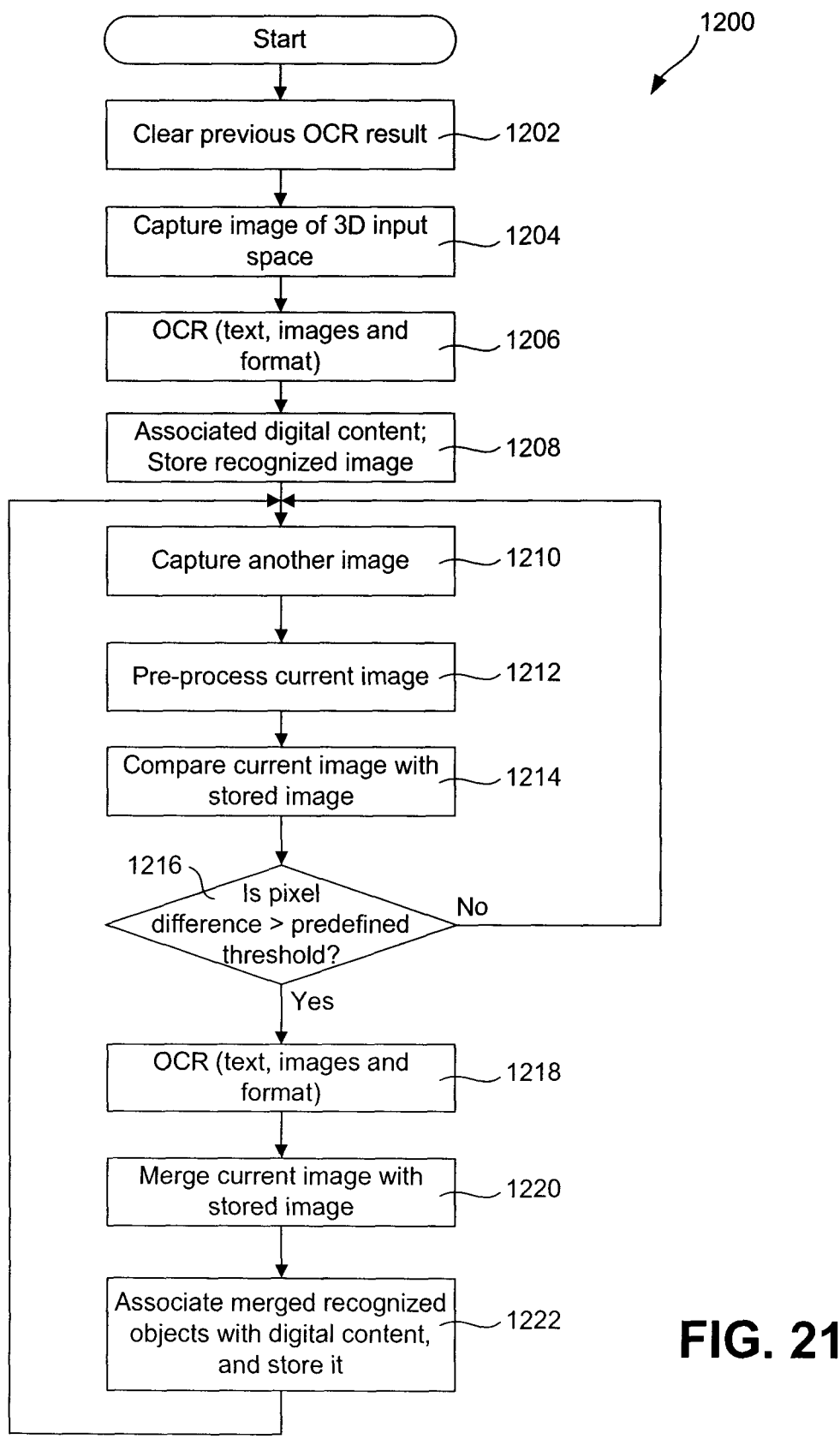
FIG. 21 is a flowchart showing the steps performed during manipulation of digital content associated with recognized objects of print matter in the 3D input space.

FIG. 21 shows the steps of the continuous pattern recognition method used by the interactive input system, and which is generally indicated using reference numeral 1200. A storage buffer in communication with the computing device 28 that stores a previously recognized image is first cleared (step 1202), and a new image is captured by the camera 54 and transmitted to the computing device 28 (step 1204). Next, the recognition engine 1002 recognizes textual objects and non-textual objects, such as graphics, within the image (step 1206). In this embodiment, the interactive input system 20 uses optical character recognition (OCR) techniques to perform the recognition during step 1206. During OCR, the recognition engine 1002 first recognizes the text from the pre-processed image, and then recognizes the format associated with the textual object, such as the font attributes and the layout attributes. The recognition engine 1002 also determines the image of the print matter by identifying a generally rectangular shape image portion of the captured image encompassing recognizable matter. Font size is categorized as large, normal or small. A normal font size is first determined based on the most common height of recognized characters within the images, and within a defined threshold. A large font size is one for which the size of a character in the image is larger than the normal font size by at least a threshold amount. The value of the threshold amount can be expressed either in terms of pixels or as a percentage of size. A small font size is one for which the size of a character in the image is smaller than the normal font size by at least the threshold amount. Additional font sizes may be determined using other threshold parameters. Non-textual objects are also recognized during step 1206.

Recognized objects are then associated with digital content, and the image, the recognized objects, and any digital objects or associations to digital objects are then stored in the memory (step 1208).

Another image is captured by the camera 54 (step 1210). The image processing module 92 then pre-processes the most-recently captured image (hereafter the "current image") (step 1212). The processing module 92 determines the print matter image by identifying a generally rectangularly-shaped image portion of the captured image encompassing recognizable matter, calculates the angle of rotation of the print matter, and applies the same angle of rotation to the print matter image, as well as to the recognized textual and non-textual objects of the stored image, so as to improve the accuracy of the comparison. The current image is then compared with the stored image to determine if any portions of the print matter images are different (step 1214). A determination is made as to whether the pixel difference between identical locations of the two images is greater than a threshold (step 1216). If the difference is less than the threshold, then no further action is required; the method returns to step 1210, and the stored image is retained. If at step 1216 the difference is greater than the threshold, then the current image is recognized (step 1218), as described above, and recognized objects from the current image are merged with the recognized objects of the stored image (step 1220). The merged recognized objects are then associated with digital content (step 1222), and the current image, the recognized objects, and any digital content or associations to the associated digital content are stored in the buffer, and the stored image is overwritten. The method then returns to step 1210.

The captured images are further processed according to whether user input has been detected. This input may be inputted in the 3D input space 60, for example, using a pointer, such as a user's finger. If user input is detected in the 3D input space 60, the computing device 28 interprets the input as gestures or commands for manipulating the digital content, or as program commands. The computing device 28 determines pointer gestures according to the movement of the pointer in the 3D input space, and generates 3D input events. Similarly, the computing device 28 determines touch gestures based on touch events on the 2D interactive surface 24, and generates 2D input events. The computing device 28 also receives input events from other input devices, such as for example keyboard, mouse, trackball, audio input, and the like. The input events received by the computing device 28 are passed to the application program, which in this embodiment is SMART Notebook™, and are interpreted as one of a digital ink annotation command, an object manipulation command, a program control command, or as another command. When a command for manipulating the digital content or a program command is detected, the computing device 28 executes the command according to the user input. When the computing device 28 receives a command for terminating the program, the method is terminated accordingly.

Figure 22A:
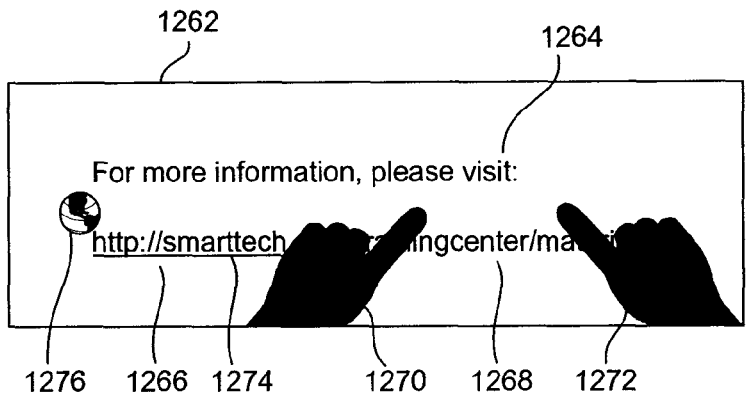
FIGS. 22A to 22C illustrate recognition of textual objects of the print matter, and association of digital content therewith.
Figure 22B:
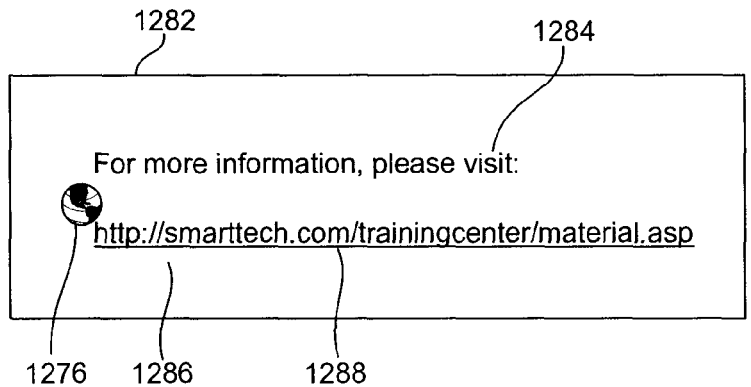
Figure 22C:
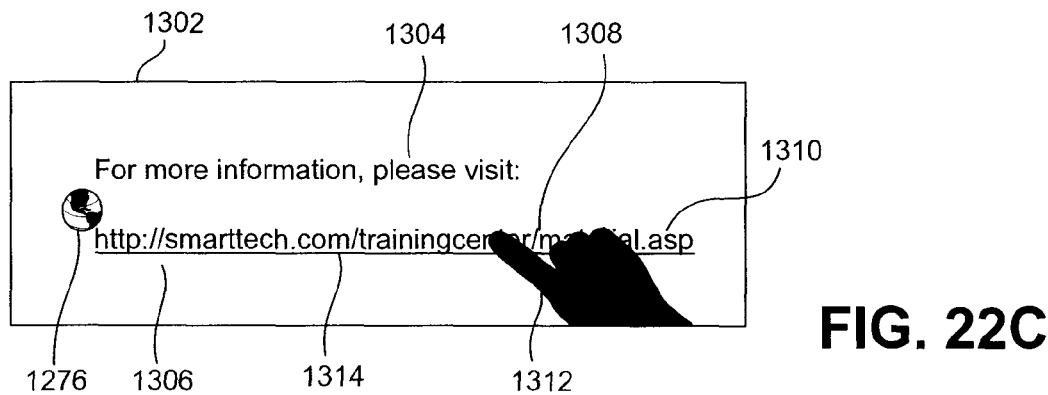

FIGS. 22A to 22C illustrate steps of the continuous pattern recognition method 1200. FIG. 22A shows an exemplary image 1262 captured by the 3D input device 52. As described above, the captured image is pre-processed by the image processing module 92 to correct any optical distortions and to perform any necessary actions on the image 1262, such as image enhancement or rotation. The recognition engine 1002 then recognizes the textual objects 1264, 1266 and 1268, and non-textual objects, or graphics, 1270 and 1272 from the image 1262. Next, the computing device 28 recognizes that text 1266 "http://smarttech" matches the pattern of a URI because it starts with the characters "http://". The computing device 28 therefore modifies the image 1262 to insert a line 1274 below the recognized textual object 1266, indicating that the recognized text 1266 includes a hyperlink. A web link icon 1276 is also associated with the same hyperlink, and is placed adjacent to the image of the recognized textual object 1266. Therefore, when the user actuates the icon 1276 or the recognized textual object 1266, a web browser is launched and the user is directed to a web site indicated by the associated URI. The recognized objects 1264, 1266, 1268, 1270 and 1272 of the recognized image 1262 are then stored in the buffer.

FIG. 22B shows another image 1282 that has been captured subsequent to the first image 1262. The computing device 28 determines that the difference between the stored image, namely image 1262 shown in FIG. 22A, and the current image, namely image 1282, is greater than a threshold. As a result, the computing device recognizes the textual objects 1284 and 1286 of the second image 1282. The computing device 28 then compares the recognized objects 1264, 1266, 1268, 1270 and 1272 of the recognized image 1262, to the recognized objects 1284, 1286 of the recognized image 1282 to merge the recognized objects of the two images. As the textual object 1288 of the image 1282 overlaps with, and comprises all of the characters in the textual objects 1266 and 1268 of, the preceding recognized image 1262, the computing device 28 determines that the textual objects 1266 and 1268 are a subset of the textual object 1286, and therefore the textual object 1286 is kept in the most recently recognized image 1282. Following the recognition of the pattern of the textual object 1286, the computing device 28 modifies the image 1282 to insert a line 1288 below the textual object 1286 to indicate a hyperlink, and associates the textual object 1286 and the web link icon 1276 with the URI "http://smarttech.com/trainingcenter/material.asp". The recognized objects of image 1282, together with the icon 1276 and the associated hyperlinks, are stored in the buffer.

The process of determining whether or not recognized objects in subsequently-captured images are to be merged is repeated, as necessary, in accordance with the continuous pattern recognition method 1200. For example, FIG. 22C shows another image 1302 that has been captured subsequent to image 1282. The recognized objects of image 1302 comprise textual objects 1304 to 1310 and a non-textual object 1312. The computing device 28 compares the recognized objects in the two recognized images 1282 and 1302, and determines that the textual object 1304 of FIG. 22C is identical to the textual object 1284 of FIG. 22B, and the textual object 1304 is therefore maintained within the currently recognized image 1302. The computing device 28 also determines that the textual objects 1306 to 1310 contain a subset of characters found in the textual object 1286, as the other characters are obscured by the non-textual object 1312, namely a user's finger. Using this determination, the computing device 28 merges the recognized objects 1306 to 1310 of image 1302 and the recognized objects of image 1282, by substituting the textual objects 1306 to 1310 with the previously recognized textual object 1286, and thus recognizes the URI "http://smarttech.com/trainingcenter/material.asp". The computing device 28 then modifies the image 1302 to insert a line 1314 below the textual objects 1306 to 1310, and updates the hyperlink associated with the web link icon 1276 with the aforementioned URI. The images of the textual objects 1306 to 1310 are also set as hyperlinks comprising the same URI. The recognized objects of image 1302, along with the icon 1276 and associated hyperlinks are stored in the buffer.

As will be appreciated, by recognizing textual and non-textual objects from captured images in the 3D input space, the interactive input system 20 superimposes digital objects on the captured images and displays these modified images on the 2D interactive surface 24. The user may manipulate the print matter image and the superimposed digital objects by inputting any of 3D gestures in the 3D input space 60 and touch gestures on the 2D interactive surface 24. The interactive input system 20 then detects user input from the 3D input space 60 and/or the 2D interactive surface 24, and manipulates the modified images accordingly.

Figure 23A:
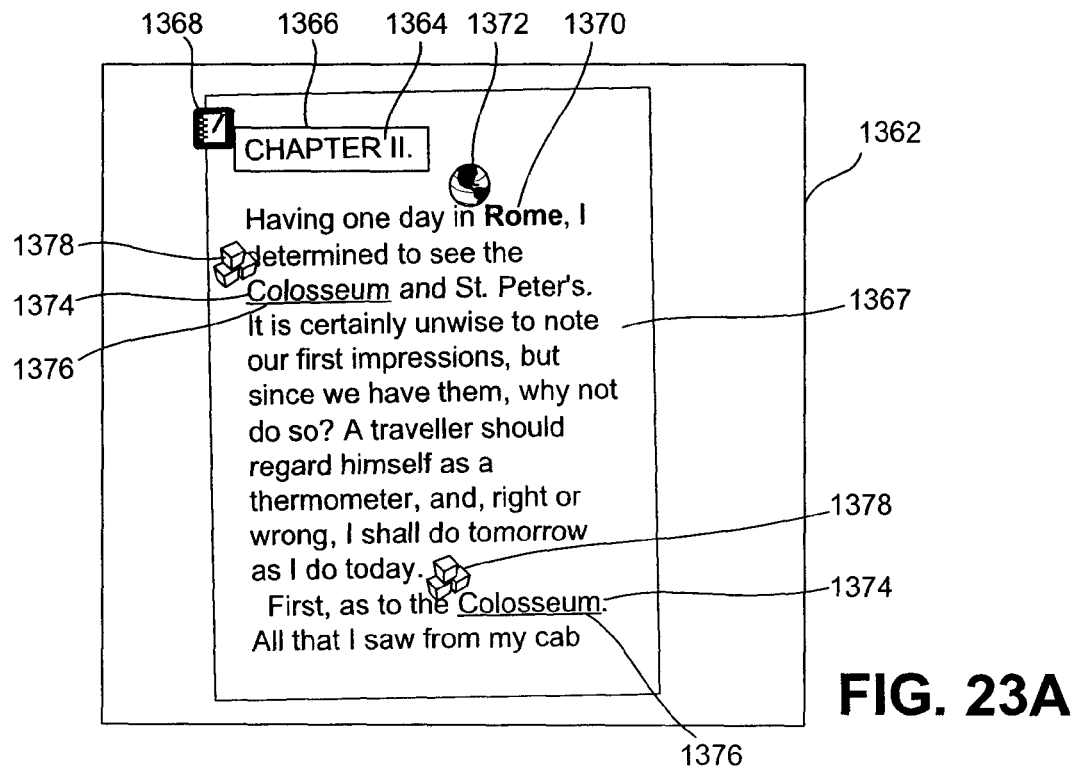
FIGS. 23A to 23C illustrate recognized digital content superimposed on an image of the print matter, and selection of the digital content.
Figure 23B:
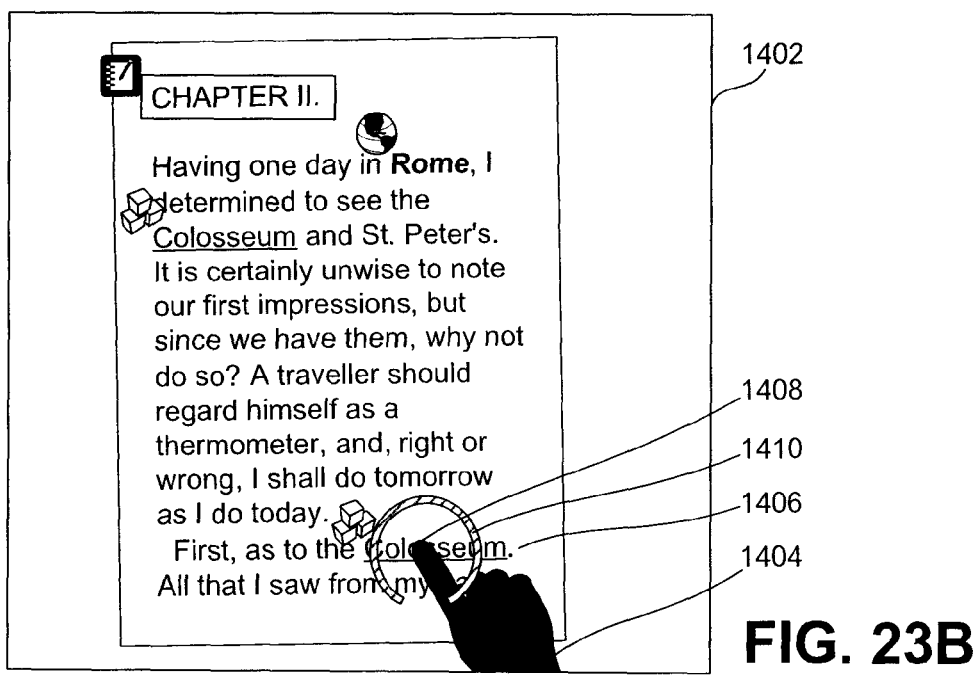
Figure 23C:
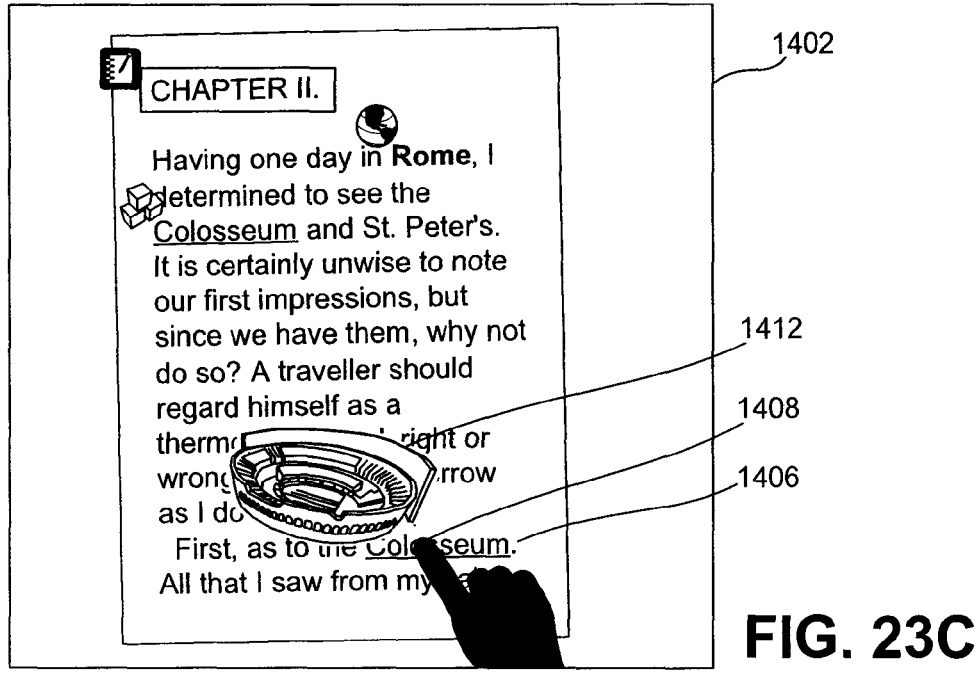

FIGS. 23A to 23C illustrate examples of manipulation of the print matter images and the superimposed digital objects using gestures performed in the 3D input space. FIG. 23A shows a captured image 1362 that has been received by the computing device 28. The computing device 28 recognizes the textual objects and non-textual objects in the image 1362 and detects the formats thereof. For example, a textual object comprising a character string 1364 is recognized as the words "CHAPTER II." Also, given the capitalized characters, the comparatively larger font size, and the position relative to the remainder of the textual object 1367, the character string 1364 is thus recognized as a chapter title. Therefore, the computing device 28 places a box 1366 around the character string 1364. The box 1366 defines an area, or a "hot zone", that serves as a hyperlink to predefined digital content. As an example, the digital content may be a SMART Notebook™ file stored on the computing device 28. In this embodiment, the computing device 28 also provides an icon 1368 comprising the same hyperlink associated with the character string 1364.

The computing device 28 continues to recognize the remainder of the textual object 1367, and determines that a character string 1370 refers to the word "Rome". The computing device 28 also determines the font attributes of the character string 1370. Based on the width of the characters of character string 1370 as compared to the width of the characters of the remainder of the textual object 1367, the character string 1370 is identified as having a "bold" font. According to predefined rules, the computing device 28 interprets the bold character string 1370 as a recognizable pattern and associates it with digital content, namely an icon 1372 that is superimposed adjacent to the image of the string 1370. In this embodiment, the icon 1372 is hyperlinked to a search engine, such that actuation of the hyperlink initiates a search query related to the term "Rome".

The computing device 28 also determines that the character string 1374 "Colosseum" matches a predefined keyword. Therefore, for each occurrence of the character string 1374, a line 1376 is inserted underneath indicating a link to digital content, such as a 3D model, and an icon 1378 comprising the same link to the digital content is superimposed adjacent to the character string 1374. The area immediately surrounding each character string 1374 in the recognized image 1362 is set as a hot zone comprising the same link to the digital content.

FIG. 23B shows another image 1402 captured by the 3D input device 52 subsequent to the first image 1362. As described above, the computing device 28 compares the image 1402 with the previously recognized image 1362 of FIG. 23A, in order to determine any differences therebetween. As the difference between the two recognized images 1362 and 1402 is larger than a threshold due to the presence of a pointer in the image 1402, the image 1402 is recognized. The computing device 28 determines that the recognized image 1402 comprises a non-textual object 1404 that is not present in the previously recognized image 1362. The computing device 28 then determines that the non-textual object 1404 is most likely a pointer, and therefore calculates the envelope of the non-textual object 1404 and detects the pointer tip 1408. The recognized textual objects corresponding to the respective images 1362 and 1402 are then merged, and the digital content, the icons and the associated hyperlinks are stored with the image 1402.

The computing device 28 then calculates the position of the pointer tip 1408 and determines that the pointer tip 1408 superimposes an area 1406 already identified as a hot zone associated with the character string 1374 "Colosseum". Typically, the placement of a pointer tip 1408 on a hot zone 1406 for a predefined time indicates a user's desire to actuate the hyperlink to the associated digital content. Accordingly, the computing device 28 sets out to determine whether the placement of the pointer tip 1408 is of a transient or non-transient nature. For example, if the pointer tip 1408 was captured while the image of the print matter was being acquired, then the user probably had no intention to actuate the hyperlink. Conversely, if the comparison successive images shows dwelling of the pointer tip 1408 over the area 1406, then the computing device 28 determines that the user expects to follow the hyperlink to the associated content. Accordingly, the computing device 28 displays a time indicator 1410 adjacent to the pointer tip 1408 and starts a timer to determine the dwell time of the pointer tip 1408 on the hot zone 1406. If the pointer tip 1408 is maintained over the hot zone 1406 for a time period longer than a threshold time period, the hyperlink is actuated. Upon actuation of this link, the hyperlinked digital content 1412, such as a 3D digital object of the Colosseum in the example shown, is displayed on the 2D interactive surface 24, as shown in FIG. 23C.

Figure 24A:
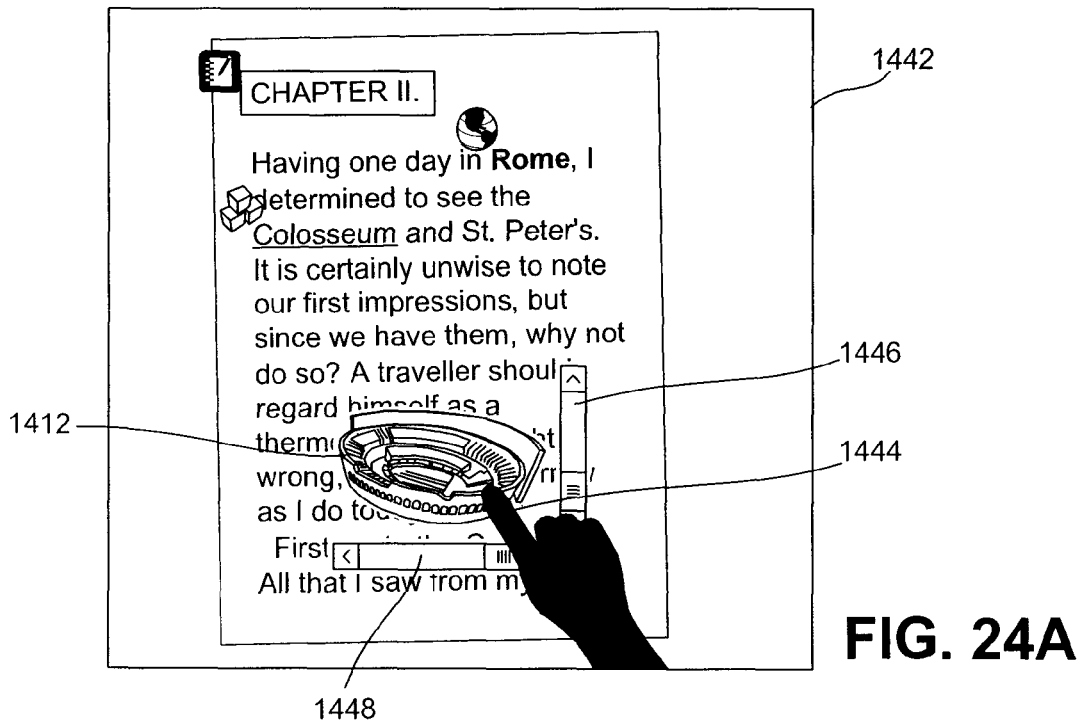
FIGS. 24A to 24C illustrate manipulation of a 3D object superimposed on the print matter image.
Figure 24B:
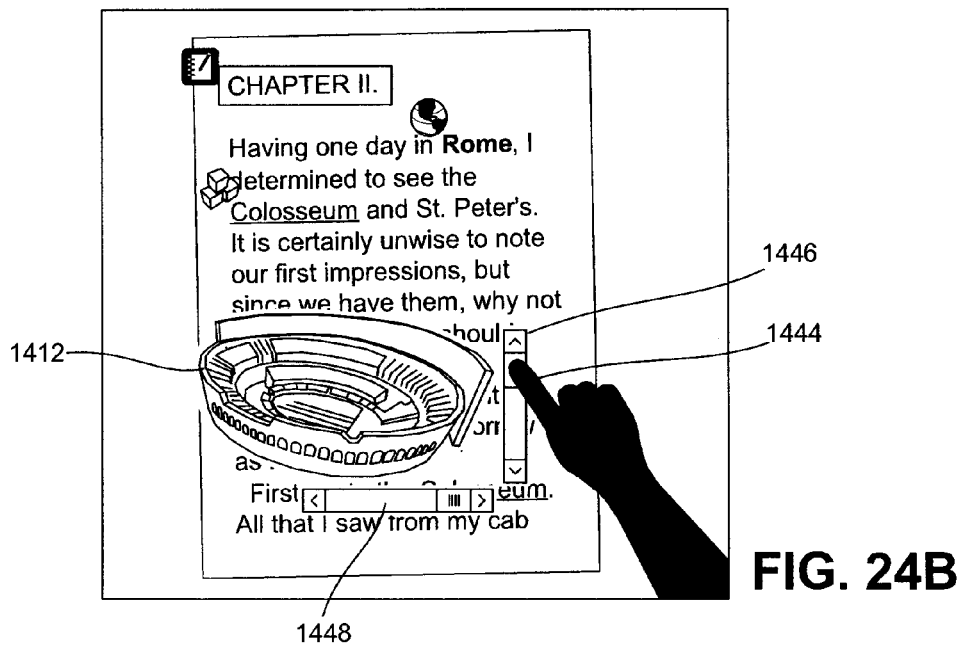
Figure 24C:
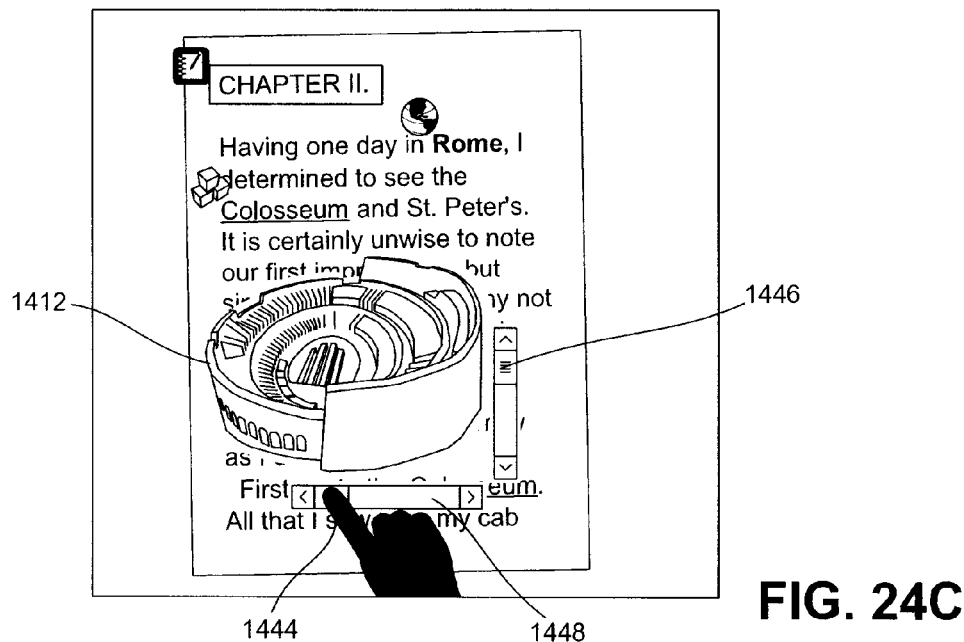

The digital content 1412 may be manipulated via gestures in the 3D input space 60 only, and without any interaction with the 2D interactive surface 24. For example, FIG. 24A shows an example of a user positioning a fingertip 1444 at a position in the 3D input space 60 such that the image of the fingertip 1444 overlaps the digital content 1412 in the captured image 1442. Accordingly, the computing device 28 sets out to determine whether the fingertip 1444 positioning is of a transient or non-transient nature, in order to determine whether or not the user intends to manipulate the digital content 1412. The computing device 28 therefore displays another time indicator (not shown) adjacent to the fingertip 1444, and starts a timer to determine the dwell time of the user's fingertip 1444 on the digital content 1412. If the fingertip 1444 is maintained over the digital content 1412 for a time period longer than a threshold time period, the computing device 28 determines that the user intends to manipulate the digital content 1412 and displays a vertical scroll bar 1446 and a horizontal scroll bar 1448 adjacent the digital content 1412 to facilitate its manipulation. In this example, the vertical scroll bar 1446 is associated with size resizing functionality, while the horizontal scroll bar 1448 is associated with rotational functionality of the digital content 1412. For example, in FIG. 24B, the user has moved the finger such that the fingertip 1444 is positioned generally over the vertical scroll bar 1446 in the 3D input space 60. Translation of the fingertip 1444 between the ends of the vertical scroll bar 1446 results in zooming into and out of the 3D digital content 1412. Translation of the fingertip 1444 between the ends of the horizontal scroll bar 1448 results in rotation of the 3D digital content 1412 on a plane perpendicular to the 2D interactive surface 24, as shown in FIG. 24C.

Figure 25A:
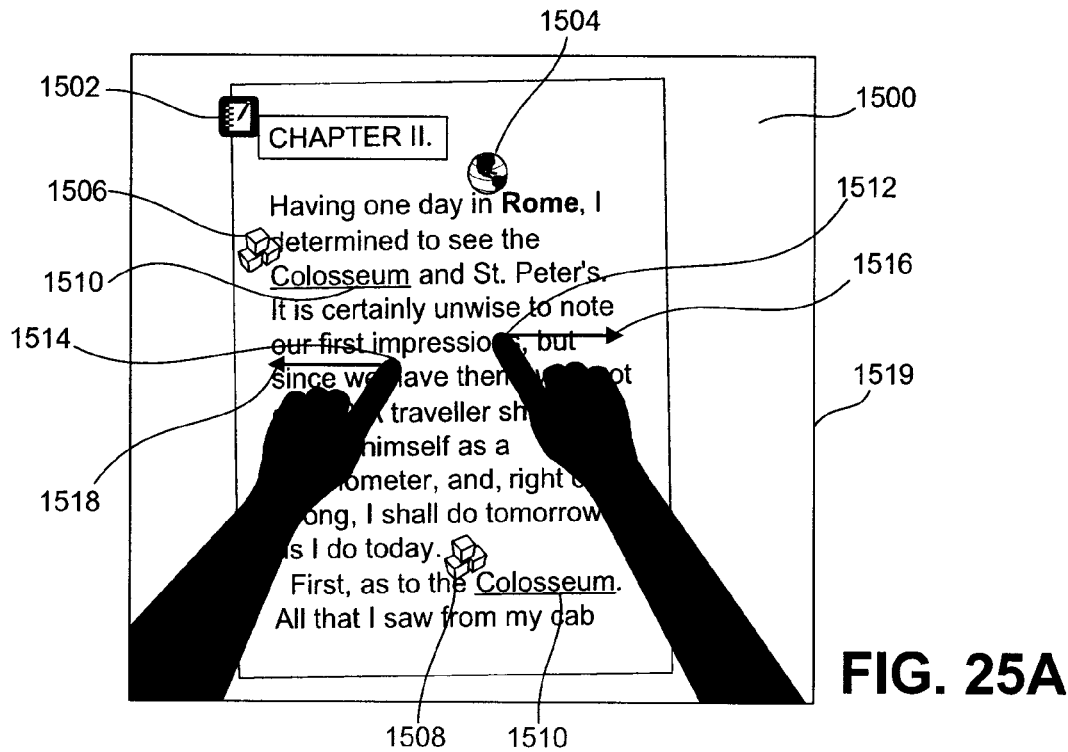
FIGS. 25A and 25B illustrate a resizing gesture of the print matter image.
Figure 25B:
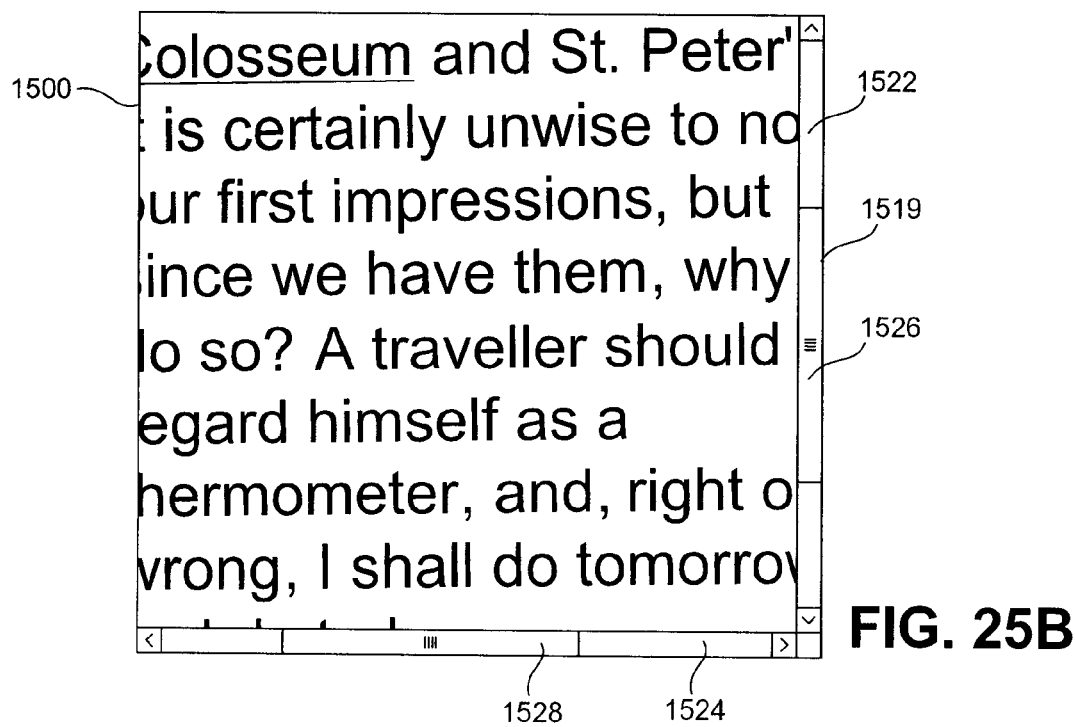

Other gestures may be performed in the 3D input space 60 and interpreted by the computing device 28 for manipulation of the URIs, the digital content and the captured image. For example, the user may apply two fingers over print matter in the 3D input space 60 and then move them apart in order to zoom into the captured image of the print matter. Conversely, moving the two fingers towards each other results in zooming out of the captured image. For example, FIG. 25A shows an image 1500 captured by the 3D input device 60 that has been detected and is shown in a window 1519. Textual objects and non-textual objects of the image 1500 are recognized, digital contents 1502 to 1508 are superimposed on the recognized image 1500, and a line 1510 is inserted under certain recognized character strings, namely "Colosseum" in the embodiment shown. Two fingers 1512 and 1514 positioned in the 3D input space 60 by the user are moved apart, as denoted by the two arrows 1516 and 1518, to zoom into the captured image 1500. The computing device 28 identifies this zooming gesture, and then magnifies the captured image 1500 and places a vertical scroll bar 1522 and a horizontal scroll bar 1524 along the edges of the window 1519, as shown in FIG. 25B. The scroll bars 1522 and 1524 enable a user to pan through the zoomed image to view different portions of the image 1500 within the window 1519. Moving a slider 1526 of the vertical scrollbar 1522 in one direction causes the content within the window 1519 to scroll vertically in the opposite direction. Similarly, moving a slider 1528 of the horizontal scrollbar 1524 in one direction causes the content within the window 1519 to scroll horizontally in the opposite direction. In this embodiment, the zoom in and zoom out gestures only alter the size of the textual and non-textual objects, leaving the size of the superimposed digital content, such as icons, pictures and 3D objects, unchanged.

Figure 26:
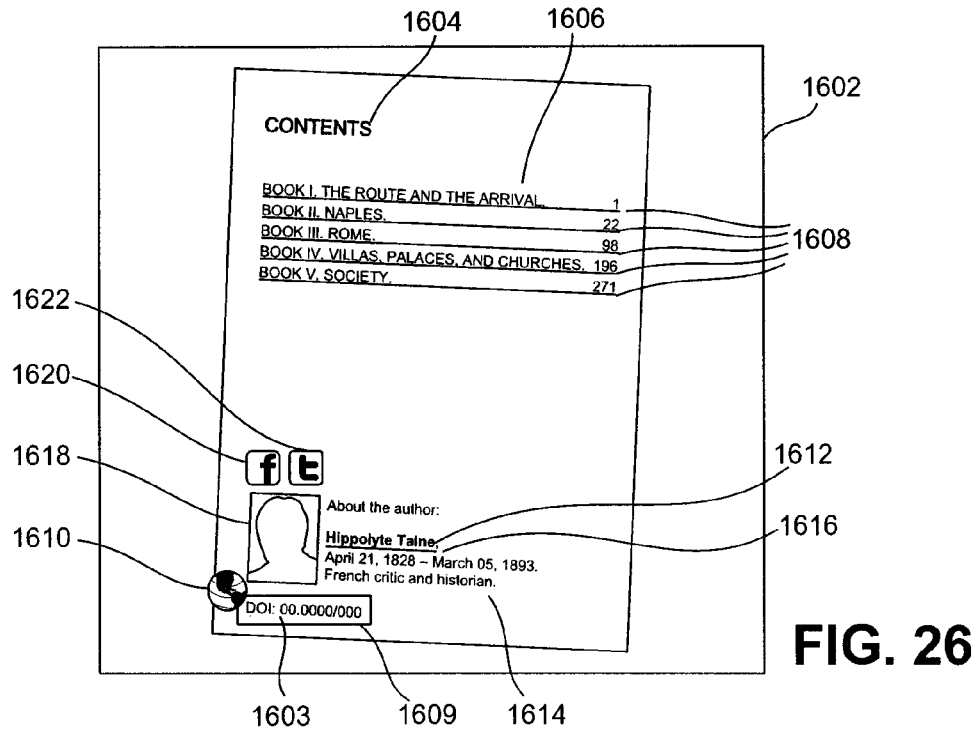
FIG. 26 illustrates digital content superimposed on an image of alternative print matter in the 3D input space.

FIG. 26 shows an example of a captured image 1602 of a typical preface of a publication received by the computing device 28. The computing device 28 recognizes textual and non-textual objects within the image 1602 in the manner described above. In the example shown, the computing device 28 detects the character string 1603 comprising a character string "DOI" followed by some digits, and determines that the character string 1603 corresponds to, and therefore represents, a naming scheme of the Digital Object Identifier (DOI®) System for identifying digital content objects. The computing device 28 then automatically executes a search in a DOI database, with which it is in communication, to find content associated with the DOI number 1603. If, for example, the content is a publication, then the search returns information about the author, the publisher, the publishing date and the abstract, among other information. The computing device 28 also recognizes the character string "CONTENTS" 1604, and that the textual object 1606 includes a plurality of lines of text ending with a numeral. The computing device 28 determines that this combination of items is in the form of a table of contents, and then searches information of each entry of the recognized table of contents using the text 1606 and the DOI number 1603. An underline 1608 is inserted under each line of text 1606, and each underline 1608 is set as a hot zone comprising a hyperlink to the relevant information found by the search. A box 1609 is superimposed around the DOI number 1603, and an icon 1610 is also superimposed on the image 1602 adjacent to the DOI number 1603. The icon 1610 is hyperlinked to the content associated with the DOI number 1603.

The computing device 28 also recognizes the character string 1612, and analyzes the character string 1612 and adjacent textual object 1614 and non-textual object 1618, and determines that the character string 1612 refers to the name of the author and that the non-textual object 1618 is the picture of the author, using semantic technology or other suitable methods. A local or remote search for the author's name 1612 is subsequently conducted. In this example, entries matching the author's name 1612 are uncovered, such as a Facebook™ related URI and a Twitter™ related URI. The computing device 28 then superimposes an underline 1616 below the author's name 1612, and associates the author's name 1612 with the author's picture 1618. A Facebook icon 1620 and a Twitter icon 1622 are also superimposed adjacent to the author's picture 1618, and each icon 1620 and 1622 is hyperlinked to its respective URI.

Figure 27A:
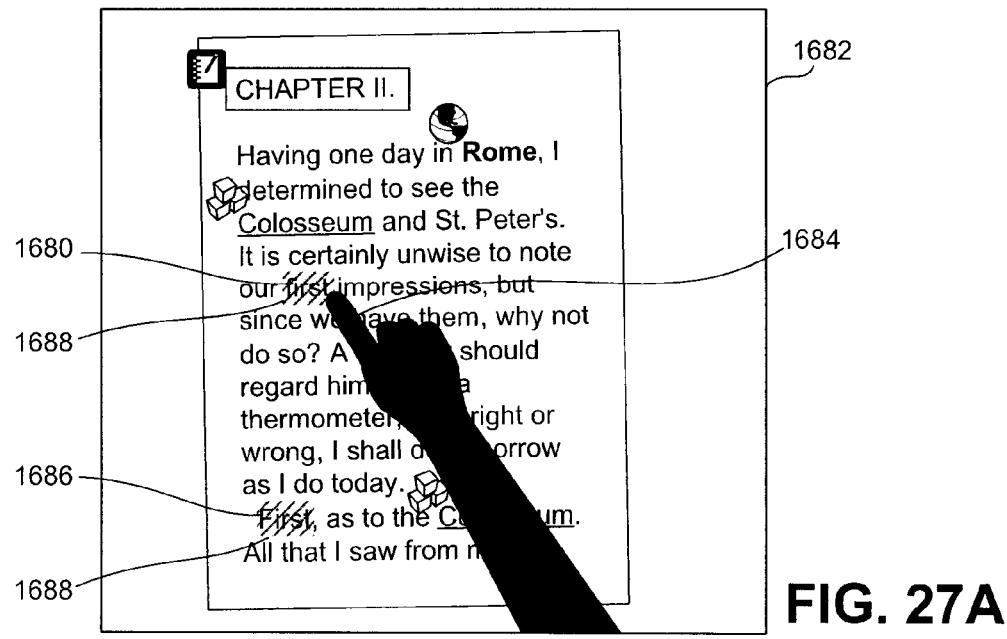
FIGS. 27A and 27B illustrate selection of recognized text superimposed on the print matter image.
Figure 27B:
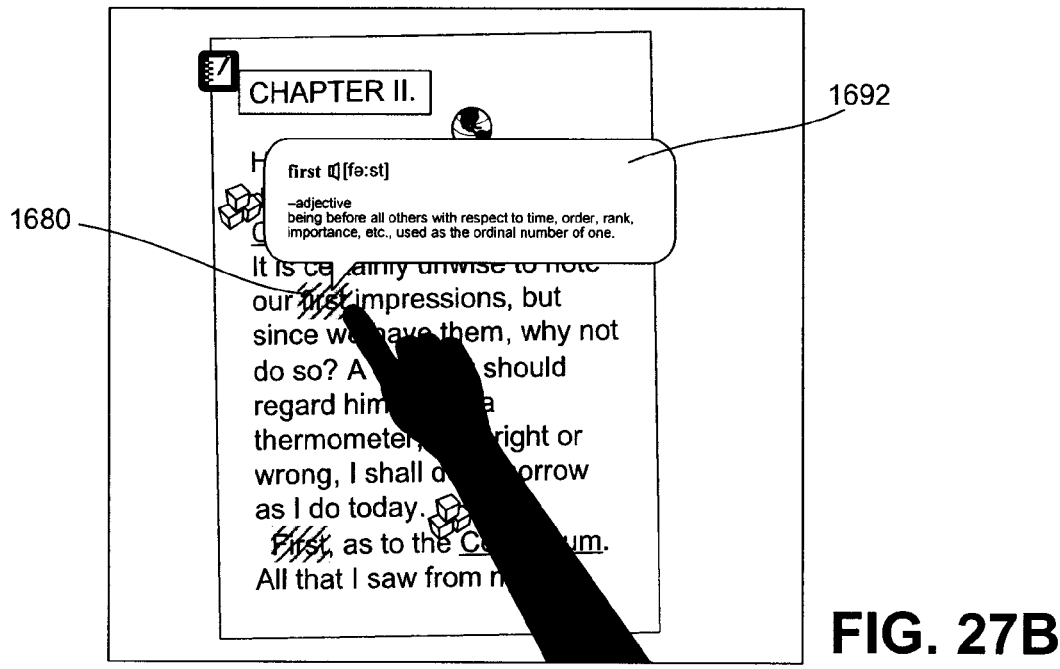

Character strings that are recognized in images may be selected by users. For example, FIG. 27A shows a captured image 1682 comprising a character string 1680 corresponding to the word "first". To select the character string 1680, a pointer 1684, such as a user's finger, is pointed to the word 1680 and is moved over the word 1680. The computing device 28 recognizes this action as a selection gesture. The computing device 28 then conducts a search for any other occurrence of the selected word 1680 within the recognized image 1682, and superimposes a highlight color 1688 on each match 1686, including the instance of the character string 1680 selected by the user. If the pointer 1684 dwells over the word 1680 for longer than a threshold time period, then the computing device 28 launches a local or remote dictionary search to find the definition of the word 1680. Here, the computing device 28 superimposes a time indicator (not shown) adjacent the pointer 1684, and starts a timer to determine the dwell time of the pointer 1648. When the dwell time exceeds a threshold time, the dictionary search is then launched. The results of the dictionary search are then displayed adjacent the word 1680 as a bubble 1692 superimposed on the image 1682, as shown in FIG. 27B.

Figure 28:
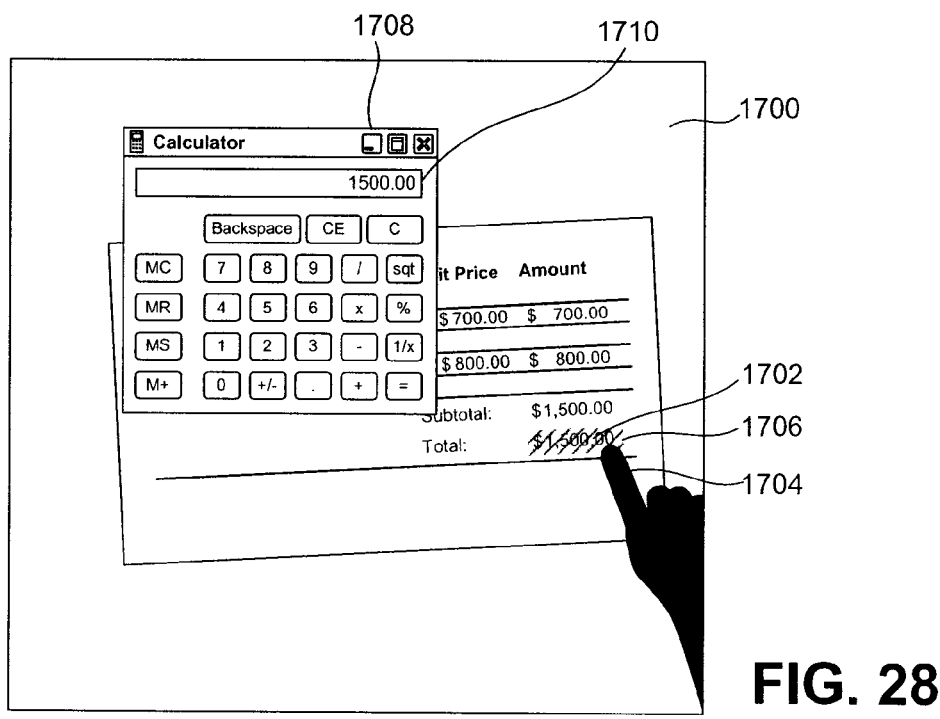
FIG. 28 illustrates execution of a calculator application program upon selection of recognized text superimposed on the print matter image.

Selection gestures may be used to launch other relevant application programs. For example, FIG. 28 shows a captured image 1700 that is recognized, and in which characters 1702 are interpreted as numerals representing a number. When a user performs a selection gesture on the recognized number 1702 using a finger 1704, as described above, the computing device 28 superimposes a highlight color 1706 on the selected number 1702 and launches a calculator application program 1708, which is superimposed on the image 1700. The selected number 1702 is then shown in an input portion 1710 of the calculator program 1708.

Figure 29A:
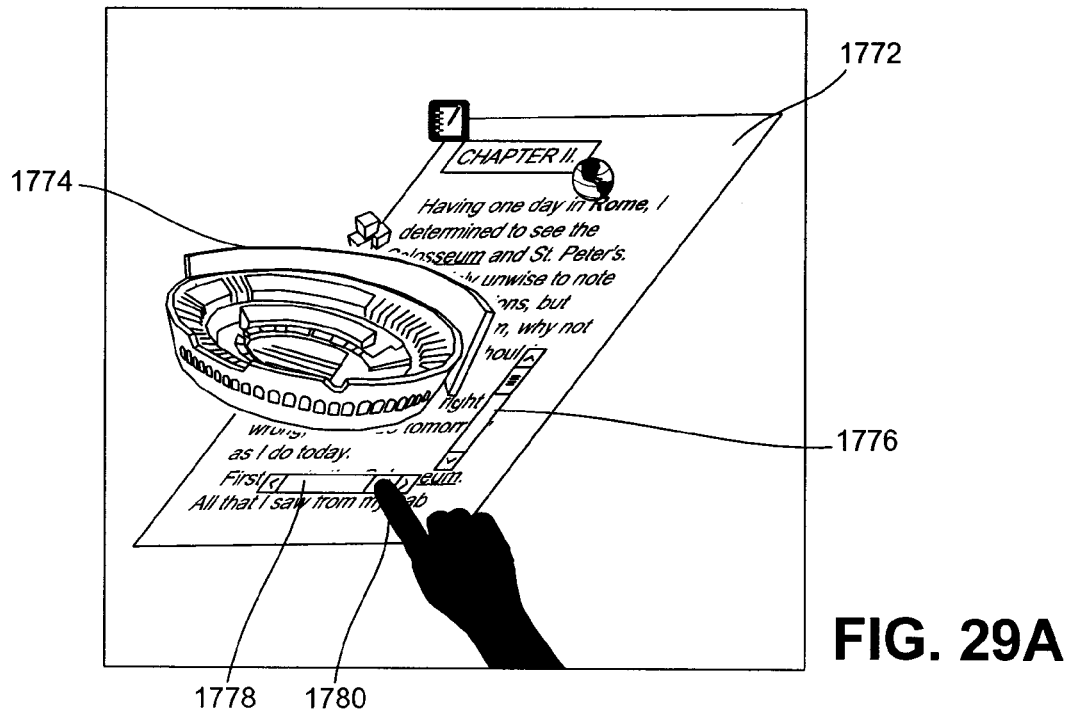
FIGS. 29A and 29B illustrate manipulation of a 3D object superimposed on an alternative print matter image.
Figure 29B:
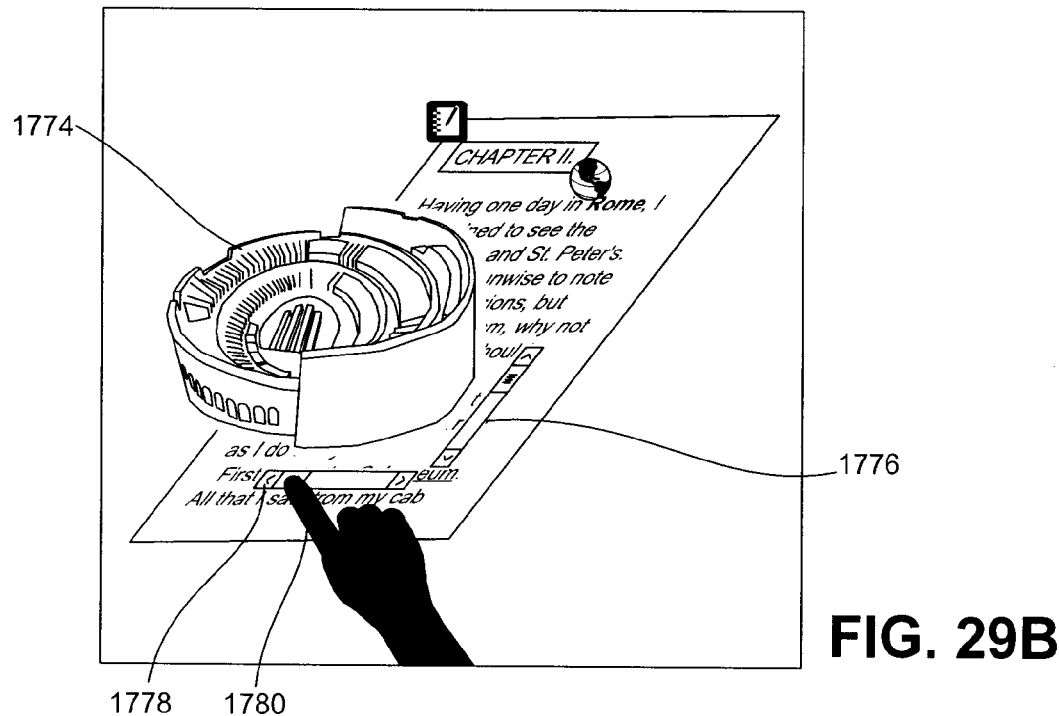

FIGS. 29A and 29B show a view change feature provided by the interactive input system 20. Here, a software button (not shown) is selectable for causing the computing device 28 to transform a captured image 1772 from a plan view to a 2D perspective view. The captured image 1772 is displayed on the 2D interactive surface 24 as a plane of a virtual 3D space, with hyperlinks and digital content superimposed on the image 1772. For example, referring to FIGS. 24A and 29A, hyperlinked digital content, such as a 3D object 1774, is shown in the virtual 3D space and is displayed on the 2D interactive surface 24. The user then selects the 3D object 1774, and a "vertical" scroll bar 1776 and a "horizontal" scroll bar 1778 are placed adjacent to the 3D object 1774. The user may slide a finger 1780 in the 3D input space 60 on the "horizontal" scroll bar 1778 to rotate the 3D object 1774, as shown in FIG. 29B. Alternatively, the user may slide the finger 1780 in the 3D input space 60 on the "vertical" scroll bar 1776 to zoom in or zoom out the 3D object 1774.

In other embodiments, the links and the digital content may alternatively be manipulated by a user through interaction with the 2D interactive surface 24 using a pointer. In these embodiments, the 2D interactive surface 24 detects pointer contacts thereon, and generates contact events, such as pointer-up, pointer-down, pointer-move, together with the coordinates of the contacts. The contact events are communicated to the computing device 28, which determines gestures, and then translates the contact events and the gestures into commands for manipulating the links and digital content.

Figure 30A:
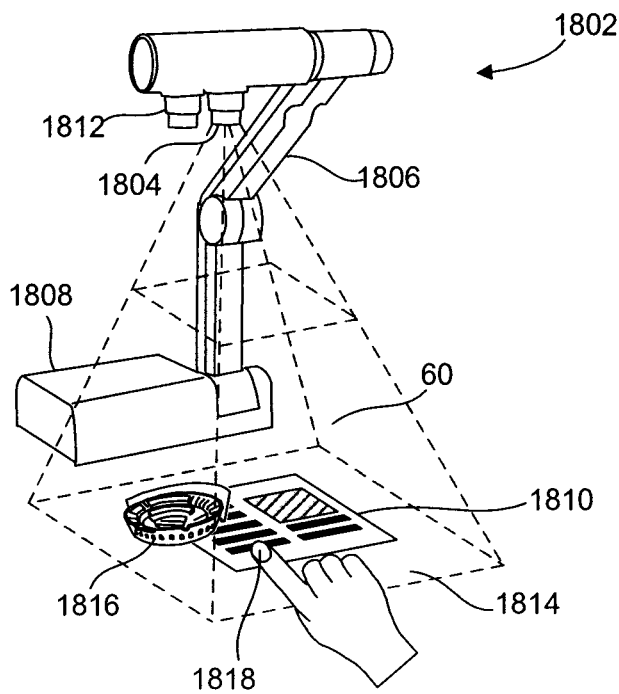
FIGS. 30A and 30B illustrate another embodiment of a 3D input device forming part of the interactive input system of FIG. 1A.
Figure 30B:
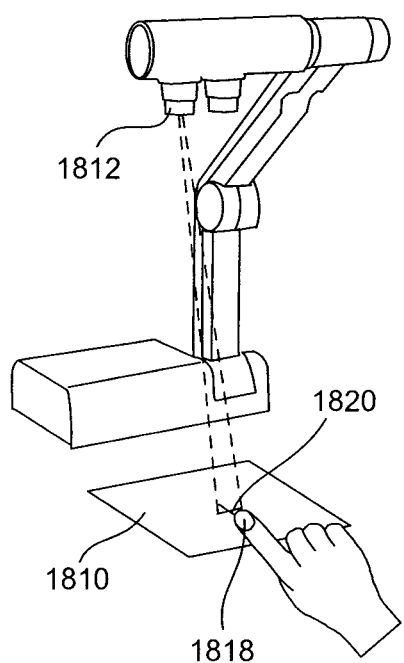

The 3D input device is not limited to that described above, and in other embodiments, other 3D input devices may be used. For example, FIG. 30A shows another embodiment of a 3D input device, which is generally indicated by reference numeral 1802. 3D input device 1802 comprises a camera 1804 mounted to a base 1808 via an articulated arm 1806.

Similar to the 3D input device 52 described above and with reference to FIG. 1A, the camera 1804 has a field of view of a 3D input space 60 within which print matter 1810 is located. The 3D input device 1802 also comprises a light projecting component 1812 that projects light towards the bottom plane 1814 of the 3D input space 60. In this embodiment, the light projecting component 1812 is a digital projector. The light projecting component 1812 projects the same links and digital contents onto the print matter 1810 in the 3D input space 60 as those which are superimposed on captured images (not shown) that are displayed on the 2D interactive surface 24. The light projecting component 1812 projects digital content 1816 onto the bottom plane 1814 of the 3D input space 60, and this same digital content is also projected onto the 2D interactive surface 24 (not shown). The projected digital content 1816 superimposes the print matter 1810 at the appropriate coordinates on the print matter 1810 corresponding to the location coordinates on the captured image displayed 2D interactive surface 24.

The 3D input device 1802 is also configured to detect the location of the tip of a pointer as described before, in a manner similar to 3D input device 52 described above and with reference to FIG. 1A. Upon detection of the location of the pointer tip, the projecting device 1812 then projects a mark 1820 onto the print matter 1810 at the detected pointer tip location to aid the user with manipulation. In the embodiment shown, the mark 1820 is a crosshairs image.

Figure 31:
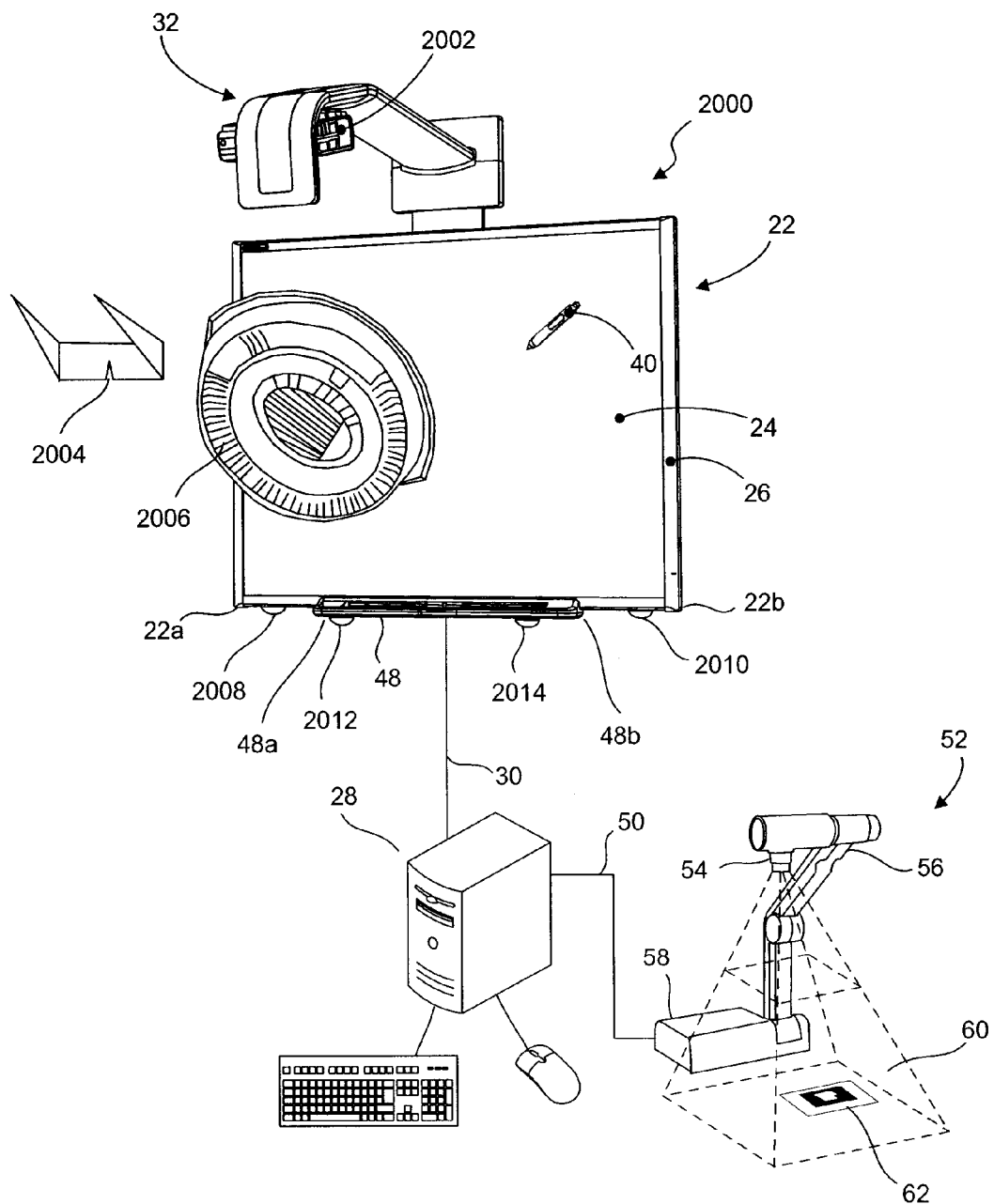
FIG. 31 is a perspective view of a stereoscopic 3D interactive input system having a 3D input space, according to another embodiment.

Turning now to FIG. 31, a stereoscopic interactive input system having a three-dimensional (3D) input space according to another embodiment is shown and is generally identified by reference numeral 2000. The interactive input system 2000 is generally similar to the interactive input system 20 described above and with reference to FIG. 1A. For ease of description, the components of interactive input system 2000 that are the same as those of interactive input system 20 are identified using the same reference numerals as in FIG. 1A, and are not described below.

In this embodiment, the projector 2002 is a 3D-capable projector that is capable of projecting a 3D image onto the 2D interactive surface 24. By using 3D glasses 2004, the user is able to view stereoscopic 3D images of digital content 2006 displayed on the 2D interactive surface 24. The 3D glasses 2004 provide the user with a sense of depth perception for the displayed digital content 2006.

The interactive input system 2000 also comprises one or more proximity sensors that are configured for sensing the presence of objects, such as a user, in proximity with the interactive board 22. The proximity sensors are in communication with the master controller accommodated by the tool tray 48. In this embodiment, a first pair of proximity sensors 2008 and 2010 are mounted on an underside of the interactive board 22, with each sensor 2008 and 2010 being positioned adjacent a different respective bottom corner 22a and 22b of the interactive board, and a second pair of proximity sensors 2012 and 2014 mounted on an underside of the tool tray 48 adjacent the detachable tool tray modules 48a and 48b received by opposite ends of the tool tray. The distance between the sensors 2012 and 2014 is selected to be greater than the width of an average adult person. Further specifics of the proximity sensors and their mounting locations on the tool tray 48 are described in PCT Application No. PCT/CA2011/000657 to Tse et al., filed on Jun. 6, 2011, and entitled "INTERACTIVE INPUT SYSTEM AND METHOD", the content of which is incorporated herein by reference in its entirety.

Similar to the interactive input system 20 described above, when a marker 62 is brought into the 3D input space 60 and is captured in an image acquired by the camera 54, the computing device 28 recognizes a pattern on the marker 62, and associates the marker with digital content or a digital tool. For example, FIG. 31 shows the marker 62 that is associated with digital content 2006 in the form of a stereoscopic 3D graphic object representing a stadium.

Figure 32:
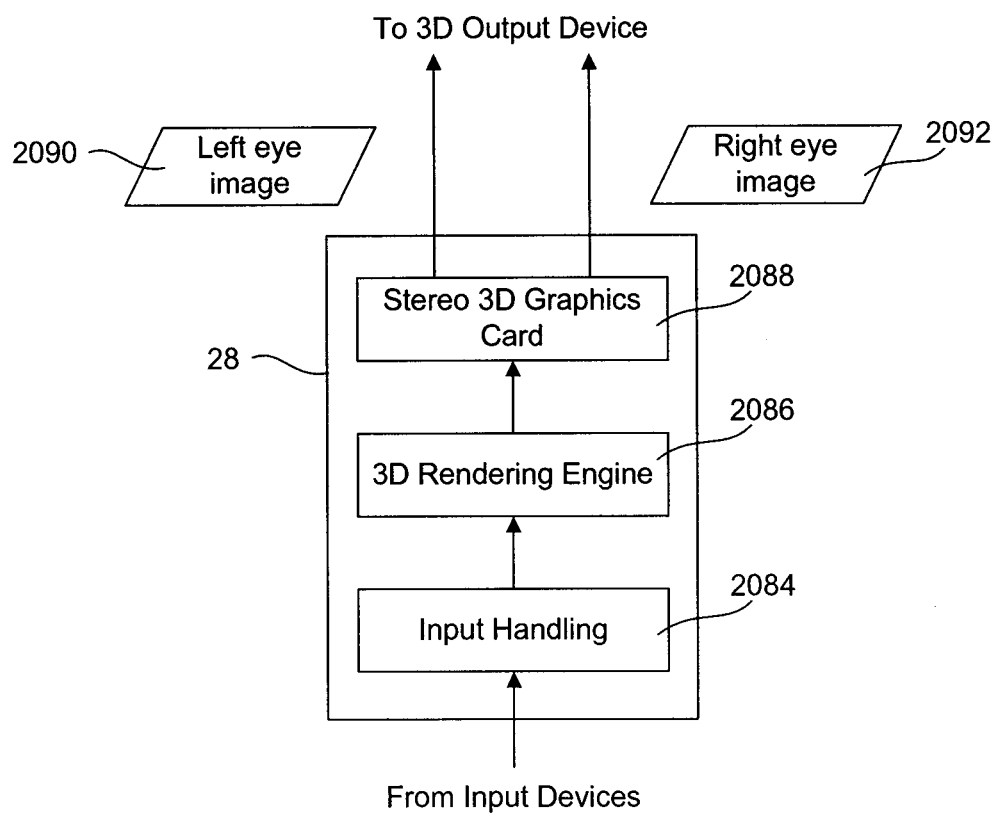
FIG. 32 is a schematic diagram showing the software architecture of the stereoscopic 3D interactive input system of FIG. 31.

FIG. 32 is a block diagram illustrating the architecture of the interactive input system 2000, and which enables 3D content to be generated. In this embodiment, the architecture is embodied in the computing device 28, and comprises an input handling module 2084, a 3D rendering engine 2086 and a stereo 3D graphics card 2088. The input handling module 2084 receives 3D content manipulation input from various input devices such as the camera 54, the interactive whiteboard 22, the mouse, keyboard or other suitable input device, and instructs the 3D rendering engine 2086 to produce an image that is based on stored 3D data in a manner well known to those skilled in the art. The 3D data is then processed by the stereo 3D graphics card 2088 and a left eye image 2090 and a right eye image 2092 are generated for viewing by the left and right eyes, respectively, of the user. The left eye image 2090 is generally offset from the right eye image 2092 with the amount of offset determining the 3D depth of the object. The left eye and right eye images 2090 and 2092 are then sent to the projector 2002, which alternately projects the left eye and right eye images 2090 and 2092 on the 2D interactive surface 24 rapidly. Although not shown, the 3D glasses 2004 comprise active shutters that control the opaqueness of the two lenses of the glasses 2004. When the glasses 2004 are turned off, the shutters are conditioned to a state such that both lenses are transparent, thereby allowing both eyes of the user to see through the glasses. When the glasses 2004 are turned on, the shutters are conditioned to switch on and off in synchronization with the timing and frequency of the alternately projected left eye and right eye images 2090 and 2092 on the 2D interactive surface 24. Therefore, when the left eye image 2090 is projected on the 2D interactive surface 24, the left-eye shutter of the glasses 2004 is transparent and the right-eye shutter of the glasses 2004 is opaque, so that only the user's left eye sees the left eye image 2090. Similarly, when the right eye image 2092 is projected on the 2D interactive surface 24, the left-eye shutter of the glasses 2004 is opaque and the right-eye shutter of the glasses 2004 is transparent so that only the user's right eye sees the right eye image 2092. As a result, the user senses the illusion of 3D content.

Figure 33A:
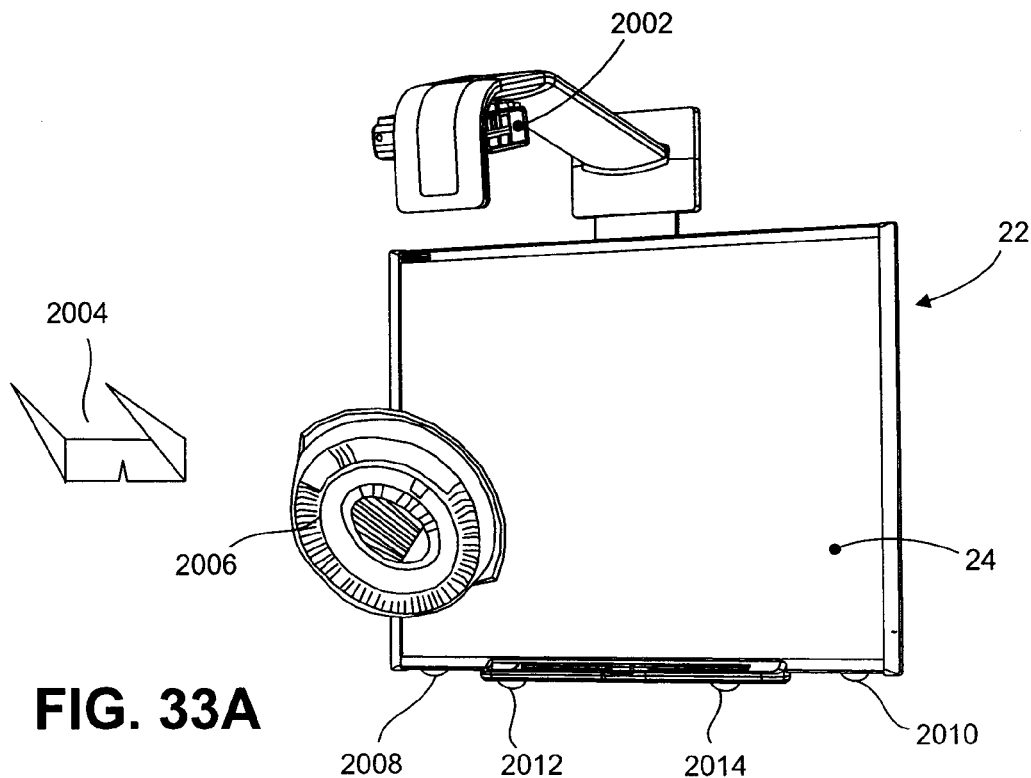
FIGS. 33A to 33D illustrate manipulation of 3D content using touch detection.
Figure 33B:
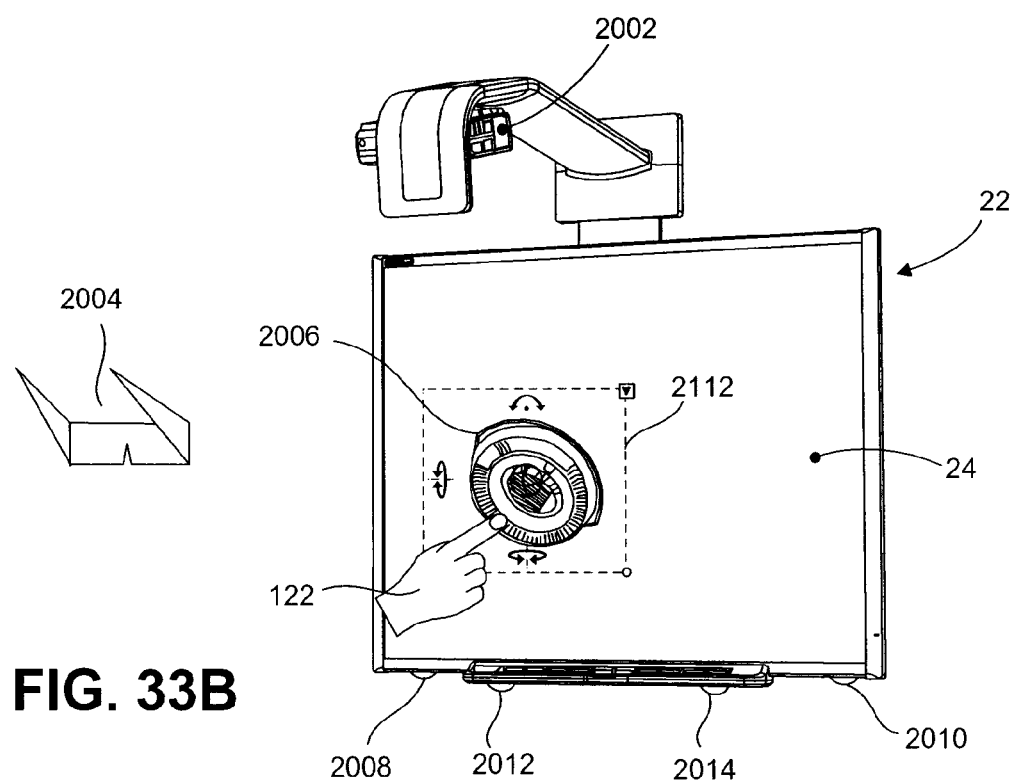
Figure 33C:
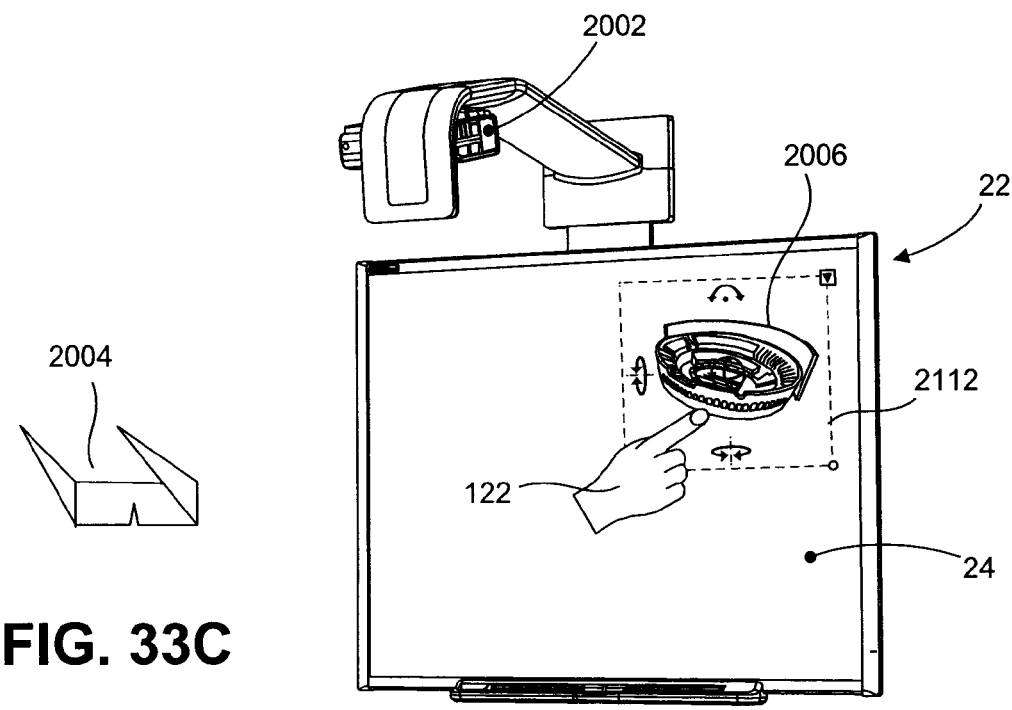
Figure 33D:
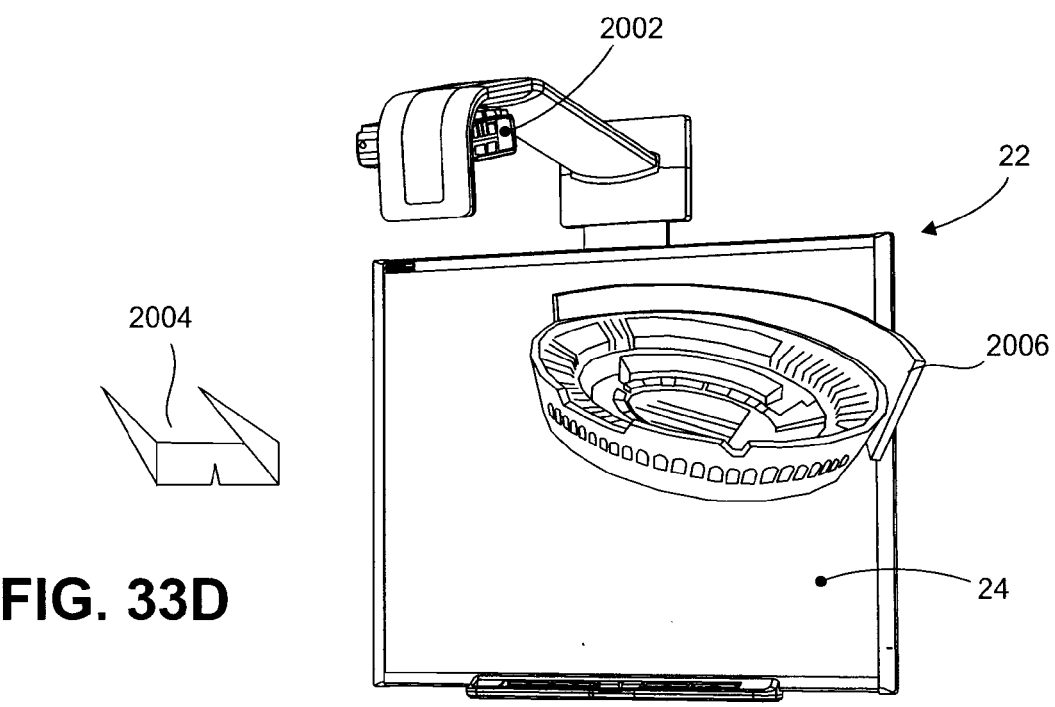

FIGS. 33A to 33D illustrate a method of manipulating of a 3D object on the two-dimensional 2D interactive surface 24. In FIG. 33A, 3D content 2006 in the form of a stereoscopic graphic object representing a stadium is displayed on the interactive board 22 and is visible to the user wearing the 3D glasses 2004. By virtue of the operation of the 3D glasses 2004, to the user, the 3D content appears to hover above the interactive board 22. In FIG. 33B, the user approaches the interactive board 22. As the user approaches a predefined proximity of the interactive board 22, the user's presence is detected by one or more of the proximity sensors 2008, 2010, 2012 and 2014. The computing device 28 in response to proximity sensor output modifies the image output provided to the projector 2002 so that the hovering graphic object 2006 reduces in size and transitions to a graphic object 2006 on the plane of the 2D interactive surface 24 through a smooth animation to provide the user with the illusion that the graphic object 2006 has moved down to the 2D interactive surface 24. When a pointer 122 operated by the user touches the graphic object 2006 on the 2D interactive surface 24, a graphic object manipulation tool in the form of a selection box 2112 as described above is presented on the 2D interactive surface 24 surrounding the graphic object 2006. The user may touch the graphic object 2006 or one or more of the control handles on the selection box 2112 to manipulate the graphic object 2006. For example, as shown in FIG. 33C, the pointer 122 has moved the graphic object 2006 to the top right corner of the interactive board 22 and has also manipulated the point of view of the graphic object 2006. In FIG. 33D, as the pointer 122 has moved beyond the predefined proximity of the interactive board 22, the computing device 28 modifies the image output provided to the projector 2002 so that the graphic object 2006, through a smooth transition animation as seen by the user wearing the 3D glasses 2004, "floats" from the plane of the 2D interactive surface 24 to a hovering state at a position and perspective corresponding to the last position of the graphic object 2006 on the plane of the 2D interactive surface 24.

If there is more than one 3D graphic object hovering above the 2D interactive surface 24, all 3D graphic objects transition to the plane of the 2D interactive surface 24 when the user approaches the predefined proximity of the interactive board 22. Of course, if desired, in an alternative embodiment, if there is more than one 3D graphic object hovering above the 2D interactive surface 24, only graphic objects within the user's proximity transition to the plane of the 2D interactive surface 24 while the rest remain hovering above the 2D interactive surface 24.

Figure 34:
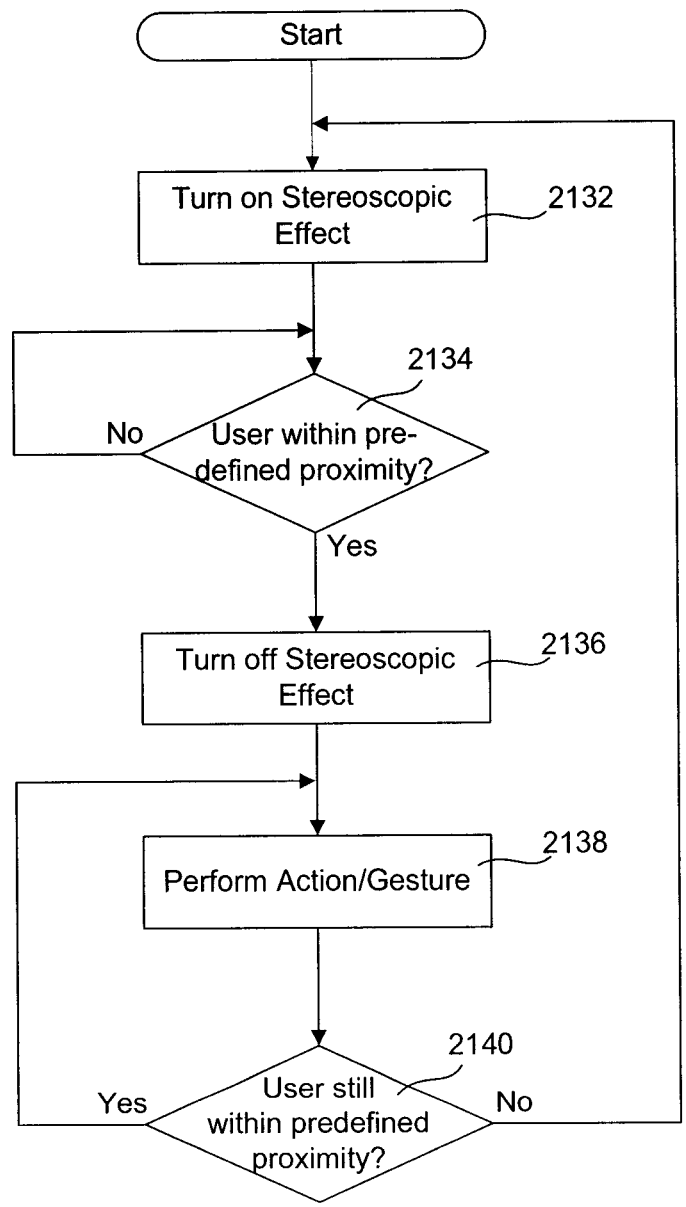
FIG. 34 is a flowchart showing the steps performed during manipulation of 3D content using proximity detection.

FIG. 34 shows the steps performed during manipulation of 3D graphic objects on a 2D surface such as 2D interactive surface 24. The process begins with a stereoscopic 3D graphic object 2006 being projected on the 2D interactive surface 24 and the 3D glasses 2004 worn by the user turning on and operating to create the stereoscopic effect (step 2132). As a result, the graphic object appears to hover over the interactive board 22. The computing device 28 then performs a check to determine if a user has entered the predefined proximity of the 2D interactive surface 24 as detected by one or more of the proximity sensors (step 2134). If there is no user within the predefined proximity of the 2D interactive surface 24, then the display of the 3D graphic object hovering above the interactive board 22 continues and the process loops to again check to determine if a user has entered the predefined proximity. When a user is detected within the predefined proximity, the stereoscopic 3D graphic effect is turned off (step 2136). At this step, an animation is produced showing the 3D object smoothly transitioning from its hovering state above the 2D interactive surface 24 to a location on the plane of the 2D interactive surface 24 (e.g., by reducing the offset between the left eye and right eye images 2090 and 2092 and by reducing the size of the graphic object). When the left eye and right eye images 2090 and 2092 become identical, the stereoscopic 3D effect is effectively turned off. Optionally, the 3D glasses 2004 may also be turned off or be conditioned to set both shutters to on. The computing device 28 then processes any gestures or actions that have been made by the user interacting with the graphic object 2006 (step 2138). The flowcharts showing the steps performed in response to manipulation gestures are illustrated in FIGS. 11A to 11E. A check is then made by the computing device 28 to detect if the user is still within the predefined proximity of the 2D interactive surface 24 (step 2140). If the user is still present, then the image output provided to the projector 2002 will still appear on the same plane as the 2D interactive surface 24 and the user can continue to manipulate the graphic object. If the user is no longer within the predefined proximity, the stereoscopic effect of the 3D glasses 2004 is turned back on (step 2132) with an animation produced showing the manipulated 3D graphic object 2006 transitioning back to a hovering state above the interactive board 22.

Those skilled in the art will understand that actions and manipulations can include, e.g., moving the object, rotating the object, changing the "distance" between the object and the 2D interactive surface 24 by resizing the object, and the like. Those skilled in the art will also understand that more than one touch may be used to complete the gestures.

In an alternative embodiment, instead of using proximity detection, the computing device 28 may turn the stereoscopic effect of the 3D glasses 2004 on and off based on touch. For example, when the user touches the 2D interactive surface 24, the stereoscopic effect of the 3D glasses is turned off with the graphic object animating to "land" on the 2D interactive surface 24 at the touch location. The user may then manipulate the graphic object. When no touch on the 2D interactive surface 24 is detected for a threshold amount of time, the stereoscopic effect of the 3D glasses 2004 is turned on with the graphic object animating to a hovering state above the interactive board 22.

Figure 35A:
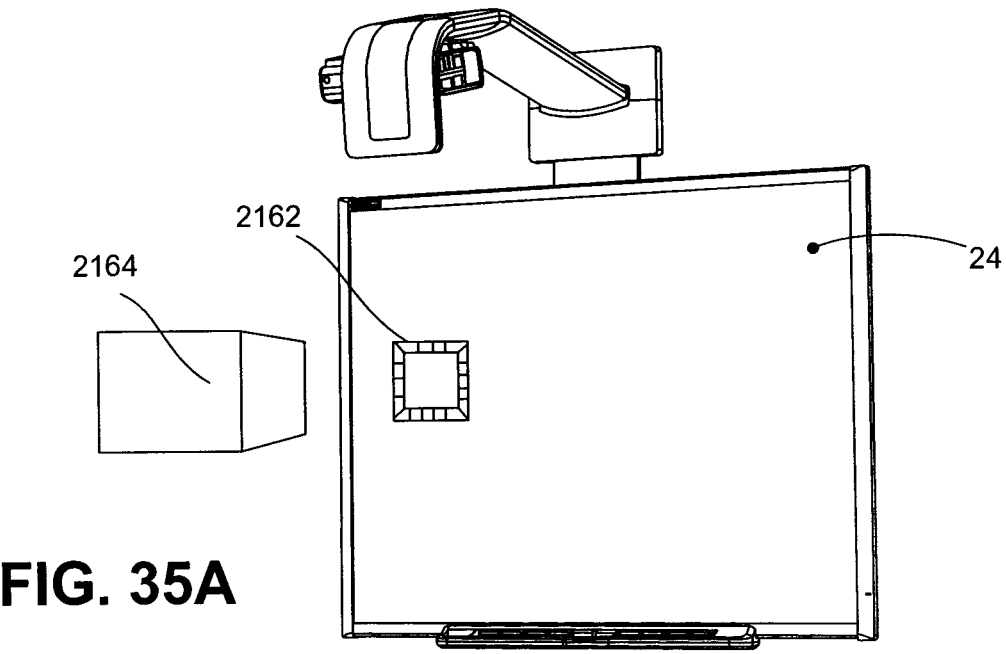
FIGS. 35A to 35D illustrate manipulation of 3D content using stereo tractor beam interaction.
Figure 35B:
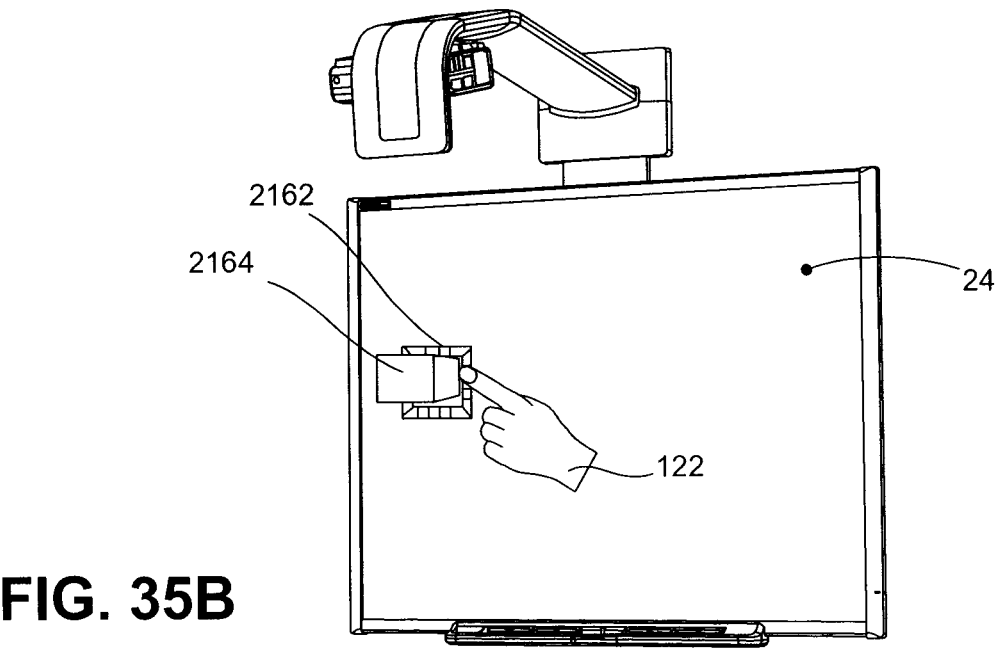
Figure 35C:
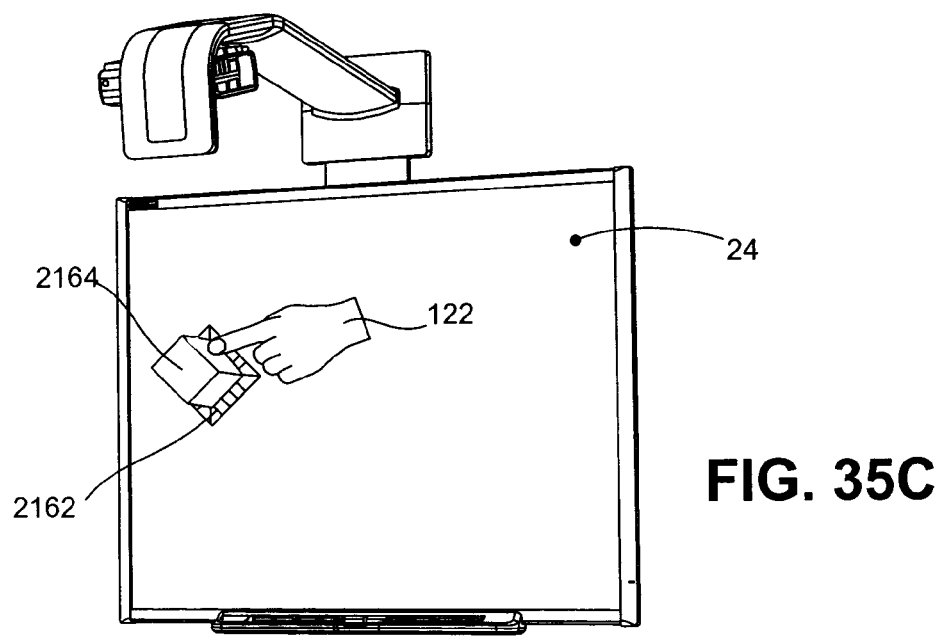
Figure 35D:
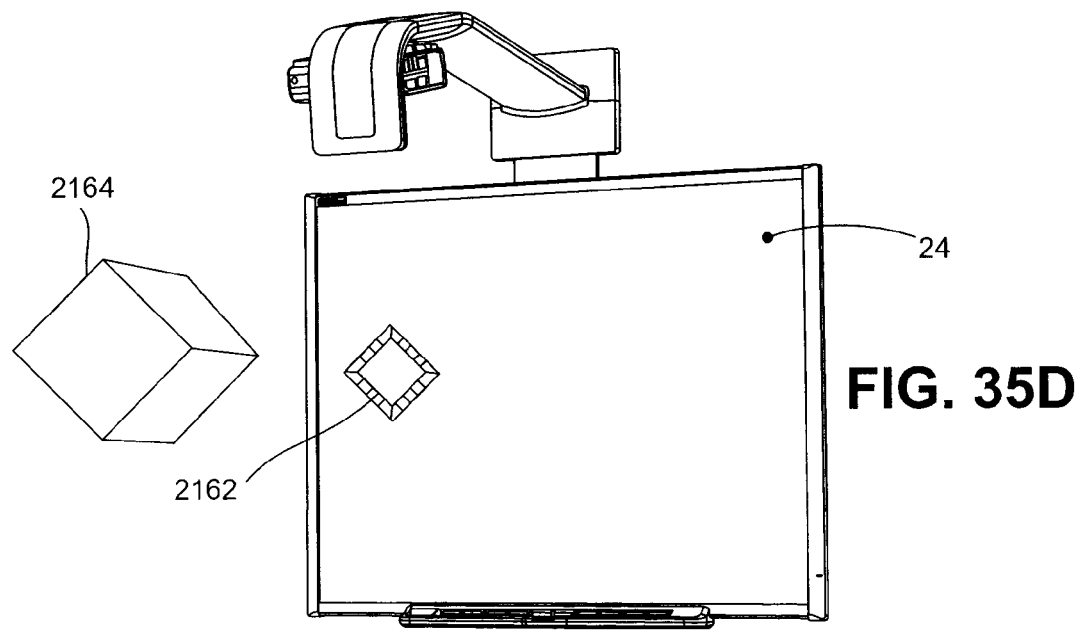

FIGS. 35A to 35D show yet another embodiment of direct manipulation of a 3D graphic object on a 2D interactive surface 24 through stereo tractor beam interaction. In FIG. 35A, a halo 2162 appears on the 2D interactive surface 24 beneath the 3D graphic object 2164. In FIG. 35B, when the pointer 122 touches the halo 2162, the stereoscopic 3D effect is turned off with an animation produced showing the graphic object 2164 smoothly transitioning from a hovering state above the 2D interactive surface 24 to a "landing" state on the plane of the 2D interactive surface 24 at the user's touch location. In FIG. 35C, the pointer 122 manipulates the graphic object 2164. In FIG. 35D, the user is no longer manipulating the graphic object 2164 (e.g., not touching the 2D interactive surface 24 for a threshold period of time). As a result, the 3D graphic object 2164 transitions to the hovering state above the interactive board 22, through a smooth animation.

Figure 36A:
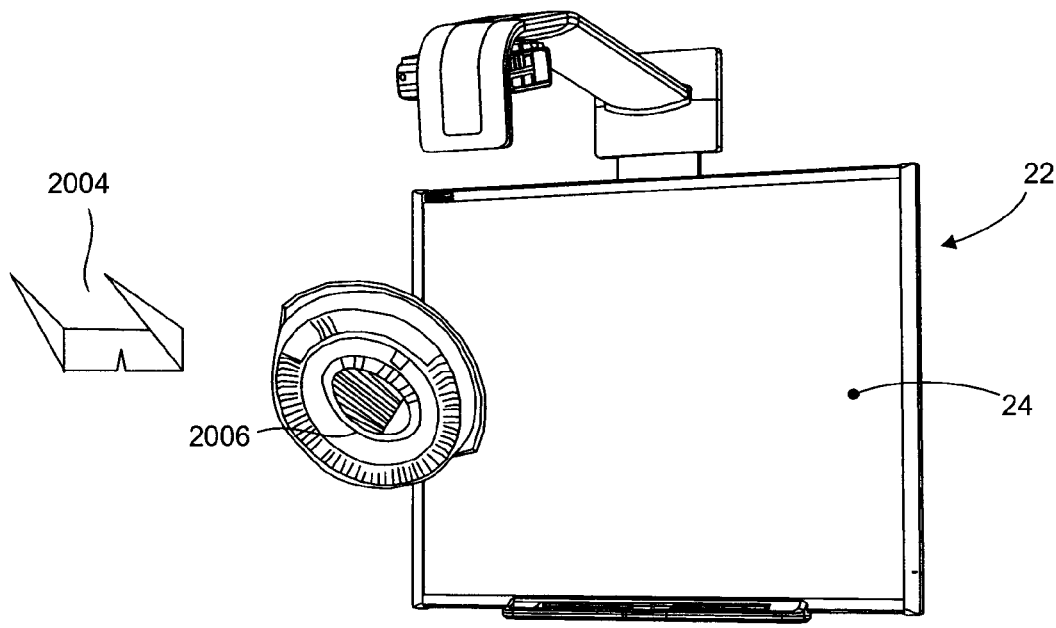
FIGS. 36A and 36B illustrate manipulation of 3D content using proximity detection.
Figure 36B:
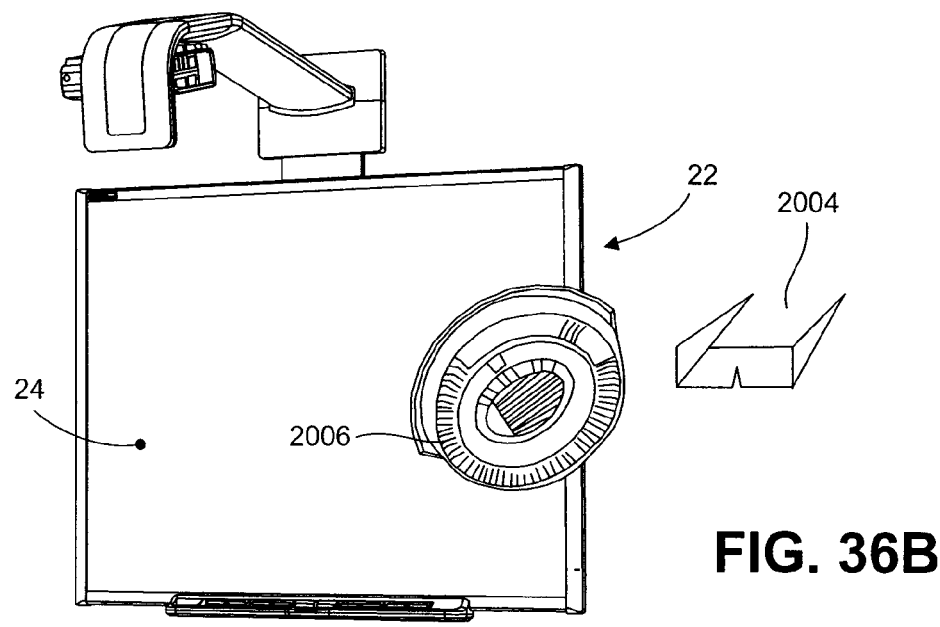

FIGS. 36A and 36B show yet another alternative manipulation technique that makes use of the proximity sensors. In FIG. 36A, the user wearing the stereoscopic 3D glasses 2004 is viewing the 3D graphic object 2006 from the left side of the interactive board 22. The proximity sensors (not shown) detect the area where the user is currently standing. In FIG. 36B, the proximity sensors (not shown) detect that the user wearing the stereoscopic glasses 2004 has moved to the right side of the interactive board 22. In response, the computing device 28 moves the 3D graphic object 2006 towards the right side of the 2D interactive surface 24, through a smooth animation.

In an alternative embodiment, proximity sensors can be used to detect the position of the user. By tracking the position of the user's finger and position of their body with a time-of-flight (TOF) camera for example, 3D graphic objects selected by the user can be determined and highlighted.

Figure 37:
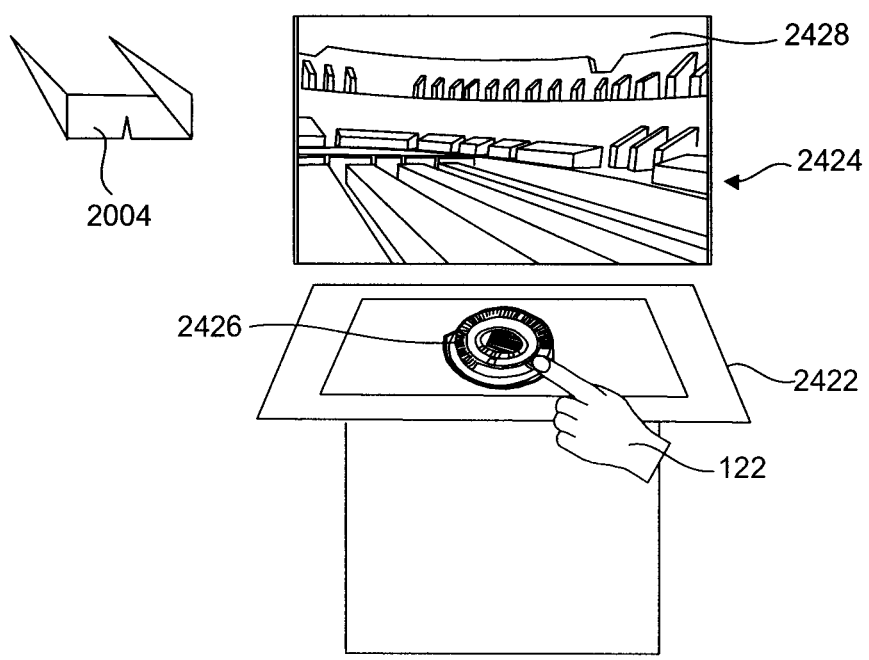
FIG. 37 is a perspective view of a dual display stereoscopic 3D interactive input system, according to another embodiment.

FIG. 37 shows direct manipulation of 3D content with a dual display configuration according to another embodiment. In this embodiment, a horizontal 2D interactive surface 2422 displays a graphic object 2426. A vertical display 2424 that is proximate surface 2422 displays a three-dimensional stereoscopic view 2428. As the pointer 122 manipulates the graphic object 2426 on the 2D interactive surface 2422, the 3D view 2428 presented on the vertical display 2424 is adjusted accordingly. In this embodiment, the graphic object displayed on the 2D interactive surface 2422 is an interactive map or building layout that can be manipulated while the vertical display produces a 3D street level view of a portion of the map or building layout.

Although in the embodiment shown in FIGS. 3A to 4B, the translation of a 3D object may be conditioned to the 3D translation mode by applying a camera icon to a desired location of the 2D interactive surface 24, or conditioned to the 2D translation mode by removing the camera icon from the 2D interactive surface 24, in some alternative embodiments, other methods may be used to condition the translation of 3D objects to 3D or 2D translation mode, e.g., by checking or unchecking a 3D/2D translation mode option. In yet some other embodiments, the translation of 3D objects is always conditioned to 2D translation mode or 3D translation mode. In still some other embodiments, the translation mode of 3D objects is related to the canvas page. Thus, if the host application program (e.g., SMART Notebook™) comprises multiple canvas pages, the user may set each page to a desired translation mode, and different pages may be set to different translation modes.

Although in the above embodiments, the interactive board 22 is described as being mounted on a vertical support surface, those skilled in the art will appreciate that the interactive board may be supported on a stand or other suitable framework or suspended from overhead architecture. Of course interactive boards employing other machine vision configurations, analog resistive, electromagnet, capacitive, acoustic or other technologies to register pointer input may be employed. Also, rather than taking a vertical configuration, the interactive board may be in the form of a touch table comprising a horizontally oriented 2D interactive surface.

Although in above embodiments, the 3D input space is defined as a pyramidal frustum shape, those skilled in the art will appreciate that the 3D input space may take other 3D shapes such as for example, a cube, a cylinder or a sphere. In this case, the planes are also properly defined according to the shape of the 3D interactive space, and may not necessarily be a flat plane.

Those skilled in the art will appreciate that variations of input devices can be utilised. Input devices can include an interactive whiteboard, an interactive table, and interactive tablets.

Those skilled in the art will appreciate that in some alternative embodiments, the selection box of a 3D object may comprise different rotation control handles. For example, in one alternative embodiment, the selection box of a 3D object may only comprise an x-rotation control handle. In another alternative embodiment, the selection box of a 3D object may only comprise a y-rotation control handle. In yet another alternative embodiment, the selection box of a 3D object may comprise x-, y- and z-rotation control handles but no arcball free-rotation control handle. In still an alternative embodiment, users may be allowed to customize what rotation control handles shall be displayed.

Those skilled in the art will also appreciate that some control regions may not comprise representative images (i.e., the image of control handles). Also, the control regions defined in the selection box of a 3D object may vary depending on system design. User may be allowed to customize what control regions shall be included in the selection box of a 3D object.

Although in embodiments described above, the icon associated with a bolded character string is hyperlinked to a search engine, such that actuation of the hyperlink initiates a search query related to the term in that character string, in other embodiments, the icon may alternatively be hyperlinked to images related to the term in that character string. In still other embodiments, the area immediately surrounding the character string may be set as a hot zone comprising the hyperlink associated with the icon.

Although in embodiments described above, the zoom in and zoom out gestures only alter the size of the textual and non-textual objects, leaving the size of the superimposed digital content, such as icons, pictures and 3D objects, unchanged, in other embodiments, the zoom in and zoom out gestures may alternatively resize the superimposed digital content proportionally when the image is resized.

Although in embodiments described above, the 3D input device comprises a projecting device that projects a crosshairs image onto the print matter at a detected pointer tip location to aid a user with manipulation, in other embodiments, the projecting device of the 3D input device may alternatively comprise a laser device controlled by the computing device that projects a laser beam onto the print matter at the detected pointer tip.

Although embodiments have been described above with reference to the accompanying drawings, those skilled in the art will appreciate that variations and modifications may be made without departing from the scope thereof as defined by the appended claims.

What is claimed is:

1. A computerized method, comprising:
   receiving images of a three-dimensional (3D) input space captured via a camera;
   displaying a graphic object corresponding to a first one of the captured images;
   displaying an enclosure around the periphery of the displayed graphic object upon selection of the graphic object, the enclosure having control elements associated therewith that enable manipulation of the displayed graphic object, wherein the control elements comprise a plurality of rotation control elements each associated with a different respective axis;
   updating the displayed graphic object based on a second one of the captured images and in response to manipulation of a marker within within the 3D input space;
   displaying the enclosure around the periphery of the updated graphic object; and
   manipulating the updated graphic object according to user interaction with at least one of the rotation control elements, wherein said manipulating comprises rotating the updated graphic object about the axis associated with the rotation control element interacted upon by the user.

2. The method of claim 1 wherein the control elements further comprise resizing control elements, and wherein said manipulating further comprises resizing the updated graphic object.

3. The method of claim 2, further comprising, upon user interaction with one of the rotation control elements, removing the enclosure while maintaining the rotation control element.

4. The method of claim 1 wherein the control elements further comprise a free rotation tool and wherein said manipulating further comprises rotating the updated graphic object in accordance with user interaction with the free rotation tool.

5. The method of claim 4 wherein the free rotation tool comprises a snap-to-axis function.

6. The method of claim 1, further comprising changing the visual appearance of the control elements upon resizing of the updated graphic object or the enclosure.

7. An interactive input system, comprising:
   a camera configured to capture images of a three-dimensional (3D) input space; a display comprising a display surface; and
   a computing device operably coupled to the display, wherein
   the computing device is configured to:
     display a graphic object at the display surface corresponding to a first one of the captured images,
     display an enclosure at the display surface having control elements associated therewith around the periphery of the displayed graphic object for manipulation thereof, wherein the control elements comprise a plurality of rotation control elements each associated with a different respective axis
     update the displayed graphic object at the display surface based on a second one of the capture images and in response to manipulation of a marker within the (3D) input space, and
   display the enclosure around the periphery of the updated graphic object, manipulate the updated graphic object according to user interactions with at least one of the rotation control elements of the enclosure, wherein the manipulation comprises rotating the updated graphic object about the axis associated with the rotation control element interacted upon by the user.

8. The interactive input system of claim 7 wherein the control elements further comprise resizing control elements.

9. The interactive input system of claim 8 wherein the computing device is configured, upon user interaction with one of the rotation control elements, to remove the enclosure while maintaining the rotation control element.

10. The interactive input system of claim 7 wherein the control elements further comprise a free rotation tool and wherein the computing device is configured to rotate the displayed graphic object in accordance with user interaction with the free rotation tool.

11. The interactive input system of claim 10 wherein the free rotation tool comprises a snap-to-axis function.

12. The interactive input system of claim 7 wherein the computing device is further configured to change the visual appearance of the control elements upon resizing of the graphic object or the enclosure.

* * * * *

UNITED STATES PATENT AND TRADEMARK OFFICE
CERTIFICATE OF CORRECTION

| | | |
|---|---|---|
| PATENT NO. | : 9,619,104 B2 | Page 1 of 1 |
| APPLICATION NO. | : 13/823209 | |
| DATED | : April 11, 2017 | |
| INVENTOR(S) | : Min Xin et al. | |

It is certified that error appears in the above-identified patent and that said Letters Patent is hereby corrected as shown below:

On the Title Page

In item (75), in Column 1, in "Inventors", Line 4, delete "Mark Cameron Loken," and insert -- Cameron Mark Loken, --, therefor.

In the Specification

In Column 6, Line 56, delete "therfore" and insert -- therefore --, therefor.

In the Claims

In Column 39, Line 41, in Claim 1, delete "within within" and insert -- within --, therefor.

In Column 39, Line 54, in Claim 3, delete "comprising," and insert -- comprising --, therefor.

In Column 40, Line 30, in Claim 7, delete "(3D)" and insert -- 3D --, therefor.

Signed and Sealed this
Fourth Day of July, 2017

Joseph Matal
*Performing the Functions and Duties of the
Under Secretary of Commerce for Intellectual Property and
Director of the United States Patent and Trademark Office*